(12) United States Patent
Roy et al.

(10) Patent No.: US 10,492,036 B2
(45) Date of Patent: *Nov. 26, 2019

(54) LAND MOBILE RADIO DISPATCH CONSOLE

(71) Applicant: E.F. Johnson Company, Irving, TX (US)

(72) Inventors: Arindam Roy, Plano, TX (US); Jonathan Nathan Yanez, Plano, TX (US); Gary Matthew Witulski, Fort Worth, TX (US)

(73) Assignee: E.F. Johnson Company, Irving, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/936,093

(22) Filed: Mar. 26, 2018

(65) Prior Publication Data

US 2018/0220271 A1 Aug. 2, 2018

Related U.S. Application Data

(63) Continuation of application No. 15/489,448, filed on Apr. 17, 2017, now Pat. No. 9,930,500, which is a (Continued)

(51) Int. Cl.
| | |
|---|---|
| *H04W 4/10* | (2009.01) |
| *H04W 76/45* | (2018.01) |
| *H04L 12/18* | (2006.01) |
| *H04L 12/58* | (2006.01) |
| *H04M 11/04* | (2006.01) |
| *H04L 29/06* | (2006.01) |

(52) U.S. Cl.
CPC ............ *H04W 4/10* (2013.01); *H04L 12/1818* (2013.01); *H04L 12/1895* (2013.01); *H04L 51/26* (2013.01); *H04L 51/30* (2013.01); *H04L 51/38* (2013.01); *H04L 65/4061* (2013.01); *H04M 11/04* (2013.01); *H04W 76/45* (2018.02)

(58) Field of Classification Search
CPC ............................ G06Q 10/06; G06Q 10/087
See application file for complete search history.

(56) References Cited

U.S. PATENT DOCUMENTS

| | | | |
|---|---|---|---|
| 4,961,070 A | 10/1990 | Maher et al. | |
| 5,212,724 A | 5/1993 | Nazarenko et al. | |
| | (Continued) | | |

OTHER PUBLICATIONS

Advisory Action dated Nov. 18, 2015 in U.S. Appl. No. 13/741,087.
(Continued)

*Primary Examiner* — Wen W Huang
(74) *Attorney, Agent, or Firm* — Foley & Lardner LLP

(57) ABSTRACT

An exemplary land mobile radio dispatch console and method are provided. In one embodiment, the console has the capability to process and handle Requests To Talk (RTT) and emergencies. In another embodiment, the console has the capability to provide a history. In another embodiment, the console provides the capability for operators to configure and save patches of predefined groups for later use. In another embodiment, the console includes a telephone interconnect interface component, and combinations of features mentioned above.

20 Claims, 55 Drawing Sheets

Related U.S. Application Data continuation of application No. 13/741,087, filed on Jan. 14, 2013, now Pat. No. 9,641,988, which is a continuation of application No. 12/416,053, filed on Mar. 31, 2009, now Pat. No. 8,355,691.

(60) Provisional application No. 61/210,039, filed on Mar. 13, 2009, provisional application No. 61/209,713, filed on Mar. 9, 2009.

(56) References Cited

U.S. PATENT DOCUMENTS

| | | | |
|---|---|---|---|
| 5,371,492 A | 12/1994 | Lohrbach et al. | |
| 5,423,061 A | 6/1995 | Fumarolo et al. | |
| 5,754,960 A | 5/1998 | Downs et al. | |
| 5,999,820 A | 12/1999 | Sutanto et al. | |
| 8,355,691 B2 | 1/2013 | Roy et al. | |
| 9,641,988 B2 | 5/2017 | Roy et al. | |
| 9,930,500 B2 | 3/2018 | Roy et al. | |
| 2003/0066032 A1* | 4/2003 | Ramachandran | G06F 3/04847 715/234 |
| 2004/0002351 A1 | 1/2004 | Upp et al. | |
| 2004/0077347 A1* | 4/2004 | Lauber | G08G 1/0962 455/428 |
| 2006/0276200 A1* | 12/2006 | Radhakrishnan | H04L 63/302 455/456.1 |
| 2007/0201376 A1 | 8/2007 | Marshall-Wilson | |
| 2007/0208604 A1* | 9/2007 | Purohit | G06Q 10/06375 705/7.19 |
| 2007/0219842 A1* | 9/2007 | Bansal | G06Q 10/06 715/810 |
| 2008/0163119 A1 | 7/2008 | Kim et al. | |
| 2008/0175356 A1* | 7/2008 | Seidberg | G08B 25/08 379/45 |
| 2009/0019383 A1 | 1/2009 | Riley et al. | |
| 2009/0045942 A1* | 2/2009 | Schurter | A62C 99/00 340/539.11 |
| 2009/0100165 A1* | 4/2009 | Wesley, Sr. | G06F 15/173 709/223 |
| 2009/0212956 A1* | 8/2009 | Schuman | G08B 5/222 340/573.1 |
| 2009/0216534 A1* | 8/2009 | Somasundaram | G06Q 10/087 704/251 |
| 2010/0227583 A1 | 9/2010 | Roy et al. | |
| 2017/0223512 A1 | 8/2017 | Roy et al. | |

OTHER PUBLICATIONS

Final Office Action dated May 8, 2012 in U.S. Appl. No. 12/416,053.
Final Office Action dated Sep. 4, 2015 in U.S. Appl. No. 13/741,087.
Non-Final Office Action dated Jun. 1, 2017 in U.S. Appl. No. 15/489,448.
Non-Final Office Action dated Feb. 22, 2016 in U.S. Appl. No. 13/741,087.
Non-Final Office Action dated Mar. 6, 2015 in U.S. Appl. No. 13/741,087.
Non-Final Office Action dated Aug. 30, 2011 in U.S. Appl. No. 12/416,053.
U.S. Appl. No. 61/209,713, filed Mar. 9, 2009; first-named inventor: Arindam Roy.
U.S. Appl. No. 61/210,039, filed Mar. 13, 2009; first-named inventor: Arindam Roy.

* cited by examiner

| CON | TIME | TYPE | TALKGROUP | USER | Site |
|---|---|---|---|---|---|
| -- | 2/4-11:17:02 | EMG-NEW | WATSON LAKE | FIRST UNIT | 100 |
| -- | 2/4-11:17:02 | EMG-NEW | WATSON LAKE | SECOND UNIT | 200 |
| 1 | 2/4-11:17:02 | EMG-NEW | WATSON LAKE | THIRD UNIT | 300 |
| 96 | 2/4-11:17:02 | EMG-ACK | TESLIN | FOURTH UNIT | 400 |
| 2 | 2/4-11:17:02 | EMG-ACK | WATSON LAKE | FIFTH UNIT | 500 |
| 2 | 2/4-11:17:02 | EMG-ACK | WATSON LAKE | SIXTH UNIT | 600 |
| 96 | 2/4-11:17:03 | RTT-HLD | CARMACKS | UNIT 7 | 700 |
| 3 | 2/4-11:17:03 | RTT-HLD | HAINES JUNCTION | UNIT 8 | 800 |
| 3 | 2/4-11:17:03 | RTT-HLD | HAINES JUNCTION | UNIT 9 | 900 |
| -- | 2/4-11:17:03 | RTT-NEW | CARMACKS | UNIT 10 | 1000 |
| -- | 2/4-11:17:03 | RTT-NEW | HAINES JUNCTION | UNIT 11 | 1100 |
| 4 | 2/4-11:17:03 | RTT-NEW | HAINES JUNCTION | UNIT 12 | 1200 |
| 96 | 2/4-11:17:03 | RTT-ANS | CARCROSS | UNIT 13 | 1300 |
| 5 | 2/4-11:17:03 | RTT-ANS | CARCROSS | UNIT 14 | 1400 |
| 5 | 2/4-11:17:03 | RTT-ANS | CARCROSS | UNIT 15 | 1500 |

PTT    HOLD    CLEAR

FIG. 15

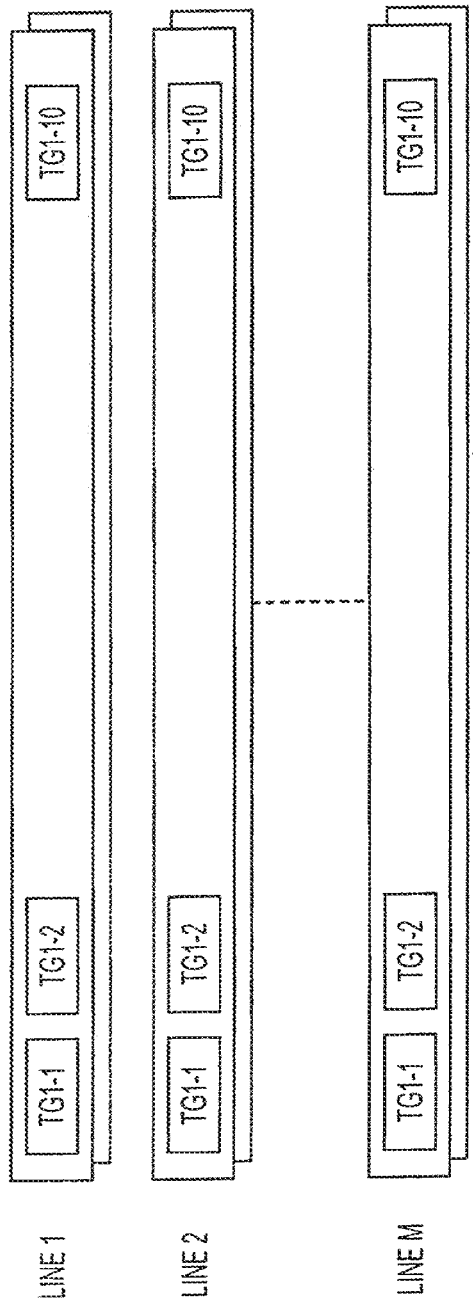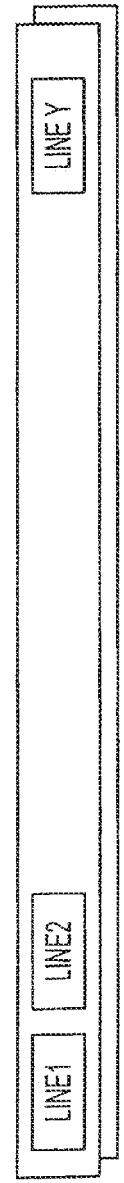
FIG. 40
FIG. 41

LAND MOBILE RADIO DISPATCH CONSOLE

CROSS-REFERENCE TO RELATED APPLICATIONS

Pursuant to 35 U.S.C. § 120, this application is a continuation of U.S. patent application Ser. No. 15/489,448, entitled "Land Mobile Radio Dispatch Console," filed Apr. 17, 2017, and naming Arindam Roy, Jonathan Yanez and Gary Witulski as inventors, which is a continuation of U.S. patent application Ser. No. 13/741,087, entitled "Land Mobile Radio Dispatch Console," filed Jan. 14, 2013, and naming Arindam Roy, Jonathan Yanez and Gary Witulski as inventors, which is a continuation of U.S. patent application Ser. No. 12/416,053, entitled "Land Mobile Radio Dispatch Console," filed Mar. 31, 2009, and naming Arindam Roy, Jonathan Yanez and Gary Witulski as inventors, which claims priority from, and hereby incorporates by reference for all purposes, U.S. Provisional Patent Application Ser. No. 61/209,713, entitled "Land Mobile Radio Dispatch Console," filed Mar. 9, 2009, and U.S. Provisional Patent Application Ser. No. 61/210,039, entitled "Land Mobile Radio Dispatch Console," filed Mar. 13, 2009, both naming Arindam Roy, Jonathan Yanez and Gary Witulski as inventors, all of which are incorporated herein by reference for all purposes.

TECHNICAL FIELD

The present disclosure relates generally to the field of land mobile radio and more particularly, but not by way of limitation, to a land mobile radio dispatch console system and method.

BACKGROUND

Land Mobile Radio (LMR) systems are deployed by organizations requiring instant communication between geographically dispersed and mobile personnel. Typical users of LMR systems include police departments, fire departments, medical personnel, EMS and the military.

Current LMR systems can be configured to provide for radio communications between a site and subscriber units in the field. A subscriber unit may be a mobile unit or a portable unit. LMR systems can be as simple as two subscriber units communicating between themselves and a site over preset channels, or they can be complex, consisting of hundreds of subscriber units and multiple sites.

LMR systems may be configured to cover a large geographical area by providing hundreds of sites. In centralized/switched LMR systems, calls between sites are setup through one or more centralized switches. Devices can be analog or digital. In contrast, calls involving multiple sites are setup by the sites directly, without the use of centralized switches or equivalent, using digital networks, in particular IP networks, where the calls are carried using Voice Over Internet Protocol (VOIP) technology.

Users of the LMR system are divided into groups. Users in a group can talk to one another using their radios. Dispatchers can interface with the LMR systems utilizing a computer having speakers and a dynamic graphical display. Dispatchers can select one of several predefined groups of users, and talk to the selected group. Members of the groups can talk to one another.

SUMMARY

According to an exemplary aspect of the present disclosure, an LMR dispatch console comprises a dynamic graphical user interface with enhanced functionality. As described below, it comprises several aspects capable of enabling a multitude of advantages and benefits.

One technical aspect of the exemplary dispatch console may be the capability to process Requests To Talk (RTT) and emergencies in a prioritized fashion.

Another aspect may be the capability to provide a call history for various types of calls that can be accessed using the dynamic graphical user interface.

Another aspect may include the capability for dispatchers to configure and save patches of predefined groups, such as talk groups, for later use, with conflict resolution to prevent attempted connection of an inoperable patch.

Another aspect may include a telephone interconnect interface component.

Other technical advantages may be readily apparent to one skilled in the art after review of the following figures and description associated herewith.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts, in which:

FIG. 15 is a view of a GUI Color/Shade scheme for RTT and emergency.

FIG. 40 is a system diagram for a system composed of radio lines.

FIG. 41 is a system diagram for a system composed of profiles.

DETAILED DESCRIPTION

It should be understood at the outset that although exemplary implementations of the present disclosure are illustrated below, the present disclosure may be implemented using any number of techniques, whether currently known or in existence. The present invention should in no way be limited to the exemplary implementations, drawings, and techniques illustrated below, including the exemplary design and implementation illustrated and described herein. Additionally, the drawings contained herein are not necessarily drawn to scale.

Although the preferred embodiments of the disclosure described herein are implemented on a distributed LMR, it should be readily understood that the dispatcher console can additionally or alternatively operate with a centralized and/or switched LMR, or with a hybrid LMR that has both centralized and switched components. In other words, the presently preferred dispatch console functions as a node on the LMR network, and can be viewed as a radio on the network with dispatcher authority. However, it should also be understood that the console can be a processor that simply allows the dispatcher to interface with a centralized/switched LMR system that may or may not be remotely located from the console. Thus, the dispatch console does not necessarily have radio functionality.

Figure 1:
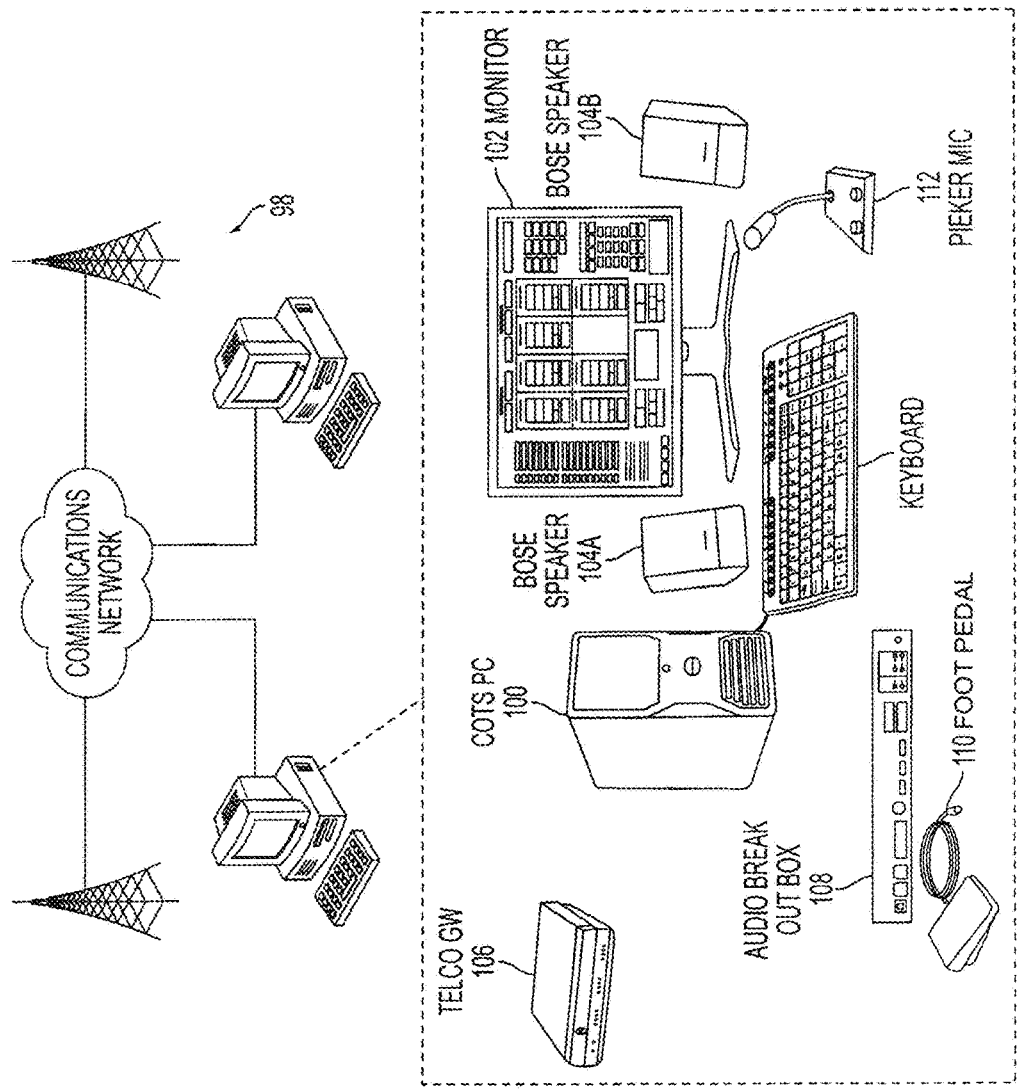
FIG. 1 is a block diagram that illustrates an LMR dispatch console.

FIG. 1 provides the hardware component of a console position of an LMR network 98 in an exemplary embodiment. The exemplary console position can be equipped with:

One or more commercial off the shelf PCs 100;

One or more JEMII cards inside the PC;

One or more regular or touch screen monitors 102 that preferably support resolution of 1280×1024;

Two speakers 104A and 104B, such as BOSE speakers;

One Multitech Telco GW 106 (if the console is required to perform telephone interconnect);

One Audio Break out box (ABOB)108 that allows different types of audio input and output equipment to be connected easily to the PC;

One foot switch 110 connected to the ABOB;

One microphone 112 connected to the ABOB; and

Dispatcher and supervisor headset as required (connected to the ABOB).

The Console PC is connected to the ABOB via a datalink, such as a USB 2.0, and to the Telco GW via Ethernet or other data network connection.

The following list enumerates features that are supported by the dispatch console in an exemplary embodiment. In this embodiment, all features corresponds to P25 conventional system. It should be readily understood that, in other embodiments, other features can replace these features, and that there can be less or more features than those listed below.

P25 Group Call—Ability for operator to originate and receive P25 clear group calls.

P25 encrypted Call—Ability for operator to originate and receive P25 encrypted group calls.

P25 private call—Ability for operator to originate and receive P25 private calls.

Emergency Alarm and call—Ability for operator to receive an emergency alarm and emergency call and to respond to the emergency call.

Request to Talk (RTT)—Ability for operator to receive RTT (request to talk) and respond to the RTT History—Ability for operator to retrieve information regarding past events.

Telephone Interconnect—Ability for operator to originate and receive calls from the PSTN.

Patching—ability for operator to patch two or more P25 TalkGroup lines, P25 private call lines or telephone interconnect lines in an emergency situation.

Group Select/Multi Select—Ability for operator to transmit on multiple P25 TalkGroup line simultaneously.

Channel Marker—ability for operator to periodically signal users on a particular TG that the TG is currently busy.

Status Message—Ability for radio users to send short message to the operator.

Intercom—Ability for one operator to send voice to all peer operators.

Supervisor Headset.

Operator Headset.

Select and Unselect speaker—Ability for operator to receive voice call for a particular talk group on left or right speaker.

Mute—Ability for operator to mute one or more TG lines allowing operator to ignore the received voice call on the TG.

Instant Recall (IRR)—Ability for operator to playback recently received P25 voice call both on select and unselect speaker.

TalkGroup and User alias—Ability to display a preconfigured alias instead of displaying the user ID or TalkGroup ID.

Digital Clock—Ability for console to display the current date and time.

Touch Screen monitor—Ability for operator to use a touch screen monitor instead of mouse.

Main and Line PTT—Ability for operator to talk through a main Push to Talk button to talk on all selected lines or a line PTT button to talk on a specific Foot Pedal Switch—Ability for operator to use a hardware foot pedal switch instead of clicking the main PTT button.

Configuration Tool

Figure 2:
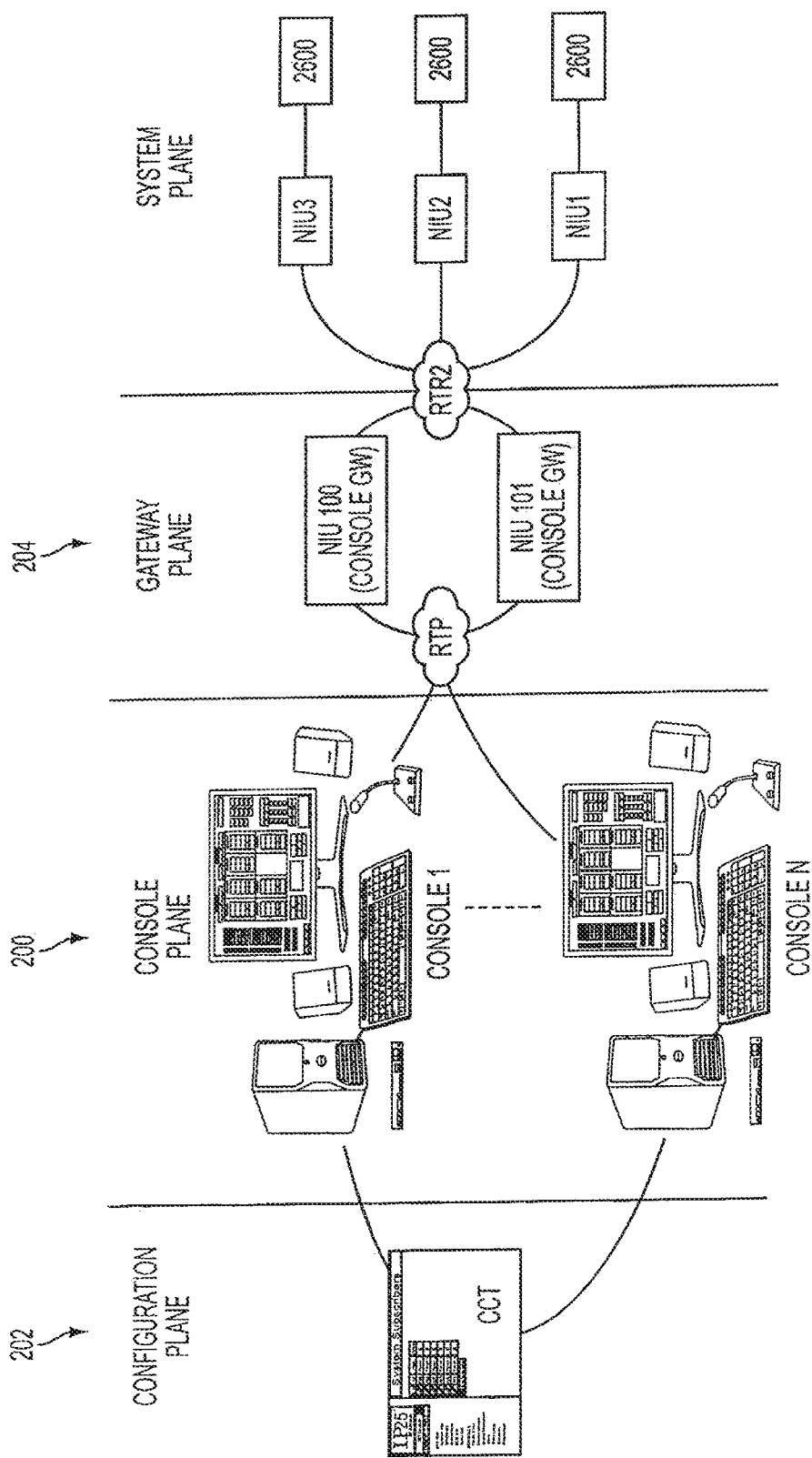
FIG. 2 is a diagram illustrating a network architecture of an LMR system employing parallel dispatch consoles.

Referring to FIG. 2, multiple, parallel consoles 200 can be peer to each other (i.e., each console operates in a distributed mode independent of others.) In some embodiments, all consoles are configured through a web based Console Configuration Tool 202. This tool can run on the network management system and used to configure all console positions within the system.

The consoles can be connected to one or more GW NIUs 204 that perform the conversion from RTP to RTR2. This conversion can be performed to allow the NIUs to communicate with each other using RTR2 protocol, whereas the console can be RTP based. In some embodiments, each Console GW NIU can support up to 2 TalkGroups (i.e., if a console position monitors 10 TalkGroups, there needs to be 5 Console GW NIU, each of which supports 5 distinct TGs.)

Figure 3:
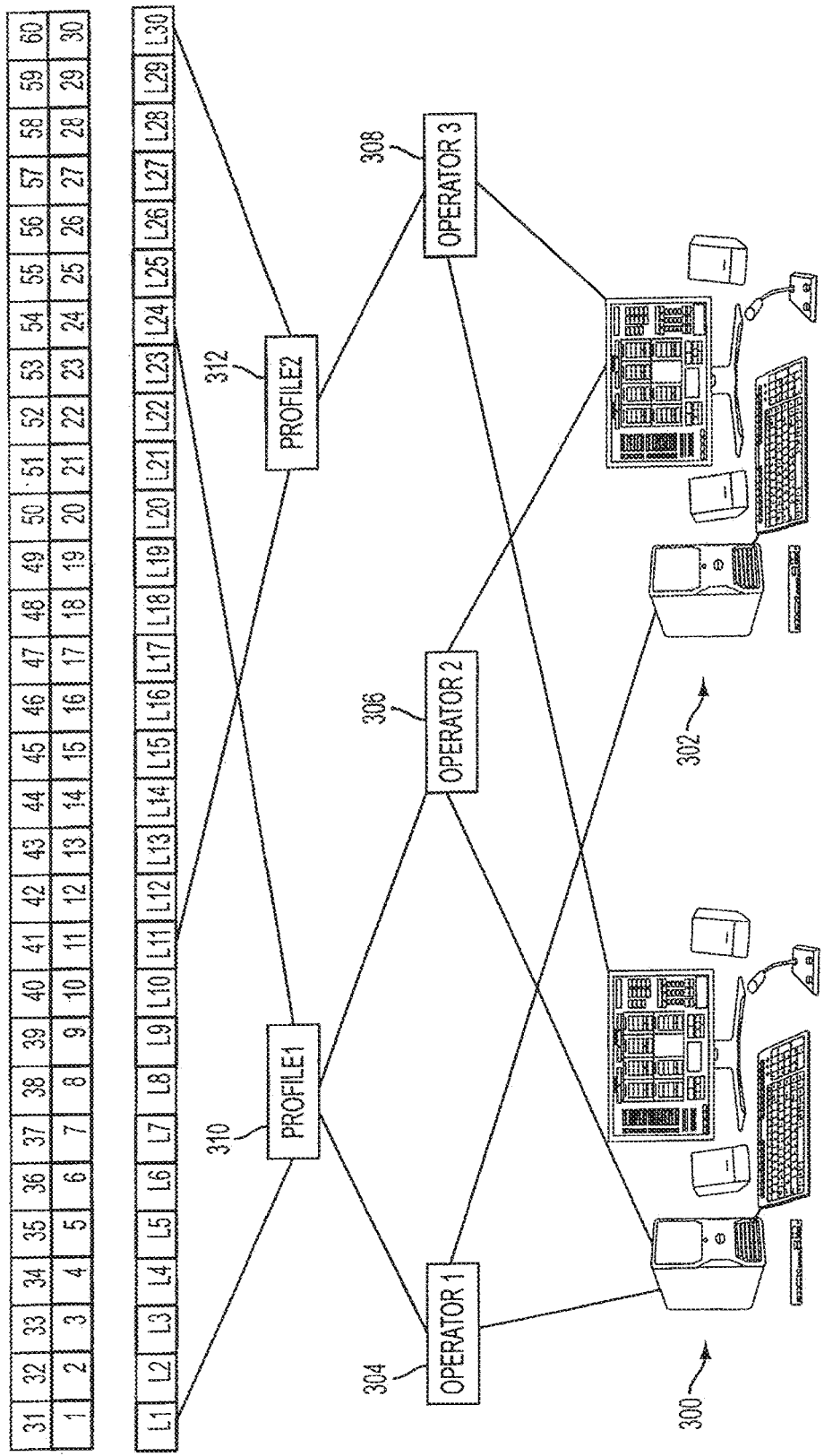
FIG. 3 is a diagram illustrating a console hierarchy.

FIG. 3 provides a hierarchy of an example console configuration in a graphical format. For purposes of illustration, there are two consoles 300 and 302, three operators 304-308, and two profiles 310. In this particular example:

System is configured with TG1 through TG60

There are 30 radio lines configured.

Each radio line is configured with 2 TGs.

Each radio line has a default TG (shown in green background).

There are two profiles configured. Profile 1 consists of line 1 through 24 (24 lines) and Profile 2 consists of Line 11 through 30 (20 lines).

There are three operators configured in the system. Operators 1 and 2 use profile 1 and Operator 3 uses profile 2.

There are two console positions. Each operator can login to any of the console positions. When they login to any console positions they are provided with the corresponding profile that they are configured with.

Figure 4:
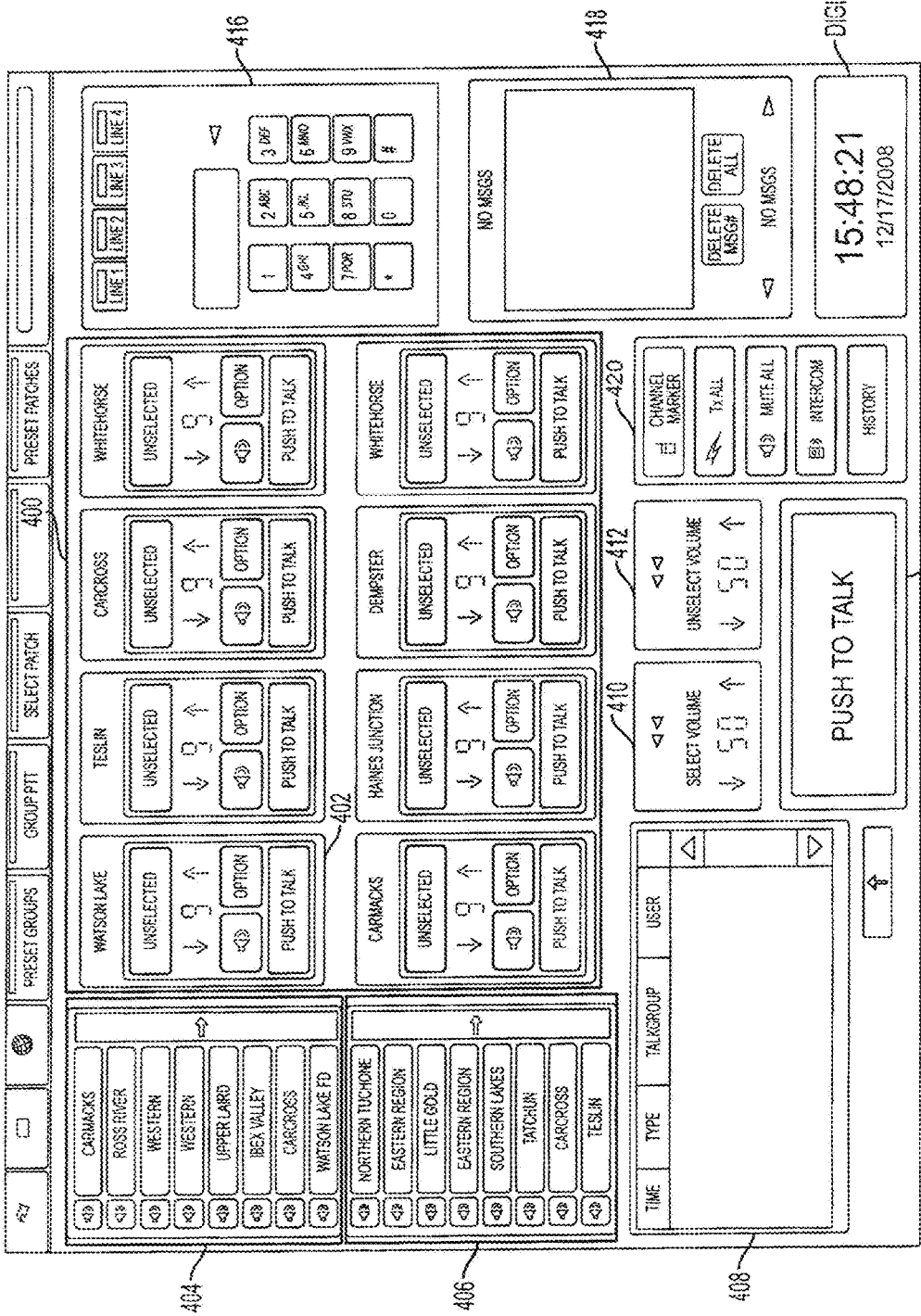
FIG. 4 is a view of a dispatch console GUI.

Turning now to FIG. 4, the main console GUI is divided into multiple sections. The dispatch console can support up to 24 distinct TalkGroup lines. The main channel Panel 400 in the console can hold up to 8 TalkGroup lines, also known as individual channel panel. These 8 TalkGroups provide extended control to the operator. The individual TalkGroup lines are provided in individual panels 402 within the main channel panel, and provide extended control to the operator such as:

line PTT;

Ability to mute the line;

Selecting audio to be propagated to select or unselect speaker;

Individual volume control; and

Options such as setting the line as encrypted or clear.

A side channel panel in the console provides the operator limited access to the remaining 16 TalkGroup lines as two talk group sets 404 and 406 each having 8 TalkGroups. The functionality includes:

Selecting the TalkGroup and pressing the main PTT button to place a call.

Ability to receive a call.

Ability to mute the line.

Selecting the TalkGroup allowing the voice received in the corresponding line to go to the select speaker.

For each set of 8 TalkGroups in the side channel panel, an arrow line provides the ability for the operator to bring the set of TalkGroups to the main channel panel. Clicking on this arrow moves the set of 8 TalkGroups to the main channel panel and the set of 8 TalkGroups in the main channel panel to move to the side channel panel.

The RTT emergency panel 408 provides the operator to receive emergency notification and RTT notification from the subscriber units. It is envisioned that this feature is not included in some embodiments. The arrow below the emergency window allows the operator to move the RTT/Emergency panel to the main channel panel. When the emergency/RTT panel is moved to the main channel panel, the main channel panel moves to the bottom left corner of the console expanding the side channel panel with 24 TalkGroups. This feature is further described below with reference to FIG. 9.

The IRR select panel 410 allows the operator to set the volume of the select speaker relative to the maximum volume, and allows the operator to hear previous voice conversation received on the select speaker. The IRR unselect panel 412 allows the operator to set the volume of the unselect speaker relative to the maximum volume and allows the operator to hear previous voice conversation received on the unselect speaker.

A Main PTT button 414 allows the operator to place a call on the selected TalkGroups by clicking on the main PTT. The main PTT button is also attached to the foot pedal (i.e., pressing the foot switch activates the main PTT button and places a call on the selected lines.)

Figure 27:
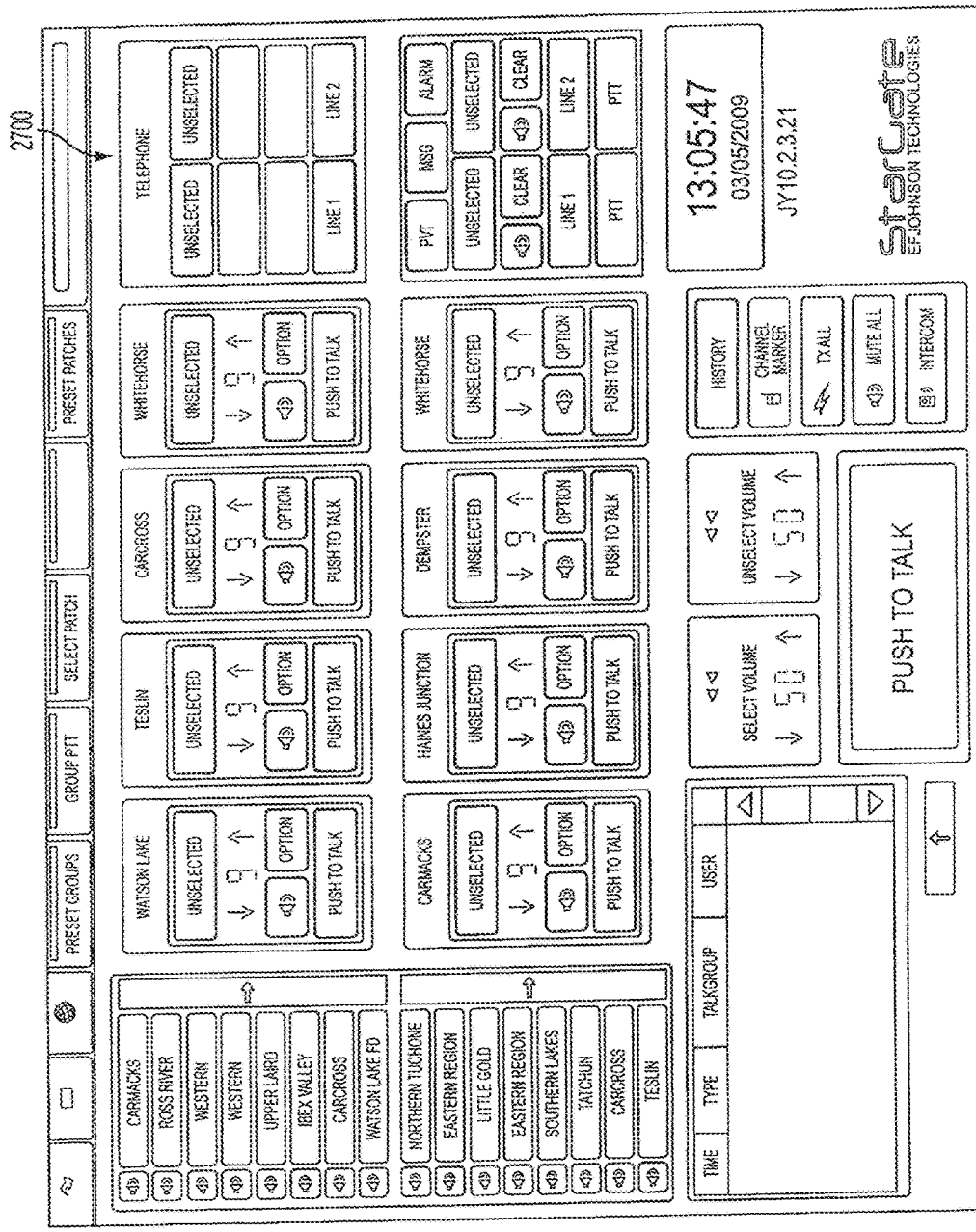
FIG. 27 is a view of a telephone interconnect main GUI.

The telephone Interconnect panel 416 allows the operator to originate and receive regular PSTN calls. The telephone interconnect panel is connected to an external Telco GW which can connect up to two analog POTS lines. This telephone interconnect is further described below with reference to FIGS. 27-28.

A Message/Private Calls/Error window 418 primarily has three functionalities.

Message—Allows operator to view all status messages received.

Private Calls—Allows operator to place and receive private calls.

Error—Allows operator to view active alarms/errors.

The other features panel 420 provides include the following functionality:

Channel Marker—Allows the operator to activate the channel marker feature. The channel marker allows the operator to lock out subscribers from using a particular TG.

TX All—The TX all button selects all configured Talk-Groups in the console position. This feature allows the operator to transmit on all P25 lines by pressing the main PTT button.

Mute All—The mute all button mutes all TG line in the console.

Intercom—The intercom button allows the console to transmit to all parallel consoles. The voice transmitted on intercom line is non P25 and is not heard on the subscriber radios.

History—The history button allows a customer to display the history of the last 1000 events. Some of the history events supported are:

RTT
Emergency
Transmitted Calls
Received Calls
Status message

Figure 5:
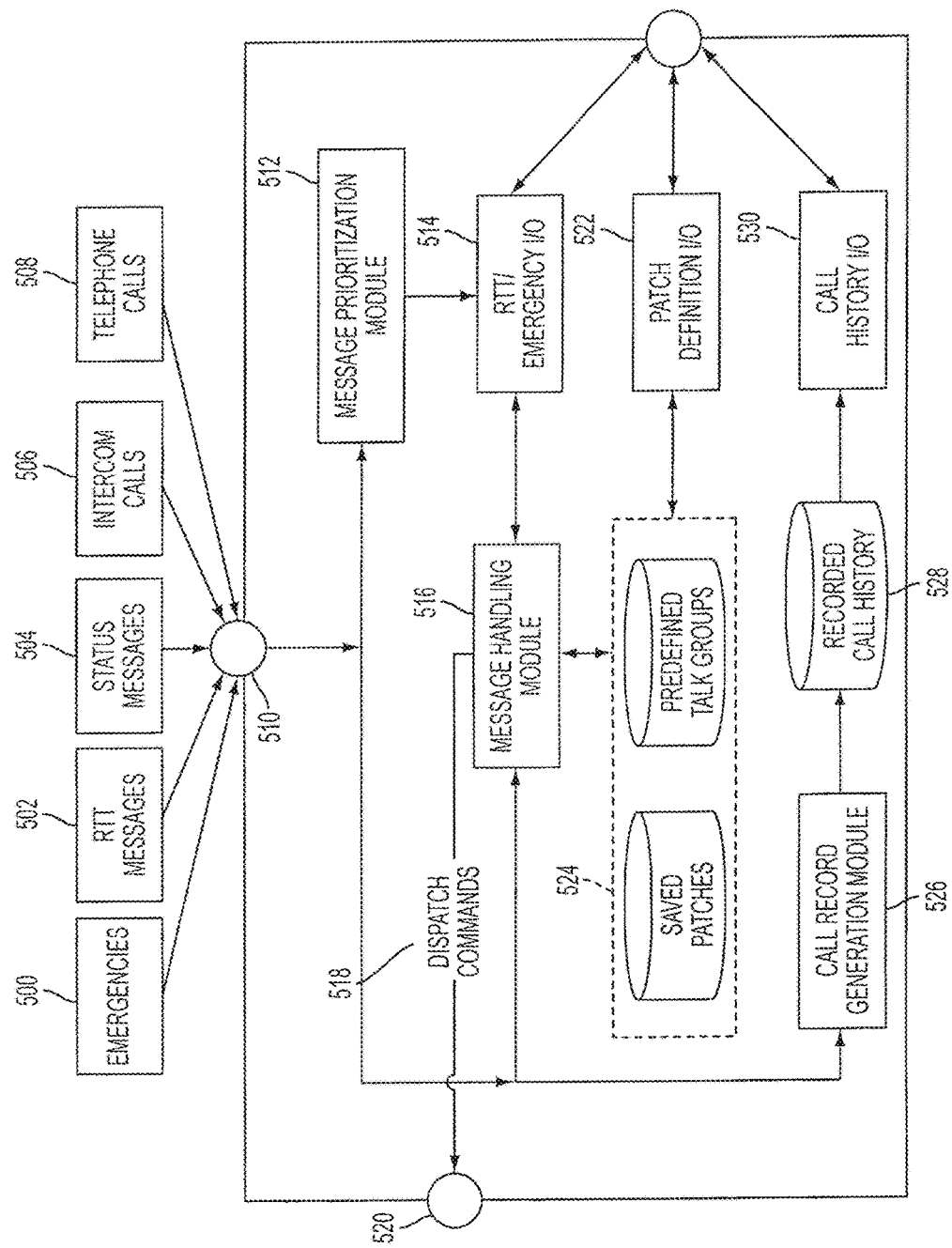
FIG. 5 is a block diagram illustrating functional aspects of a dispatch console.

Turning now to FIG. 5, some novel features available in various combinations in some embodiments provide new capabilities. Some of these capabilities are described as modules. Throughout this disclosure, it should be understood that the term, module, refers to a function of the system, and that it is not limited to any particular implementation or compartmentalization in software or hardware, nor any particular type of platform. Rather, a module can be implemented as hardware, software, and combinations thereof. Also, a module can be implemented with or without use of an object oriented programming language. Moreover, a module may be implemented as one or multiple software components, while multiple modules may be implemented as one or multiple software components. It should be understood that multiple modules can be implemented by one software component. Similar principles apply wherever a component is discussed in this disclosure. Namely, multiple components herein described can be implemented as a single component, and/or a single component herein described can be implemented as multiple components.

The dispatch console is able to receive and process multiple types of messages, including emergencies 500, request to talk messages 502, status messages 504 (similar to text messages), intercom calls 506, and telephone calls 508. It should be understood that emergencies refers to emergency alarms or to an emergency call. An emergency call is a call made in an emergency mode that does not need to be acknowledged in order for the user to talk on the talk group. A challenge to handling these messages relates in part to GUI audio/visual real estate.

When the messages are received over one or more input ports 510, the RTT messages 502 and Emergency messages 500 are prioritized by prioritization module 512 for simultaneous, prioritized presentation to the operator by RTT/Emergency I/O component 514. Selections received from the operator are interpreted by message handling module 516 for generating dispatch commands 518 for output over one or more output ports 520. These commands effectively respond to the emergency messages 500 and RTT messages 502. These operations are further described below with reference to FIGS. 6 and 9-16.

Patch definition I/O component 522 accesses data store 524 of predefined talk groups and saved patches and presents the contents to the operator for selection. Patch definition I/O component comprises a functional module that allows the user to create and save new patches, to add talk groups to existing patches, and to save these reconnected patches. It can also notify the operator of a conflict before creation of a patch is completed. These operations are further described below with reference to FIGS. 8 and 22-26.

Call history generation module 526 records various types of messages in a call history data store 528. Module 526 also records metadata for each call, including message type, talk group, source ID, date, time, and/or call length. Call history I/O component 530 presents the contents of these calls to the user with the metadata, and permits the user to sort and filter the contents by the metadata. It also lets the user play and pause the calls, and export the calls. These operations are further described below with reference to FIGS. 7 and 17-21.

Figure 6:
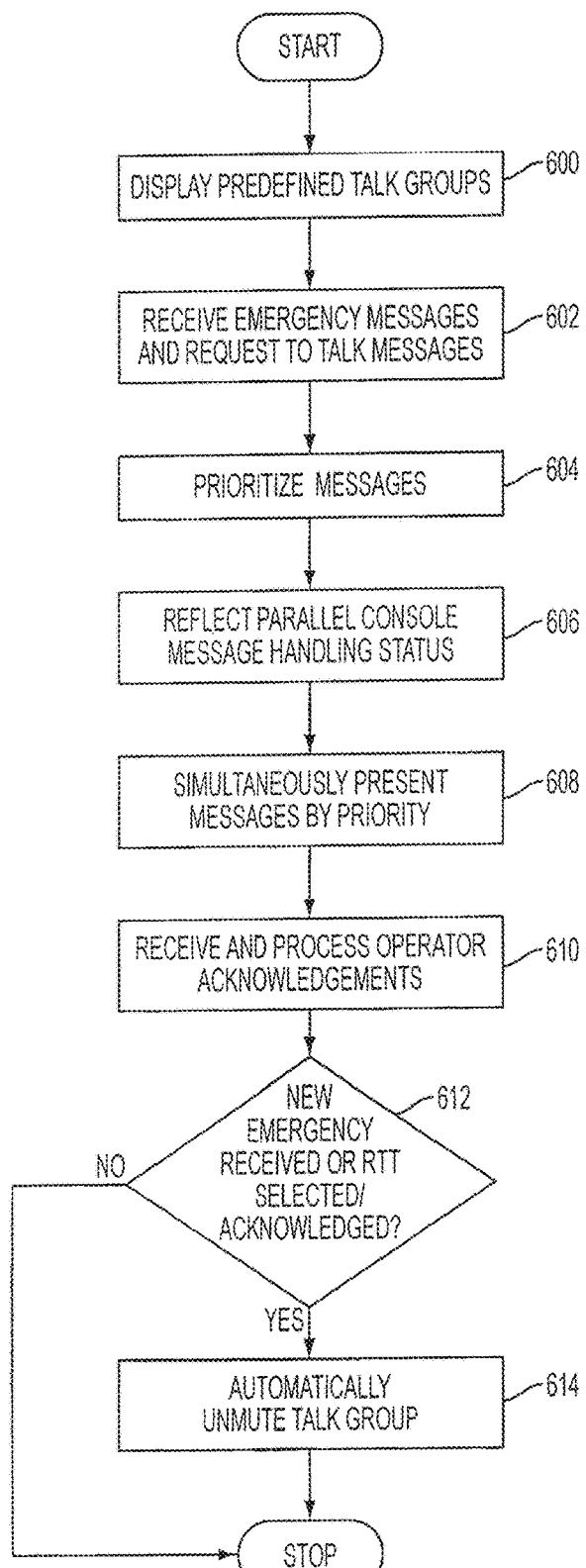
FIG. 6 is a flow diagram illustrating a method of operation for a dispatch console having message prioritization capability.

Turning now to FIG. 6, a method of operation for a dispatch console having message handling capability can, at the outset, include displaying predefined call groups to an operator at step 600. Emergency messages and request to talk messages received at step 602 are prioritized at step 604. Message handling status of parallel consoles, if any, is reflected in the statuses of the messages at step 606 and can change how those messages are prioritized at step 604. The messages are simultaneously presented to the operator at step 608 in a prioritized fashion. Operator acknowledgements or other selections are received and processed at step 610. If it is determined at decision step 612 that a new emergency message has been received or that the operator has selected or acknowledged a request to talk message, then a talk group associated with the message can be automatically unmuted at step 614. These operations are further described below with reference to FIGS. 7 and 9-16.

Figure 7:
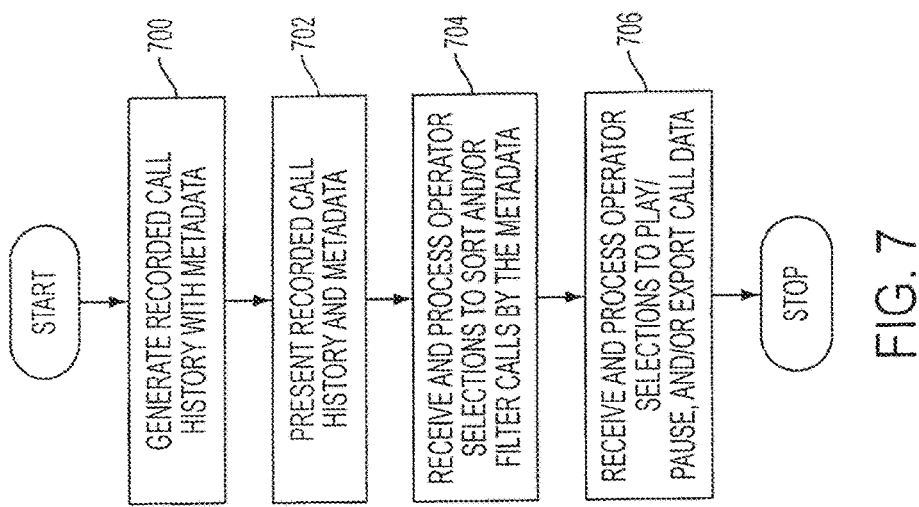
FIG. 7 is a flow diagram illustrating a method of operation for a dispatch console having a call history.

Turning now to FIG. 7, a method of operation for a dispatch console having a call history includes generating a recorded call history for various types of calls at step 700, such as telephone calls, requests to talk, emergencies, intercom communications, status messages. Step 700 also includes recording metadata about the call data, such as message type, talk group, source ID, date, time, or call length. The recorded call data is stored in a computer readable medium, such as disk, RAM, ROM, etc. At step 702, the computer readable medium is accessed and a display is provided of representations of the recorded call data by an active display. At least part of the metadata about the recorded call data is displayed as well. Step 702 also includes displaying, by the active display, interactive controls responsive to operator selections to process the recorded call data. These controls can be displayed in response to selection by the operator to maximize a display of the recorded call data. These controls can include play and pause, sort, filter, and/or export controls. Accordingly, the history contents can be played, paused, sorted, filtered, and/or exported at step 706. These operations are further described below with reference to FIGS. 17-21.

Figure 8:
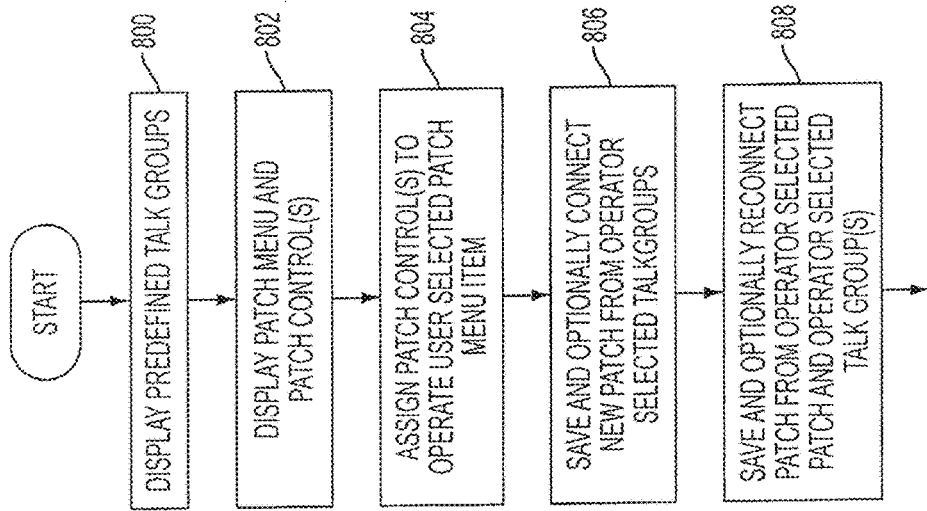
FIG. 8 is a flow diagram illustrating a method of operation for a dispatch console having patch definition capability.

Referring to FIG. 8, a method of operation for a dispatch console having patch definition capability can include, at the outset, displaying predefined talk groups to an operator at step 800. A patch menu is also displayed to the operator at step 802, preferably as a drop down list of saved patches and empty slots for saved patches. A set of patch controls also displayed to the operator is assigned to control a patch selected by the operator from the menu at step 804. The operator can save (and optionally connect) a new patch at step 806 by selecting an empty slot and at least two talk groups. If there is a conflict, this conflict is communicated to the operator upon selection of the talk groups, before the patch is connected (though it can still be saved). On the other hand, the operator can update (and optionally reconnect) a previously saved patch with additional talk groups added at step 808. Here, the operator selects the saved patch and one or more talk groups to be added. If the operator selects to reconnect the patch, and if that selected patch is already connected, it is disconnected, saved, and reconnected automatically. Again, any conflict is communicated to the operator before the patch is reconnected. Reconnected patches are automatically saved in the menu at step 808. These operations are further described below with reference to FIGS. 8 and 22-26.

As mentioned above, the Request To Talk (RTT) and emergency are two features that can be provided in some embodiments. RTT can be implemented on the subscriber radio unit as a status message. A button on the radio can be configured as an RTT button. When a radio user presses this button, the Radio can send an RTT status message to the system. The system in turn can send the RTT message to all consoles. An RTT message from the system to the console can include:

subscriber ID of the radio user;
TalkGroup that the user is affiliated with; and
Originating site id.

Most incoming radio calls can be initiated via RTT. The flexibility of the Dispatch Console to meet the requirements of the RTT specification can largely affect the efficiency of the work flow. All RTT notification can be registered on all Dispatch Consoles, and any console operator can respond to any of the registered RTT calls.

When the RTT is received at the dispatch console, an indication can be provided to the dispatcher that a user wishes to talk. This indication can be visual and/or audible. The visual indication can include unique identification information from the unit that is calling. This information can include the unit identifier or associated alias (if available), the talkgroup identifier or associated alias (if available), and the receiving repeater site identifier. An audible tone can accompany every new RTT when it is received at the dispatch console. The tone can be a momentary tone indicating to the dispatcher that a new RTT is received.

The primary purpose of RTT is to indicate to the operator that a radio user wishes to talk. When RTT is received on the console, the console operator can have the following choices.

Answer the RTT—indicates to the radio user that the operator has answered the RTT and that the user is permitted to talk;
Hold the RTT—primarily park the RTT for future answer; or
Clear the RTT—remove the RTT from the RTT window.

A radio user can indicate an emergency to the operator in two ways. The radio user can be configured with an emergency alarm button. When this button is pressed, a message can be sent to all dispatch consoles providing a visual and audible alarm notification. Alternatively if a radio user places a call in emergency mode, the emergency notification can be provided to the dispatch consoles.

The console operator can acknowledge an emergency, which stops the beeping on the console. Once acknowledged, the operator can clear the alarm.

Figure 9:
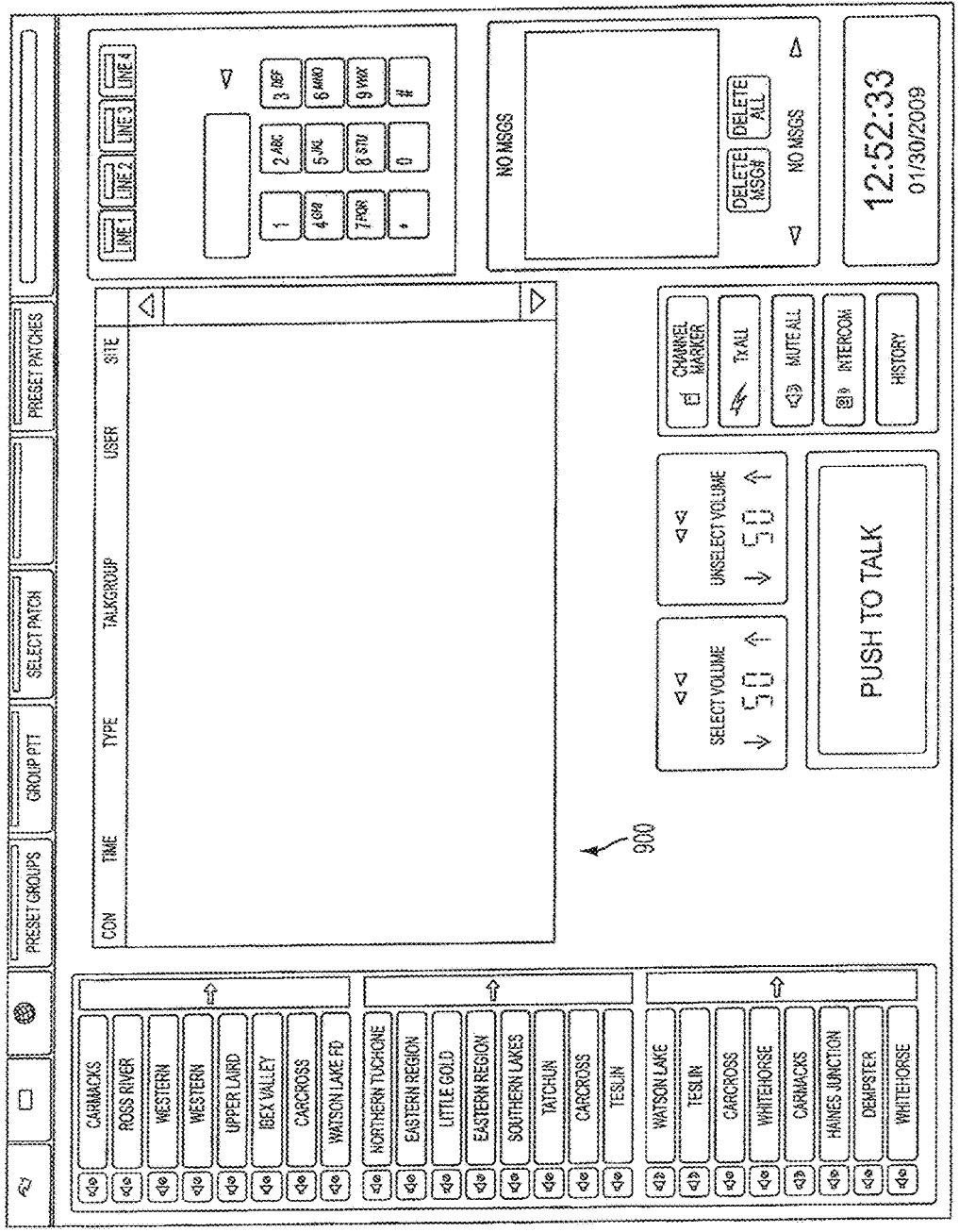
FIG. 9 is a view of an initial RTT/Emergency GUI.
Figure 10:
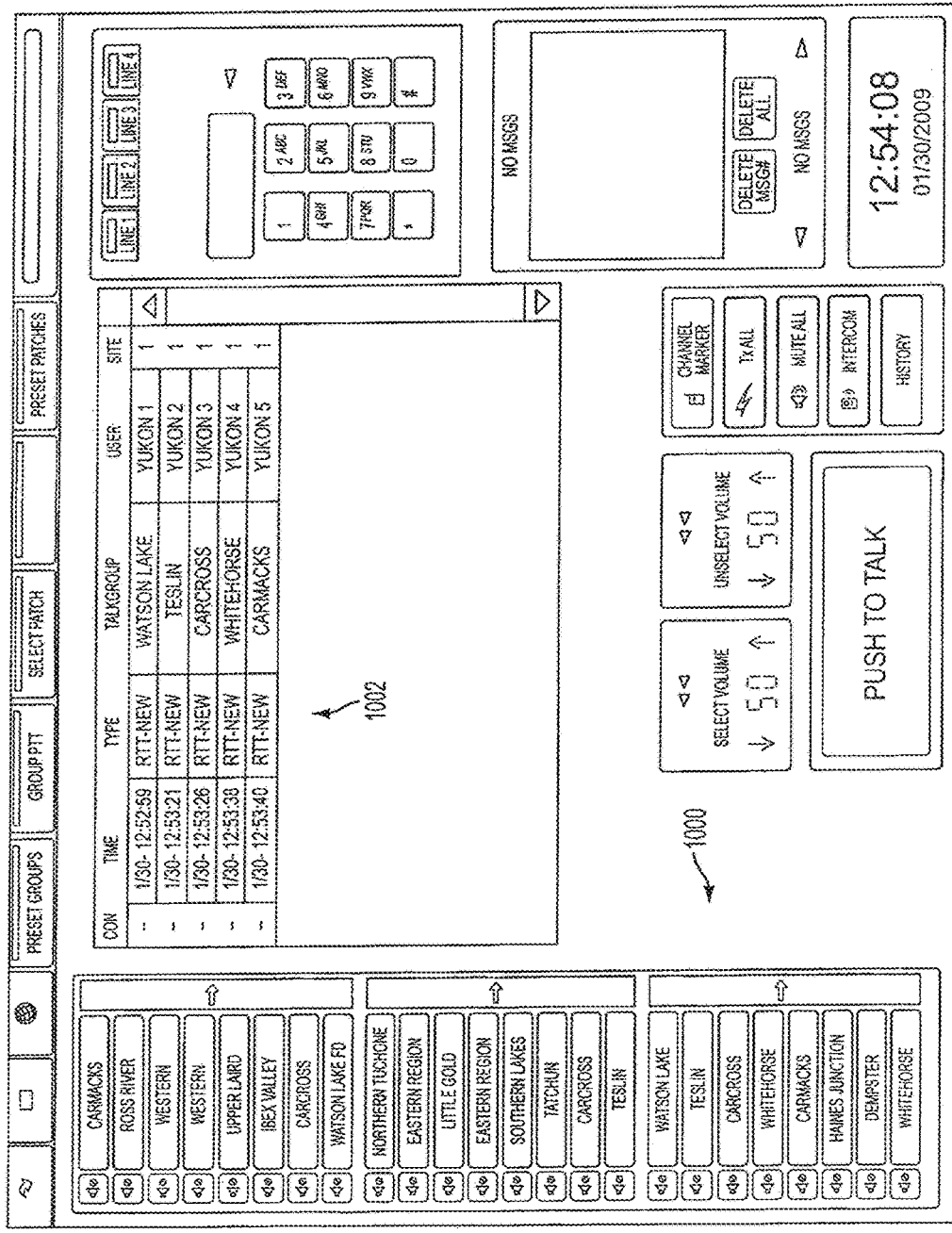
FIG. 10 is a view of GUI behavior when a new RTT is received.

Referring to FIG. 9, when a console is started, the emergency/RTT window can be minimized on the left bottom corner. Clicking on the arrow next to the minimized RTT/Emergency window can maximize the window into the main channel panel 900. During startup a console can come up with a blank RTT/Emergency window.

Note that when the RTT/emergency window is maximized, the console can be running in the RTT mode. Under this mode of operation, all TalkGroup lines 1000 can be muted, such as those shown in the left panel of FIG. 10. This muting operation is also known as monitor functionality of the console. Under this mode, console operators do not receive the voice of any subscriber originated call until it is permitted through an RTT or emergency.

When a new RTT is received, an audible tone can be generated to alert the operator. A visual notification can also be provided. A new RTT can be displayed in white background, and also indicate that it is a new RTT by populating the Type column using RTT-NEW as at 1002.

Figure 11:
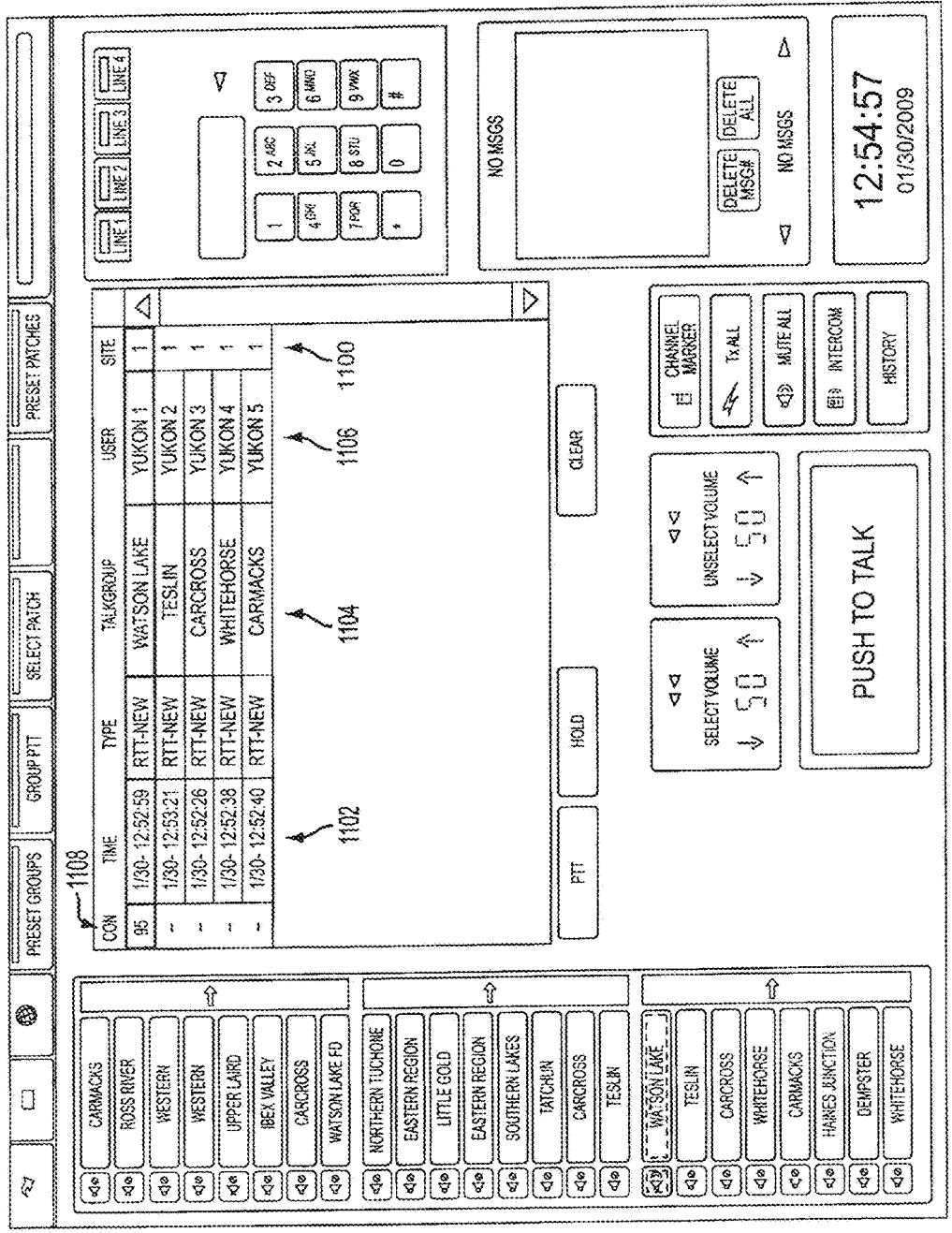
FIG. 11 is a view of GUI behavior upon selection of an RTT.

FIG. 11 shows example GUI behavior when a new RTT is received:

The site column 1100 indicates the site that generated the RTT;
Time column 1102 indicates when the RTT is received;
TalkGroup column 1104 indicates the TalkGroup alias for which an RTT is received; and
User column 1106 indicates the user that generated the RTT.

The RTTs can be stored in the window on a first come first serve basis. Note that while an RTT from a user is active, if the user sends a new RTT, it can overwrite the original RTT and push the new RTT to the bottom of the list.

When an RTT is selected, the corresponding TG line can be automatically un-muted. This response can accommodate an operator who is ready to respond to this RTT and is interested in the corresponding TalkGroup. When an RTT is selected it can also provide the operator buttons to answer the RTT (by hitting the PTT button), put the RTT on a hold state by clicking the hold button, or clear the RTT by clicking the clear button.

When the RTT is selected, it can also populate the Con column 1108, indicating the console ID that has selected the RTT. This functionality is particularly useful for parallel console positions where one console operator is notified that another operator is handling the RTT.

Figure 12:
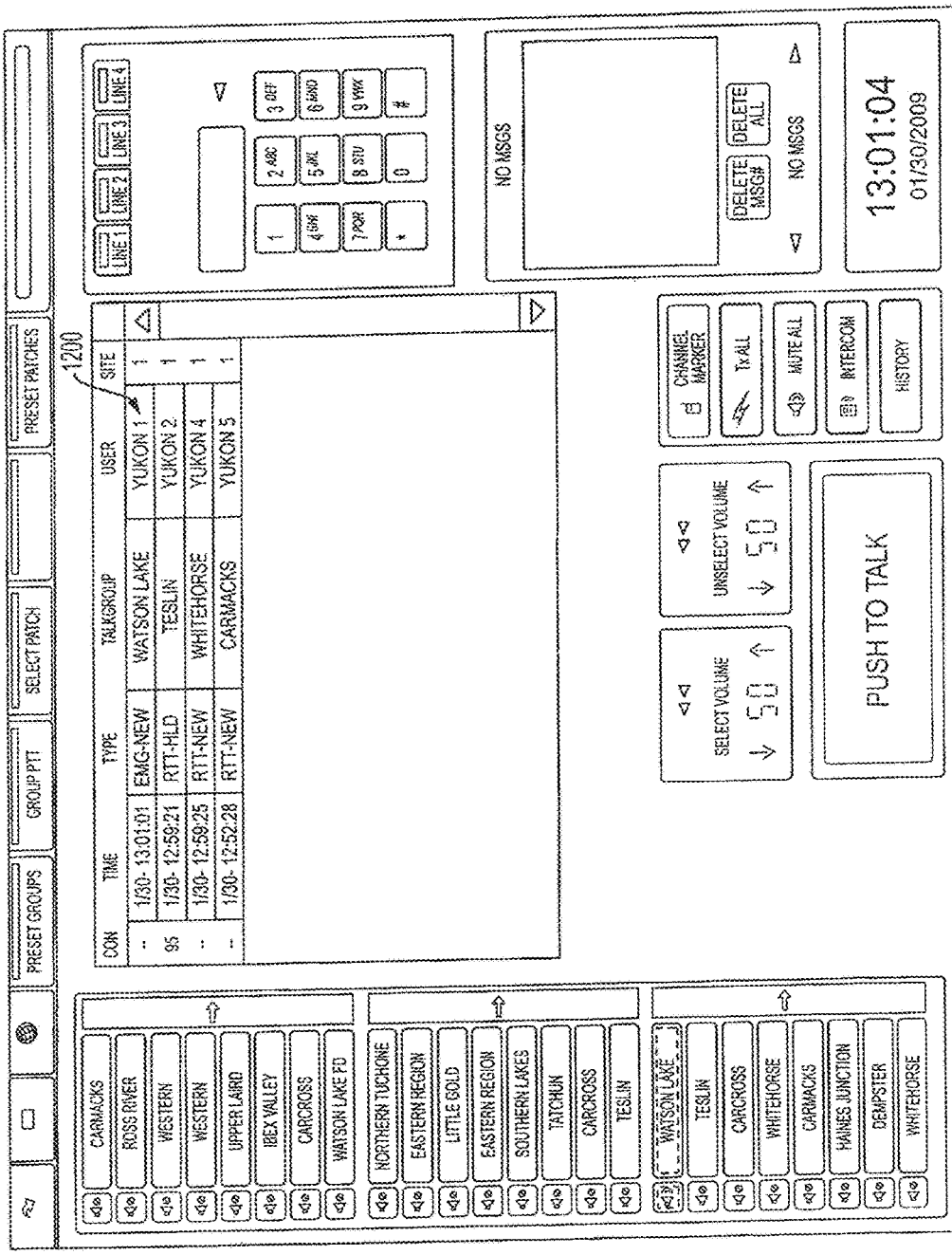
FIG. 12 is a view of GUI behavior upon receipt of a new emergency on a console position.

Referring to FIG. 12, when an emergency is received on a console position, it can be displayed on the console with a red background, as at 1200, along with an annoying emergency tone. The emergency can always be put on top of the queue, while emergencies can be sorted on a first come first serve basis. When an emergency is received, it can also automatically un-mute the corresponding TalkGroup Line. This functionality allows the operator to automatically listen to any emergency situation.

Figure 13:
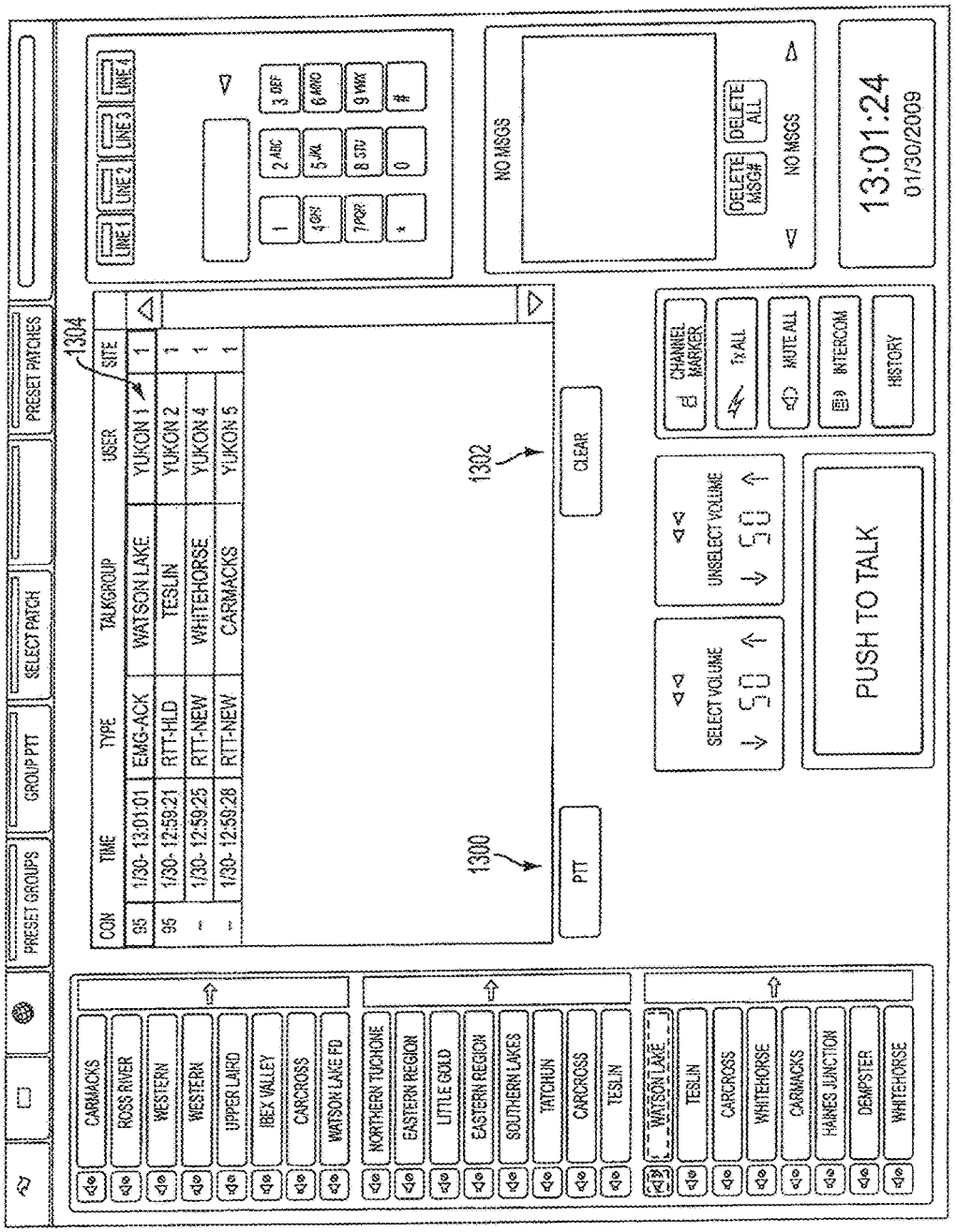
FIG. 13 is a view of GUI behavior upon acknowledgement and selection of the emergency.

Referring to FIG. 13, when a new emergency is selected, the dynamic GUI can provide the operator options to acknowledge the emergency or answer the emergency by pressing the PTT button 1300. In some embodiments, the Clear option 1302 is not provided on a new emergency.

Disabling the clear function in this circumstance prevents the operator from accidentally clearing an emergency without first acknowledging it. A call placed on the emergency (through the PTT press) can automatically acknowledge the alarm.

Acknowledging an emergency can change the emergency from NEW state to Acknowledge state, changing its background color to grey as at 1304. Acknowledging an emergency can also stop the emergency tone if there are no outstanding new emergencies (i.e., all emergencies are acknowledged.)

Figure 14:
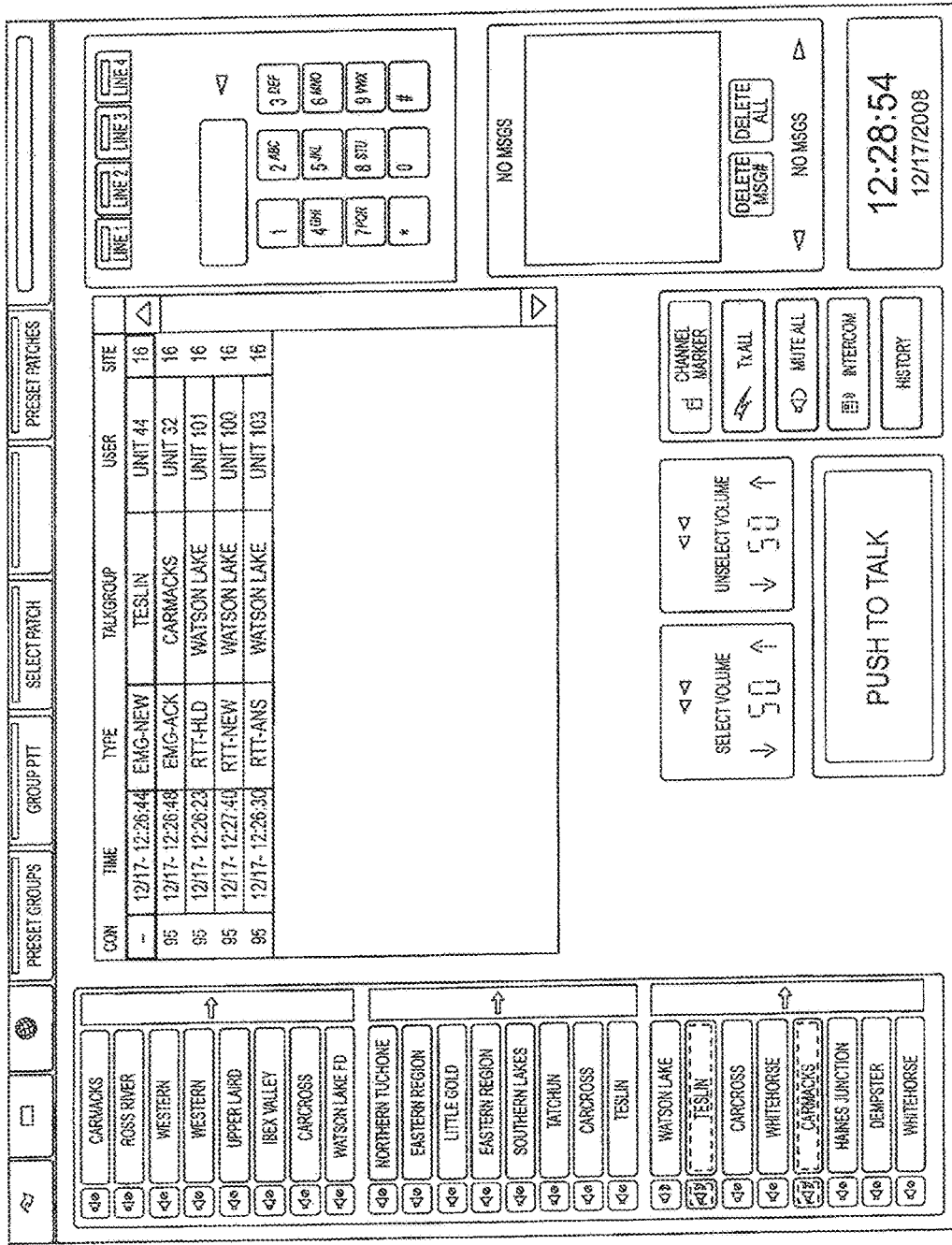
FIG. 14 is a view of a GUI RTT/emergency queue priority.

Referring to FIG. 14, when there are multiple RTT, emergencies active on the RTT/emergency window, they can be sorted based on the state of the RTT and emergency. The priority on different state of RTT/Emergency can be:

1. EMG-NEW
2. EMG-ACK
3. RTT-HLD
4. RTT-NEW
5. RTT-ANS

Within each of the above mentioned states, the events can be sorted based on the time the event was received or the time when the state of an event is changed. At any instance of time, there can only be one entry in the table for a particular Radio User in some embodiments. For example, if a radio user sends an RTT followed by an emergency, the emergency can replace the RTT. Similarly if an RTT is in an answer state and the user sends another RTT, the new RTT can replace the old RTT.

Referring to FIG. 15, since the RTTs and emergencies can be displayed on each console position, measures can be implemented in some embodiments to ensure that the dispatchers/operators do not step on each other while processing an RTT/Emergency. To this end, visual indication can be provided on each console to display action taken by a parallel console. For example:

1. When dispatch console position 1 selects a new RTT/emergency, it can be displayed in dark gray color on console 1 and displayed in light/dimmer gray color on the parallel consoles indicating that a parallel console has selected the RTT/emergency. Also note that when an event is selected the border of the selection provides the color based on the event and state as described below.
2. When console position 1 selects a new RTT, console 1 can populate the con fields with its own id and the parallel consoles populates the con field with id of console 1 indicating that console 1 has selected the RTT. The Con field can be populated for other events and states in a similar fashion.
3. When console position 1 puts an RTT into hold, it can be displayed on console position 1 in a dark blue color and displayed on a parallel console in a light/dimmer blue color.
4. When a console position 1 answers an RTT by pressing the PTT, it can be displayed on console position 1 in a dark green color and displayed on a parallel console in a light/dimmer green color.
5. When a console position 1 acknowledges an emergency by pressing the Ack button (or PTT button), it can be displayed on console position 1 in a dark yellow color and displayed on parallel console in light/dimmer yellow color.
6. When an RTT or emergency is cleared by one console position, it can be removed from the GUI of all console positions and moved to history.

In some embodiments, there is no master for any of these event, (i.e., at any time one console position can change the state of an event regardless of which console position performed an action on the event previously.) For example console position 1 can put an RTT on hold, and console position 2 can subsequently answer the RTT. When a console position changes the state of an event, its id can be displayed on the parallel console indicating the last console position to update a state.

Some additional features on the RTT/Emergency operation may include:

1. When an RTT/Emergency is selected by a console position, the corresponding TalkGroup in the selection can be marked as selected. In other words, the voice received on the TalkGroup can be played out on a selected speaker.
2. Emergency can be triggered through alarm or emergency call (i.e., if an emergency call is received without an emergency ack, it can trigger a new emergency.) However, an emergency call does not trigger an emergency if the emergency is already active (i.e., either in NEW state or ACK state). If an emergency call is received after a console has cleared the emergency it can trigger a new emergency.
3. Emergency triggered by an emergency call can follow the same operational procedure as an emergency alarm (i.e., it is treated as a new emergency.) If the emergency call creates an emergency that is already active, it can be ignored.

Figure 16:
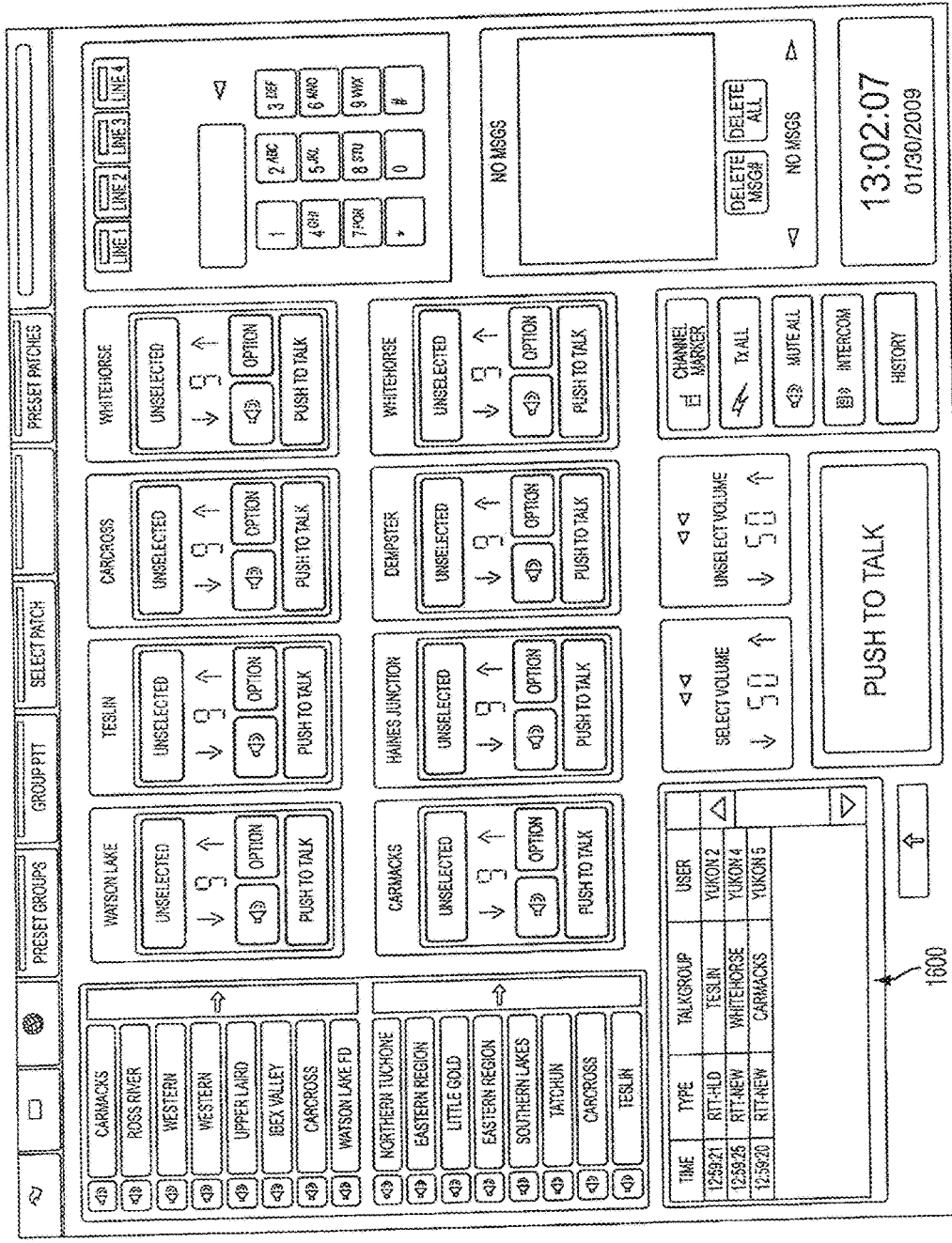
FIG. 16 is a view of a minimized RTT/Emergency window.

Referring to FIG. 16, when the main RTT/emergency window is minimized to the left bottom corner, the RTT/emergency operation can work in a similar fashion. In this case, the minimized window 1600 does not display the following information:

1. Date;
2. Console Id;
3. Site Id.

In some embodiments, only the RTT/emergency corresponding to the TalkGroups that are configured in the channel panel are displayed in the RTT/Emergency table (i.e., if a console position receives a RTT/emergency for a TalkGroup that is not configured in one of, for example, 24 lines on the console position, this RTT/Emergency can be ignored by the console position.)

In some display console embodiments, the minimized window does not display RTT. For example, RTT may not be a feature in some embodiments.

Other information applicable in some embodiments:

1. The font used in the RTT window can be of size 12.
2. A minimum of 10 entries can be displayed on the main RTT/Emergency window. Other active entries can be accessed through the scroll bar. The RTT window can be capable of displaying at least 30 entries through the scroll bar.
3. The RTT/Emergency operation can be available through touch screen operation.
4. Each console position can have the ability to select the range of user id for RTT calls that they want to receive. Only those RTTs can be displayed/processed/logged. This range can be specified in the configuration.
5. The Con column can display up to 2 numeric characters. As a result, the console ids can be limited to less than 100 for proper display of console ids.
6. The maximum number of alphanumeric character allowed in the TalkGroup Alias can be 16 characters and User alias can be 12 characters.

7. The Site column can display up to three numeric characters.

A history feature can be implemented in certain dispatch consoles to allow the operator to perform various functions such as the following functions:
1. Listen to the voice received or transmitted by the console position;
2. Look at the data corresponding to the calls transmitted and received by the console position;
3. Look at the data corresponding to the following operation:
    a. Call-Tx—P25 Call originated from the Console;
    b. Call-Rx—P25 Call received by the Console position that is transmitted from the P25 subscribers;
    c. Call-Tx#—P25 Call received by the Console position that is transmitted from the parallel console positions;
    d. EMG—different state of received emergency. EMG-NEW, EMG-ACK and EMG-CLR;
    e. RTT—different state of received RTT. RTT-NEW, RTT-HLD, RTT-ANS and RTT-CLR;
    f Msg—Status message received by the console position;
    g. Icom Rx—Intercom calls received by the console position;
    h. Icom Tx—Intercom calls transmitted by the console position;
    i. Ph-Out—Telephone Interconnect calls dialed from the Console position. The voice for a telephone call is not stored;
    j. Ph-In—Telephone Interconnect calls received by the Console position. The voice for a telephone call is not stored;
    k. Private Call originated and received by the Console position;
4. Sort the history entries based on Type, TalkGroup (TG), Source ID, time etc.

Figure 17:
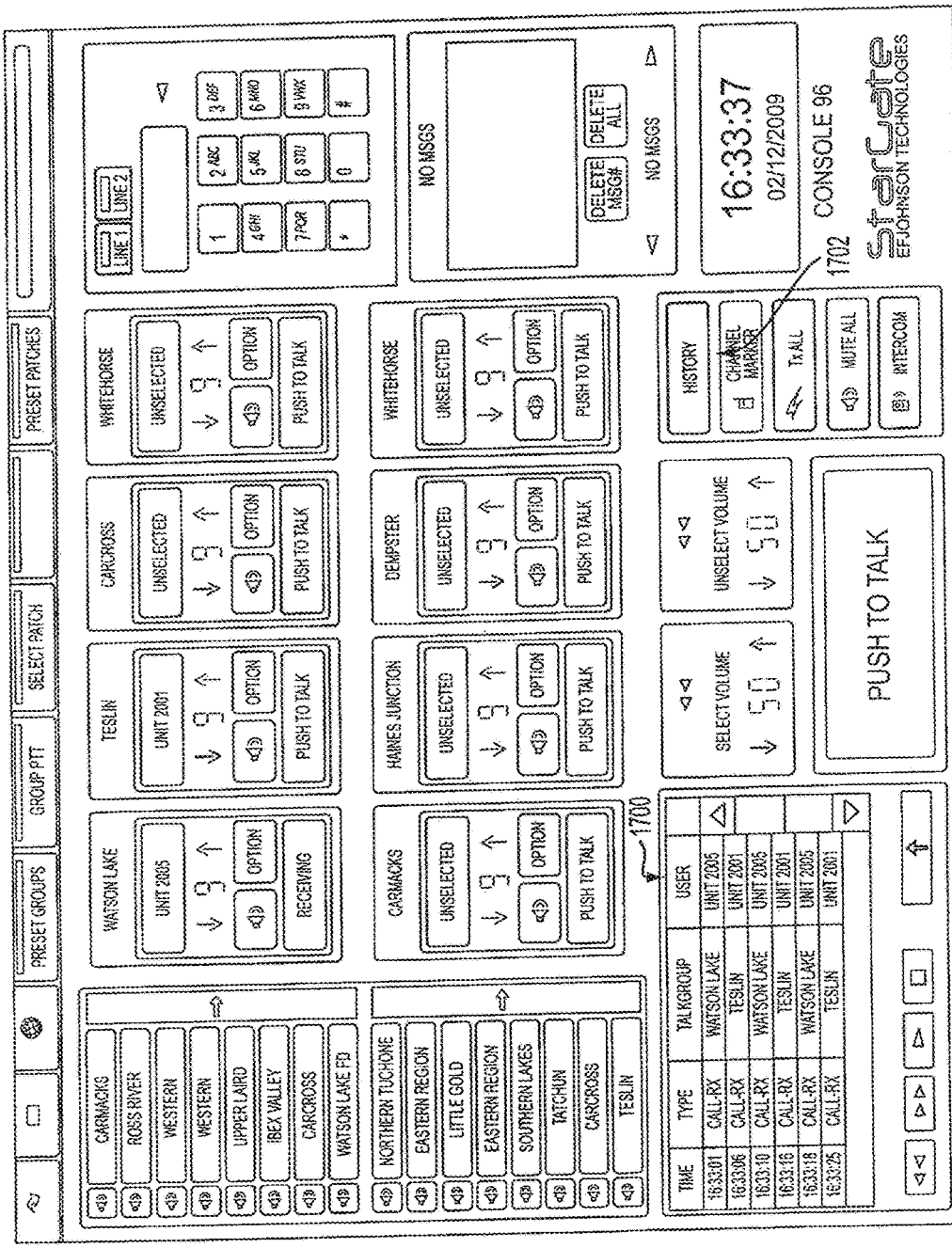
FIG. 17 is a view of a minimized history window.

The History can be displayed in a small window 1700 replacing the emergency window for basic operation, or it can be expanded to the main panel for more detail operation. FIG. 17 shows the History in the small window.

When the History button 1702 is pressed (button down) it can replace the emergency window. If the emergency window is minimized on the left-bottom side of console GUI the history button can replace it as shown in FIG. 17. The History window can be swapped with the main panel by clicking the up arrow button in the bottom of this minimized window.

Clicking the History button again (button up) can minimize the history window and display the emergency window again.

In some embodiments, only the following basic operation of History is available in the minimized history:
1. Play button—Plays the voice associated with the selected entry, if available.
2. Rewind button—Rewind the currently played voice in 5 second increments.
3. Forward button—Forward the currently played voice in 5 second increments.
4. Only the following information is displayed in the minimized window.
    a. Time—Time when the event happened
    b. Type—The type of event received
    c. TalkGroup—The TalkGroup alias corresponding to the event, if available. For example Status message, Telephone Interconnect does not have TalkGroup associated.
    d. User—The P25 user alias (or user id if alias is not available) that generated the event, if available. For example, Telephone Interconnect is not associated with a P25 user id.

Figure 18:
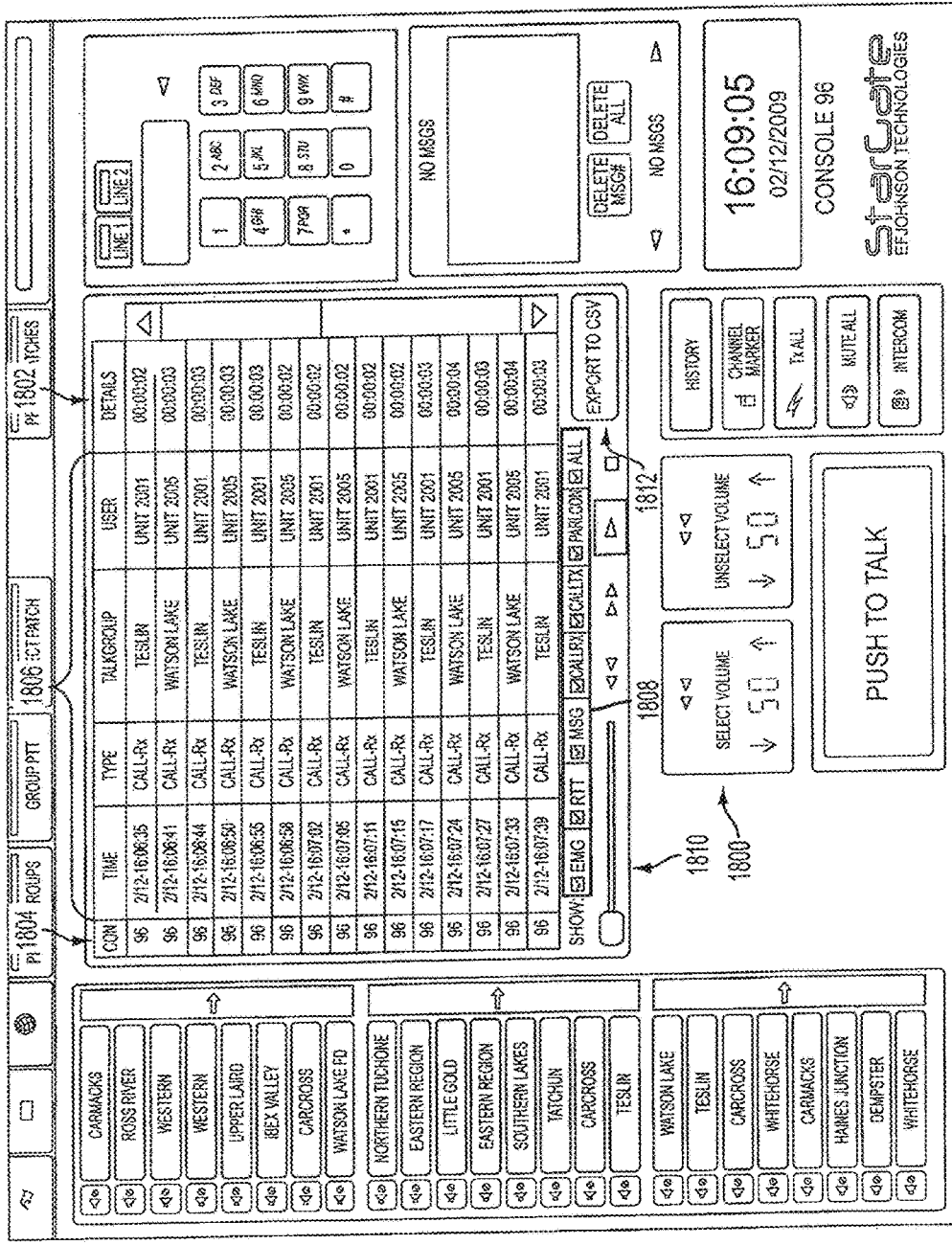
FIG. 18 is a view of a history GUI in a main panel.

FIG. 18 shows the History GUI in the main panel at 1800. In some embodiments, the History can be swapped between the main panel and minimized window the same way as the Emergency/RTT window. The main panel History can provide additional functionality compared to the functionality available from the minimized window. In some embodiments, the additional functionalities available on the main window can include a details column 1802, a con column 1804, a sort function 1806, a filter control 1808, a playback slider control 1810, an a history export control 1812.

The details column can display history information associated to the event and is different for different events:
1. Call Rx—displays the duration of the voice received on this particular Call;
2. Call Tx—displays the duration of the voice transmitted on this particular call;
3. Call Tx#—displays the duration of the voice received on this particular call from a parallel console;
4. Msg—Displays the message text received in the corresponding status message.

The Con column can display the Id of the console if the corresponding events are one of the following:
1. Call Tx#—Console Id of the console that originated this call;
2. EMG/RTT—Console Id of the console that managed the EMG/RTT or changed the state of the corresponding event;
3. Icom Rx—The console Id of the console that originated this intercom call.

For all other events the Con column can display the self Console Id.

Another feature on the main panel history, in some embodiments is the sort functionality. By default, the history can be sorted based on time. Within the time sorting, the Emergency and RTT state information for a corresponding Emergency/RTT can be displayed together. This functionality can be performed so that operator can select an emergency/RTT and view all history information corresponding to this emergency/RTT in one place. In addition, the main history can provide sort functionality for the following columns:
1. Type—allows the operator to sort the history data based on event type;
2. TalkGroup—Allows the operator to sort the history data based on the TalkGroup Alias;
3. User—Allows the operator to sort the history based on the User Alias or User Id (if alias is not available);
4. Time—Allows the operator to sort the history based on time.

Figure 19:
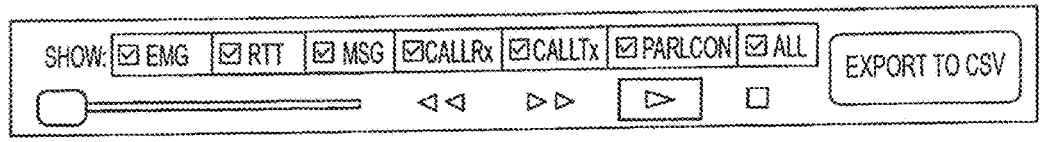
FIG. 19 is a view of a history filter control.

Referring to FIG. 19, in some embodiments, the main panel history can provide the following filter controls:
1. All—selecting All filter selects all types of event available in the history. Selecting this filter automatically selects the other checkboxes;
2. EMG—Selecting EMG filter displays all events corresponding to Emergency;
3. RTT—Selecting RTT filter displays all events corresponding to RTT;
4. Msg—Selecting Msg filter displays all events corresponding to status message;
5. CallRx—Selecting CallRx filter displays all events corresponding to P25 calls received;

6. CallTx—Selecting CallTx filter displays all events corresponding to P25 calls transmitted;
7. ParlCon—Selecting ParlCon filter displays all events corresponding to P25 calls received from parallel consoles.

Figure 20:
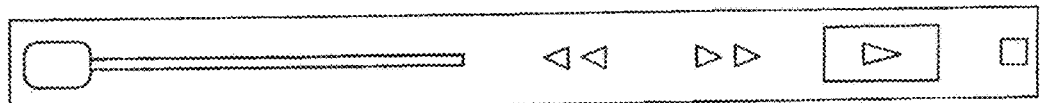
FIG. 20 is a view of a history playback slider control.

Referring to FIG. 20, in some embodiments, playback slider allows the operator to forward the currently played voice stream in a continuous fashion. In an example, the active History window stores up to 24 hours of data or 1000 entries, whichever happens first. After 1000 entries or 24 hours, the older data can be moved out of the active window and stored in a local database. The older voice snippets can be deleted or archived as desired.

Figure 21:
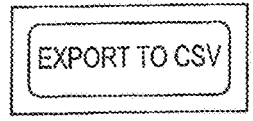
FIG. 21 is a view of an export to CSV button control.

Referring to FIG. 21, in some embodiments, the Export to CSV button on the main history allows the operator to export, for example, the last 30 days of history data in a csv format. This csv file can be automatically stored on the console desktop with file name based on time stamp when the file is generated.

Some embodiments of the dispatch console may have new patching features. In some embodiments, a console patch can be of two types:
1. Audio Patch;
2. Supergroup.

Under an audio patch, each line of the console can be used separately. However, the lines are patched in the back end, such as when a call is received on one line. The call is automatically transmitted to the other lines.

Under a supergroup, two or more TGs are merged to one supergroup and they can be treated like a new group. This feature can be used in Trunking, and it allows efficient usage of channel resources.

Figure 22:
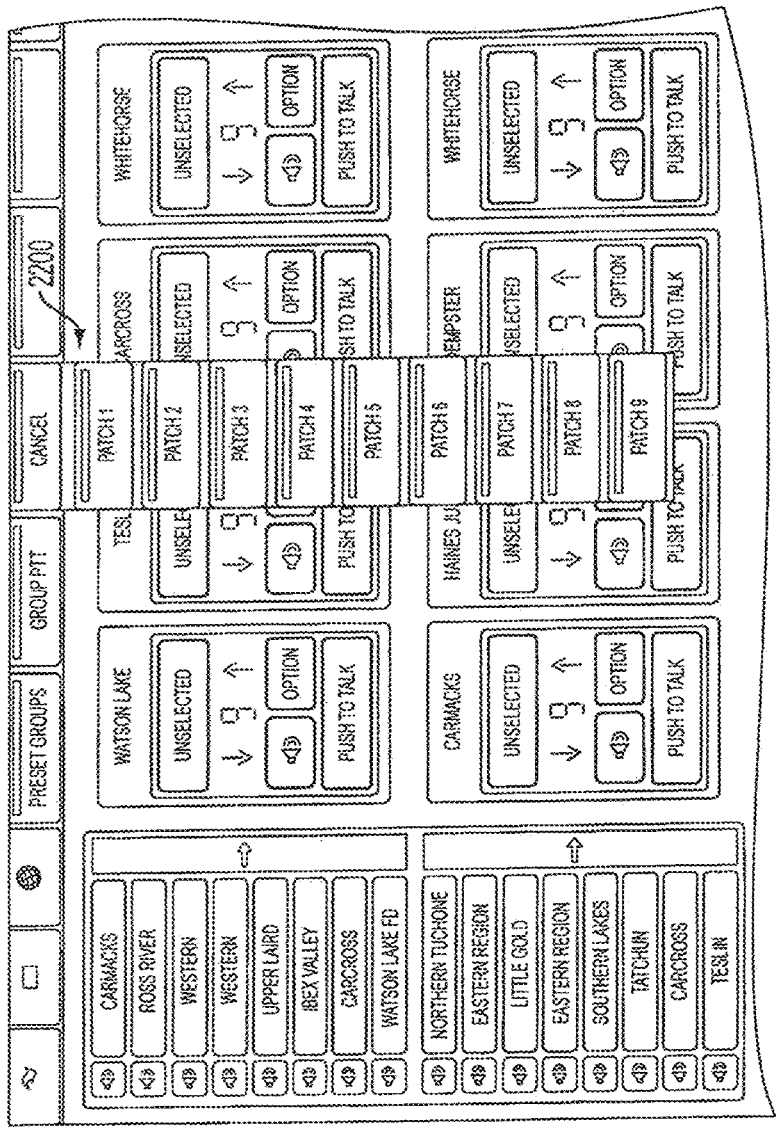
FIG. 22 is a view of a drop down patch menu control.

Referring to FIG. 22, some embodiments of the console allow up to 9 patches per console position. When the patch button is pressed, a drop down menu 2200 shows the 9 patches available for the operator. The operator can select any of the nine patches to operate on a particular patch.

When a patch is selected, it can be in one of several states:
1. Empty—No lines selected for the patch;
2. Saved—Lines are selected in the patch and saved but the patch is not activated;
3. Connected—The patch is active.

Figure 23:
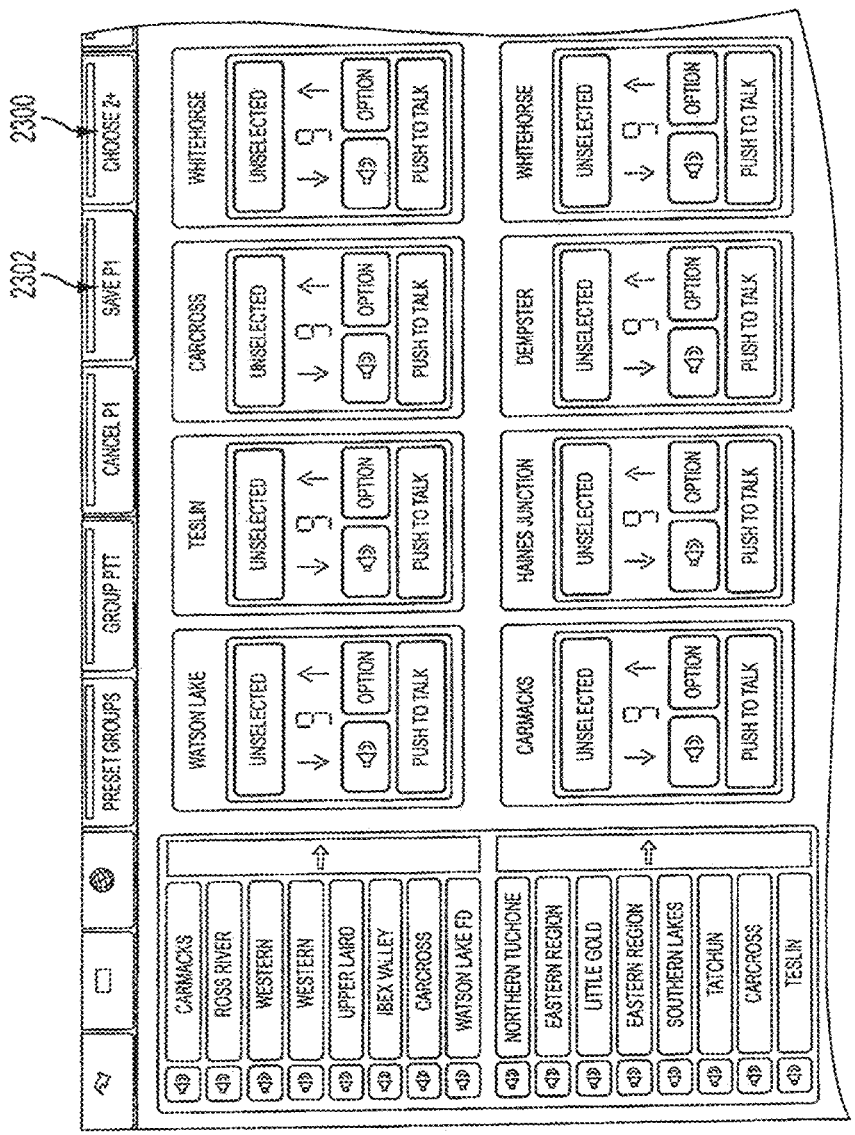
FIG. 23 is a view of GUI behavior when an empty patch is selected.
Figure 24:
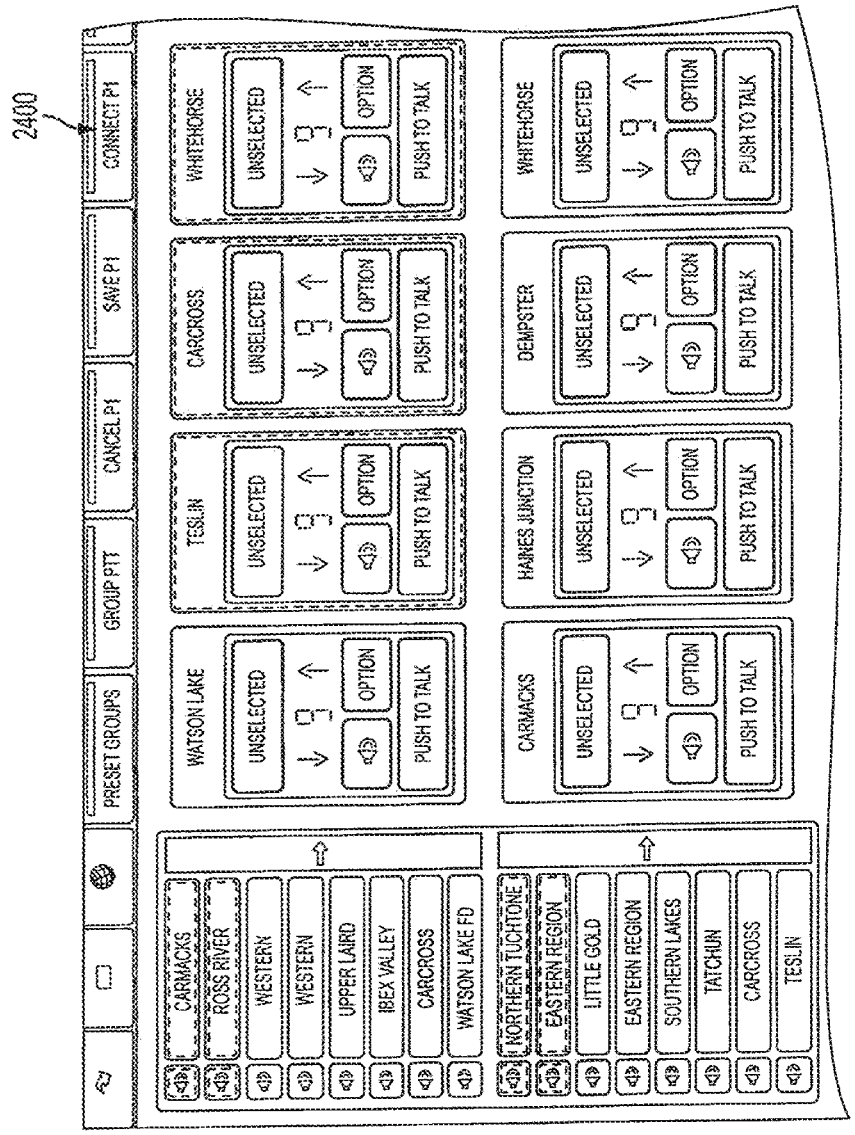
FIG. 24 is a view of GUI behavior when there is no conflict in patch selection, permitting saving or connection of the patch.
Figure 25:
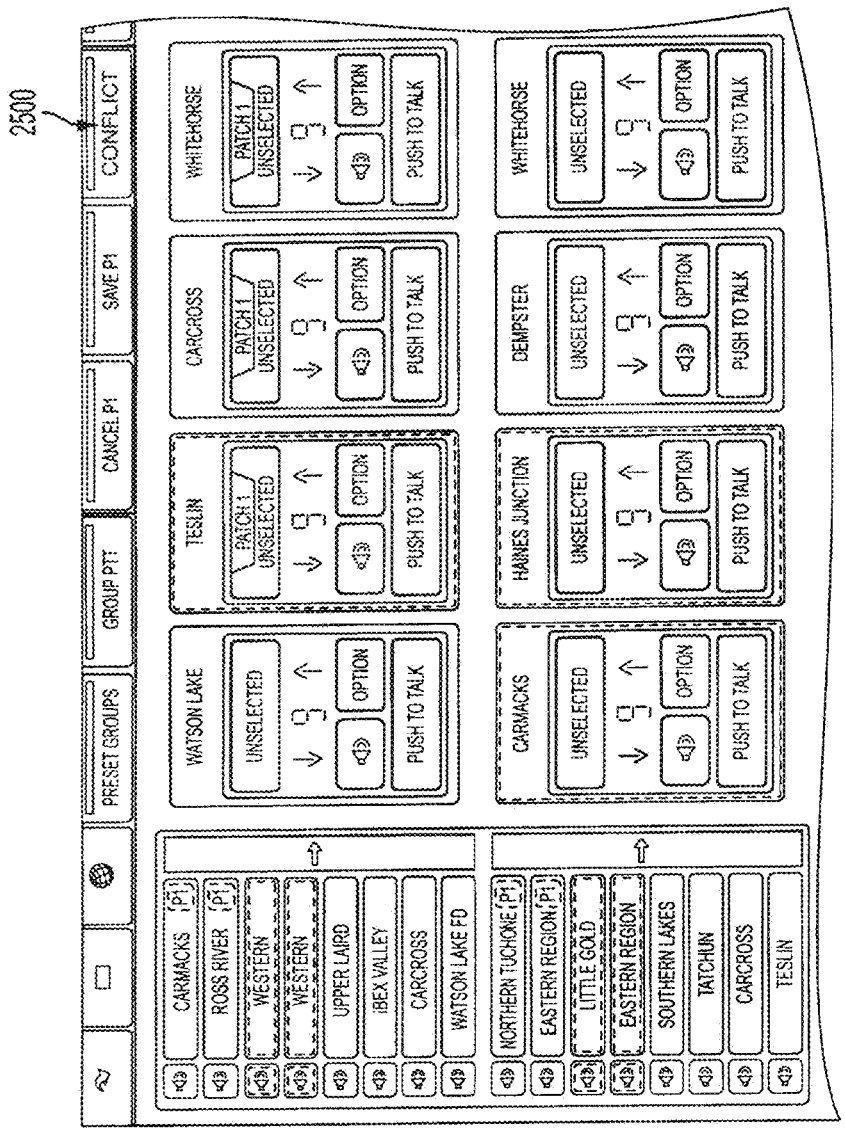
FIG. 25 is a view of GUI behavior when a patch is in conflict.

When a patch is selected that is empty, the screen illustrated in FIG. 23 may be displayed. Under this state, an operator needs to select at least 2 lines/TGs to be able to either save (e.g., via Save P1 button 2302) or connect the patch. Once more than 1 line is selected, the GUI Choose2+ button 2300 changes to either a connect button 2400, as illustrated in FIG. 24, or a conflict button 2500, as illustrated in FIG. 25. If any of the chosen lines are not already in an active patch, this new patch can be saved as well as be connected. However, if at least one of the selected lines is already in active patch, this new patch can be saved but cannot be activated, in certain embodiments. In the example in FIG. 25, since the line "teslin" is already active in patch 1, patch 2 cannot be connected, but it can be saved for future use. The lines in an active patch may have been created by this console or a remote console.

When a saved patch is selected, it allows the operator to add/delete lines to/from the patch and allows the operator to connect the patch if there is no conflict.

Figure 26:
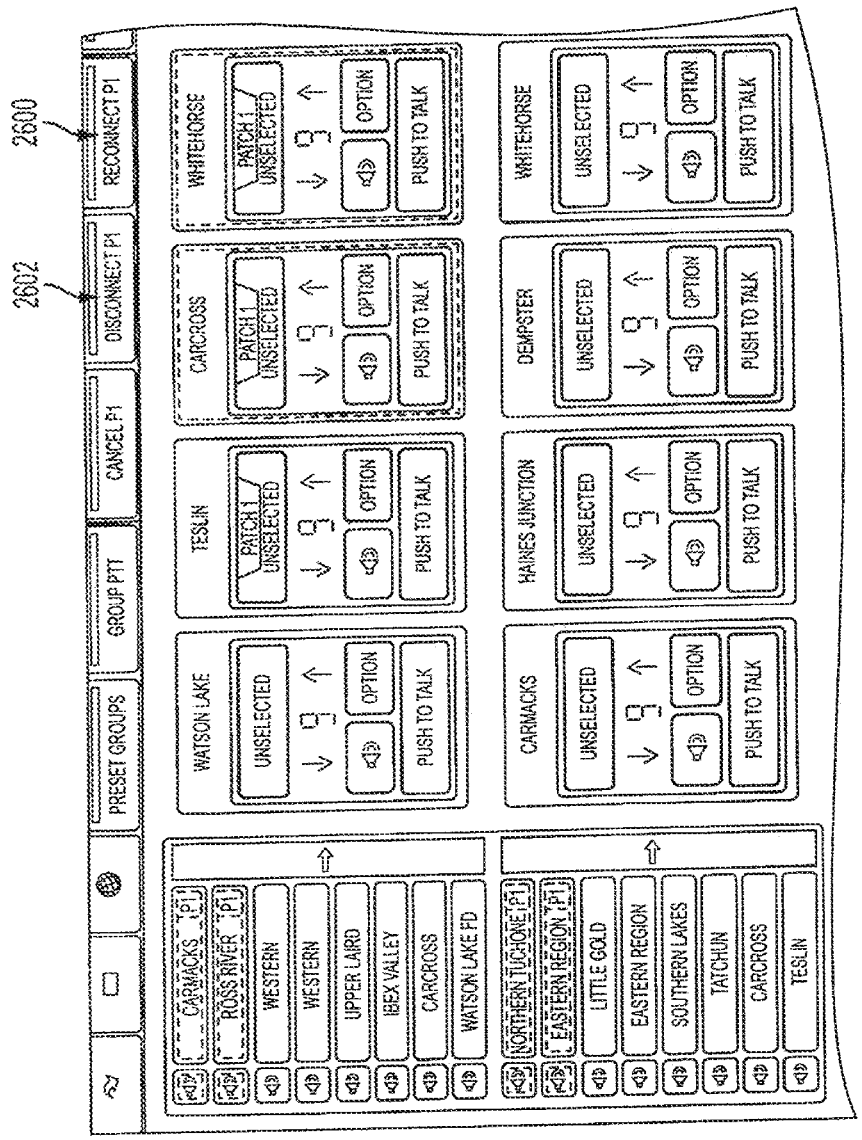
FIG. 26 is a view of GUI behavior during an active patch.

Referring to FIG. 26, when a patch is already active (connected), the operator can select the patch to either disconnect the patch or add more lines into the patch by pressing the reconnect button 2600. If the disconnect button 2602 is pressed, the patch can be deactivated. However the patch can still be saved. The patch can be saved until the operator logs out or the console is restarted. In some embodiments, there is no persistent storage of the saved patches.

If the operator adds more lines into the patch, the GUI can allow the operator to either disconnect the patch or to reconnect the patch. The reconnect button 2600 can add the new lines to the patch and activate the new patch. The reconnect button can change to a conflict button if there is any conflict of selected lines.

Another novel feature of some embodiments can be a telephone interconnect interface component 2700. For example, referring to FIG. 27, the console can support a telephone interconnect through a Telco Gateway. The Telco gateway can provide two telephone connections, in one embodiment, and thus enable the dispatch console to support two telephone interconnect lines. Each line can be separately maintained. The console can originate or receive a telephone call on each line and manage it separately.

Figure 28:
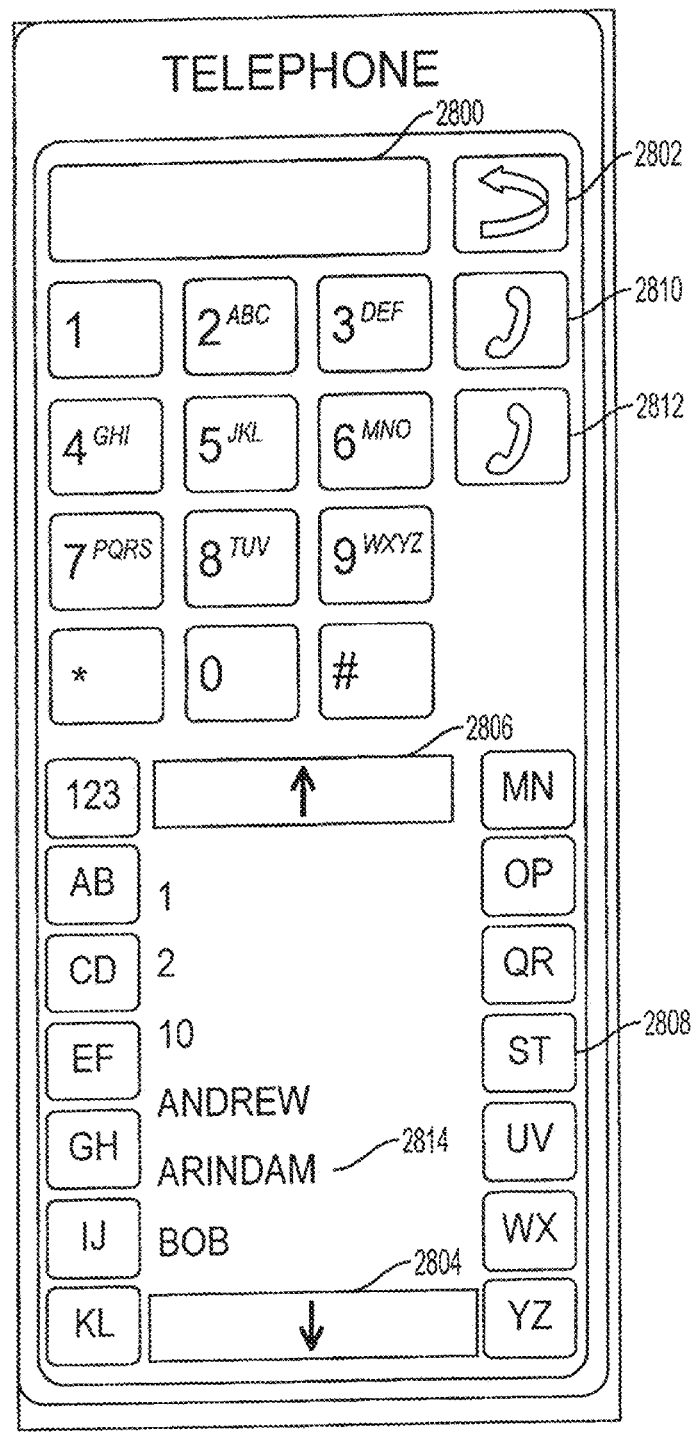
FIG. 28 is a view of a telephone interconnect dial pad.

For outgoing telephone calls, a console operator can originate a telephone call by pressing the Line button on one of the Telephone Interconnect lines. This component can open up a phonebook for the operator as shown in FIG. 28. The phonebook can provide:
1. A dial pad to allow the operator dial a number;
2. An address book to dial a preprogrammed address;
3. A dial button;
4. A hangup button to cancel the call and return.

A dial pad provided in some embodiments is shown in FIG. 28:
Dialpad allows the operator to dial a telephone number to dial out;
Digits are displayed as dialed in the digit display area 2800;
The undo one digit button 2802 deletes the last dialed digits;
Address book is an alphanumeric list of predefined phone numbers that are in sorted order of selectable names 2814;
The scroll down button 2804 and scroll up button 2806 moves the address book one page up or down at a time;
The alphabetic search button 2808 takes the operator to the start of the corresponding address set;
The dial button 2810 dials the digit out;
The hang up button 2812 ends the call and returns to the main screen.

Once the call is dialed, a ring back tone can be played to indicate to the operator that the call is being dialed. If the remote party accepts the call, the call can move to an active state; otherwise, the call can be disconnected. If a call is received while the operator is in the dial pad, the dial pad can be exited to allow the operator to answer the received call.

Figure 30:
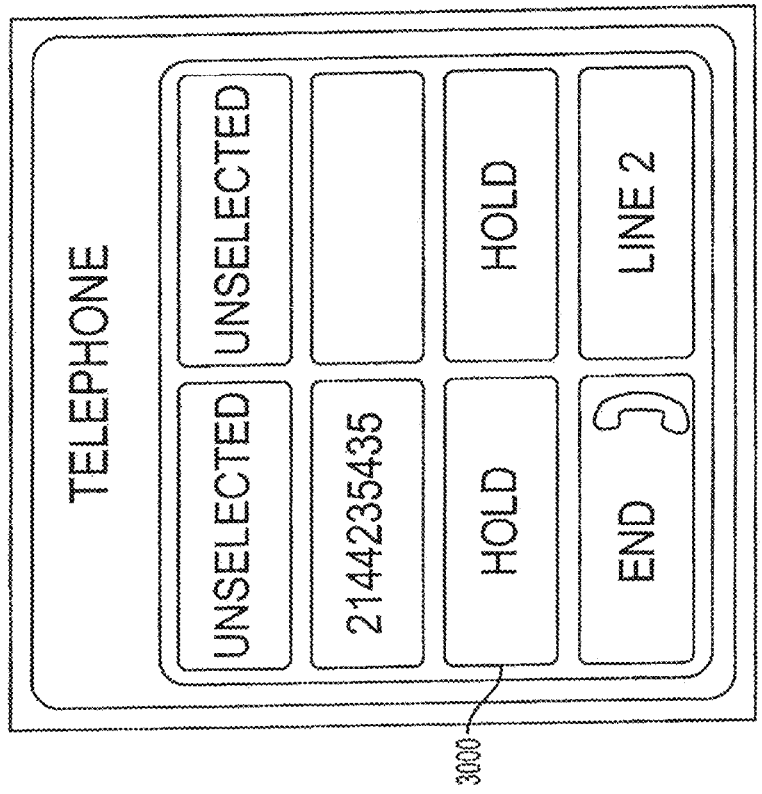
FIG. 30 is a view of GUI behavior when a call is answered.
Figure 29:
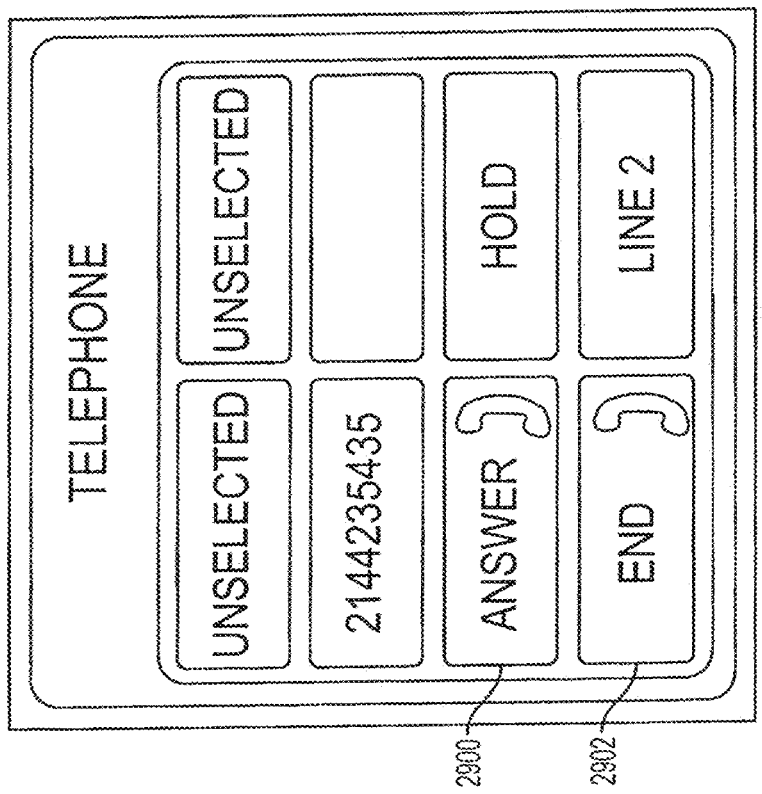
FIG. 29 is a view of GUI behavior when a call is received.

Referring to FIG. 29, when a telephone call is received, the Telephone GUI can provide an audible and visible indication of an incoming call. In addition, it can display the Caller ID/alias, if available. A user can either answer the call by pressing an answer button 2900, or reject it by pressing an end button 2902. Referring to FIG. 30, if the call is answered, the call can move to an active state, in which a hold button 3000 replaces the answer button.

The operator also has the option to:
1. Disconnect the call. —Disconnects and returns to the original screen.
2. Put the call in hold position. Under this condition the call is put on hold and neither party in the call can listen to each other.

Figure 31:
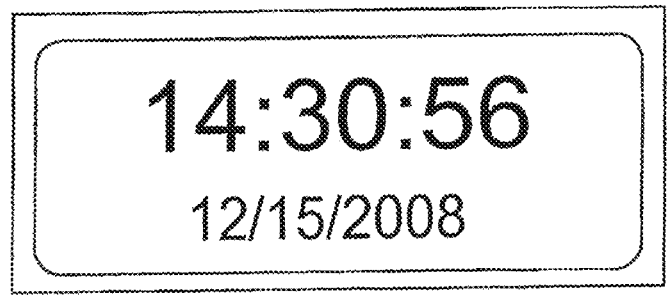
FIG. 31 is a view of a digital clock of the console GUI.

Referring to FIG. 31, a digital clock allows the operator to display current date and time in a digital format on the console. The digital clock can be clicked to change the time format from 12 hours to 24 hours.

Figure 32:
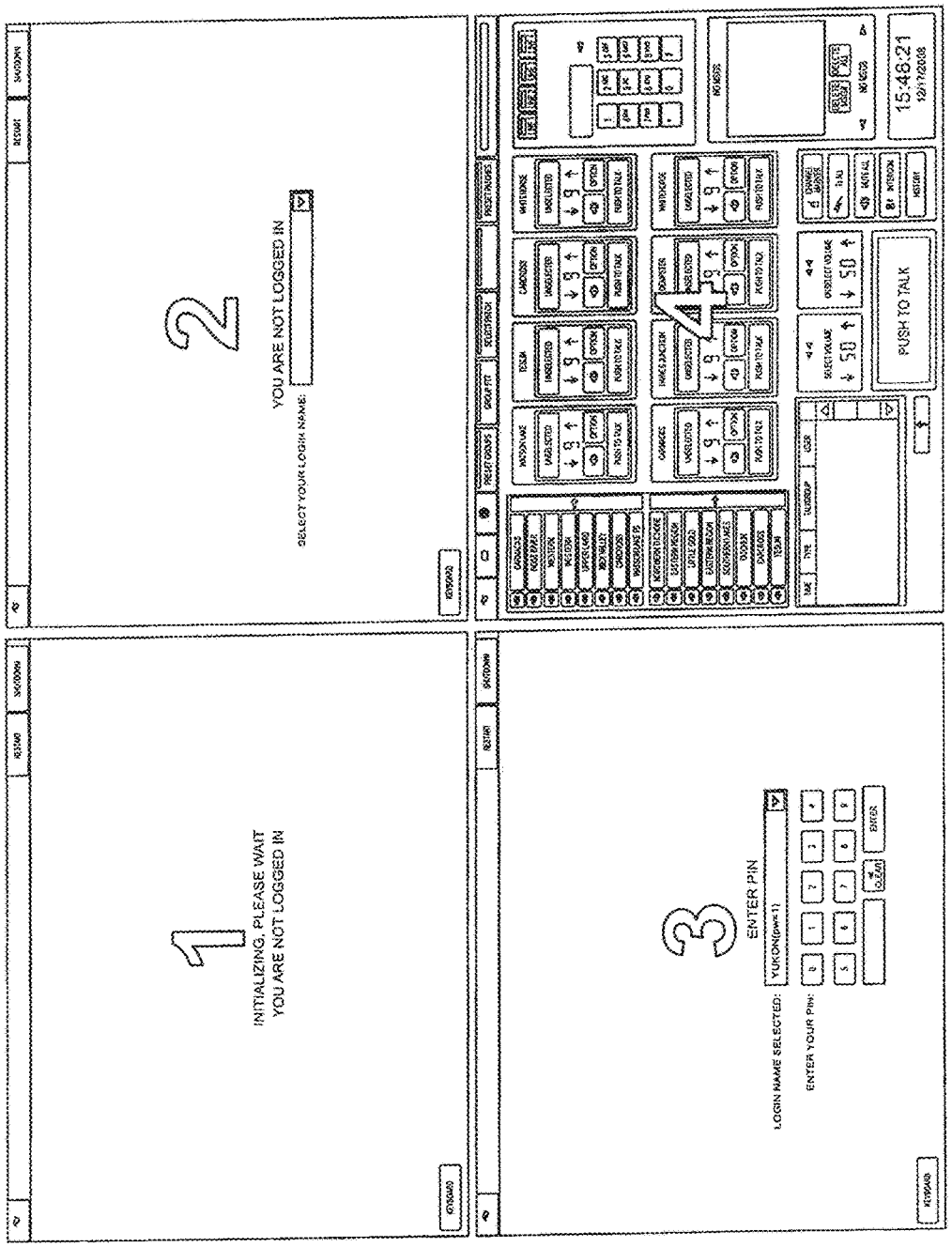
FIG. 32 is a view of a series of initialization screens for the console GUI.

FIG. 32 shows a series of initialization screens that can be displayed when the console is starting up. When the console is starting, it initializes as shown in screen 1. Post initialization, the console moves to screen 2. At this point an operator can chose a username from a drop down menu and enter the password from the onscreen keyboard. Once entered, the basic console screen comes up as shown in screen 4.

In some embodiments, a Console configuration tool (CCT) is a web based tool that can be used to configure a console position. The console configuration tool can be a standalone tool that can be run, for example, on a Windows or Linux machine. It is envisioned that, in some embodiments, one instance of this tool can be used to configure all consoles within the system.

- The CCT can be a web based application that is used to generate the appropriate running configuration files that are needed by the console.
- The running configuration can be read by the console on boot and determine the console's operation and behavior.
- The CCT can run on any computer and is accessed through a web browser.
- The CCT can be separated into different pages that configure specific parts of the console system.
- Once the configuration data is entered, it can be stored in a local file on the hosting computer's hard drive.
- After configuration, the configuration tool can generate and distribute the console configuration files to all consoles on the system.

In some embodiments, the CCT software:

- Allows a System Administrator to configure multiple consoles per system;
- Creates the configuration files needed for the consoles to function; and
- Allows additional consoles to be added to an existing system.

Figure 33:
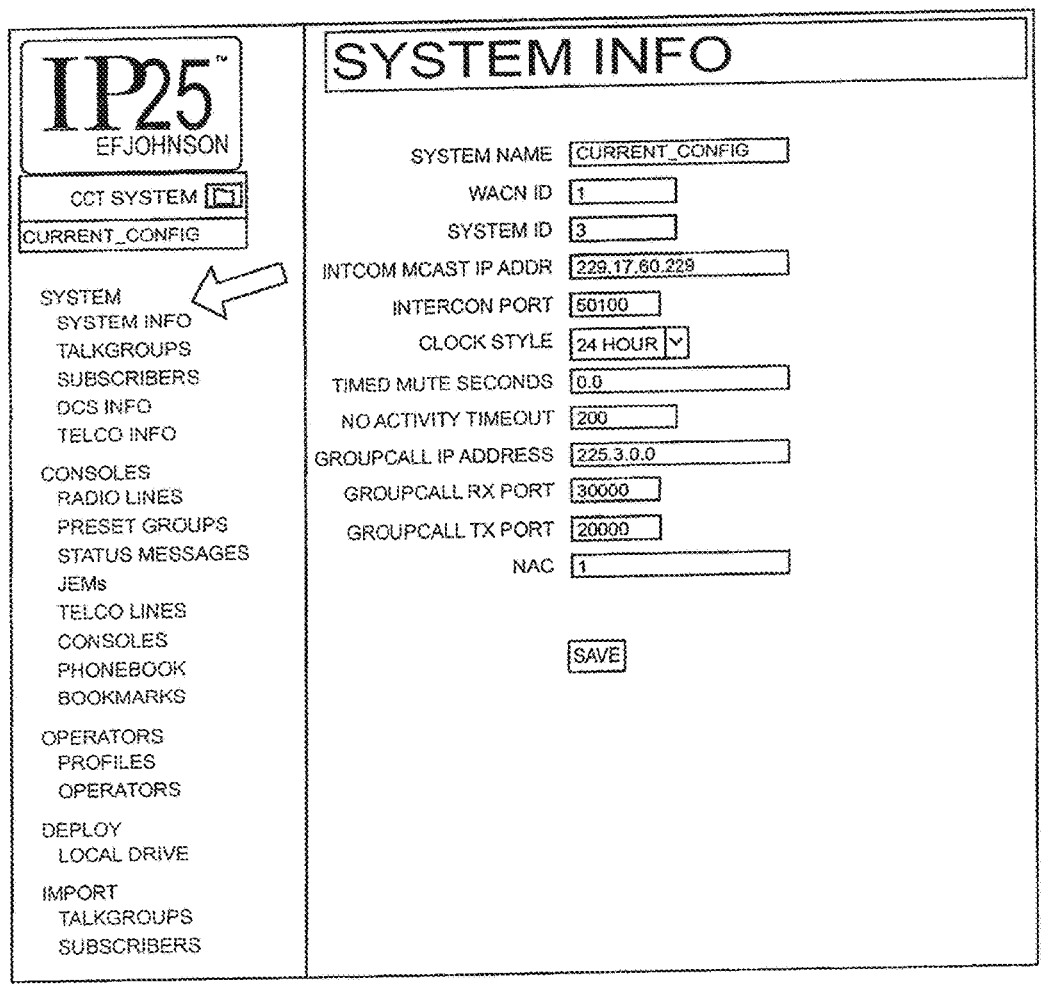
FIG. 33 is a view of a system level configuration page for a configurator tool employed to set up portions of the LMR network and/or dispatch consoles.

Referring to FIG. 33, a system level configuration page allows a user to configure different sets of configurations. The configuration components are easily accessible from a left side menu. Example components include:

- System Name—A name assigned to a system. Any text string.
- WACN ID—WACN Id of the system
- System Id—System Id of the system
- Intercom Mcast IP Addr—Multicast IP address used by a console position to communicate with other parallel console positions in the system using intercom.
- Intercom Port—UDP port used by a console position to communicate with other parallel console positions in the system using intercom.
- Clock style—indicates the digital clock displayed on the console positions should be in 12 hour format or 24 hour format.
- Timed mute seconds—provide how long a line should be muted if timed mute is activated. A value of zero indicates infinitely.
- No activity timeout—Indicates how long a console should display receiving a call, following a receive call inactivity.
- Group Call IP Address—provides the base address for multicast address used for TG communication. The last two bytes of this address is used in combination of TG ID to create a specific multicast address per TG.
- Group Call RX Port—indicate the port that console listens to for an incoming call from a P25 radio system.
- Group Call TX Port—Indicates the port that console transmits on for an outgoing call to the P25 radio system.
- NAC—the network access code for the system.

Figure 34:
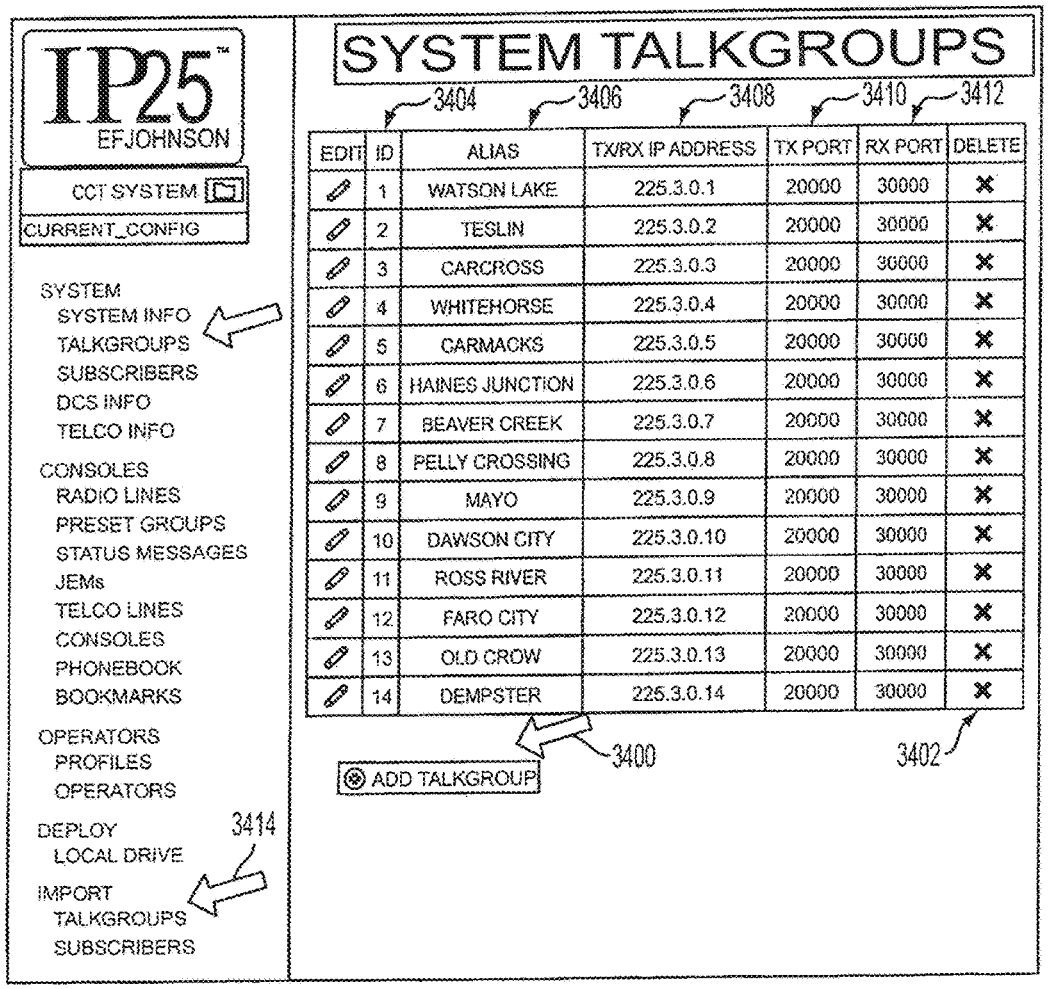
FIG. 34 is a view of a system talk group page for a configurator tool employed to set up portions of the LMR network and/or dispatch consoles.

Turning to FIG. 34, a system TalkGroup page allows use to add new TalkGroups or delete old TalkGroups. New TalkGroups can be added by clicking the add TalkGroup button 3400. Old TalkGroups can be deleted by clicking the delete button 3402 next to each of the TalkGroups.

The primary parameters added per TalkGroup are the TalkGroup Id 3404 and TalkGroup alias 3406. The other fields in a TalkGroup record, such as Multicast address 3408, TX port 3410, and RX port 3412 can be automatically calculated and displayed for information purpose only.

If there is a large set of TalkGroups involved and the system already has a network management system (NMS), the TalkGroups can be exported from the NMS and imported into the CCT. The import-subscriber link 3414 is used to import an external set of TalkGroup records.

Figure 35:
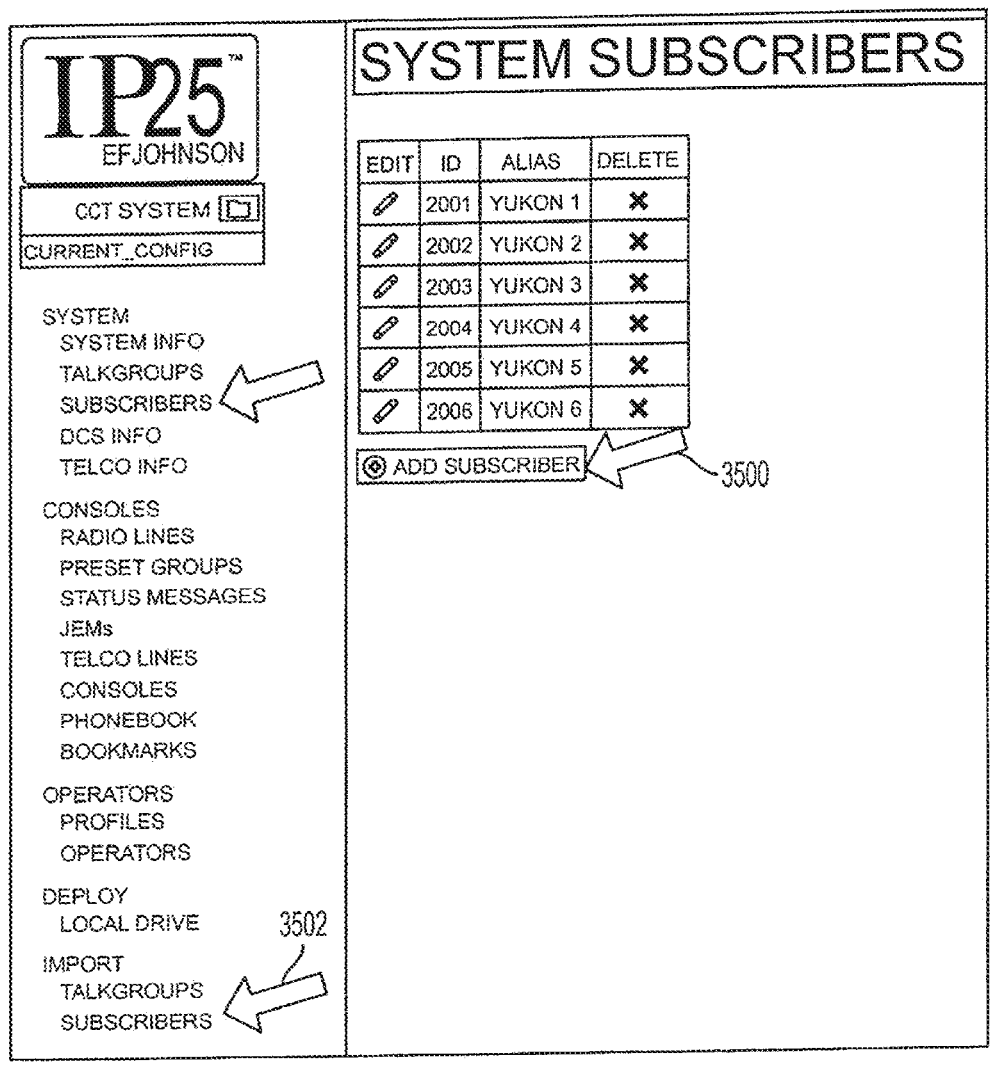
FIG. 35 is a view of a subscriber page for a configurator tool employed to set up portions of the LMR network and/or dispatch consoles.

With reference to FIG. 35, a subscriber page allows a user to enter a radio subscriber id and corresponding alias by interacting with button 3500. This information is used by the console to display a user alias when a call is received from the user. Similarly to the TalkGroup page, this information can be exported from the NMS and imported into the console by link 3502.

Figure 36:
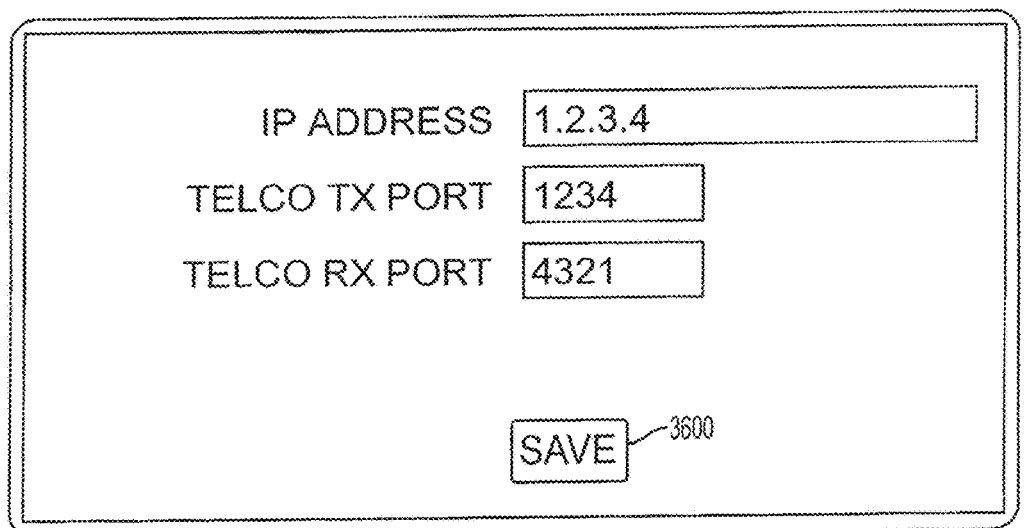
FIG. 36 is a view of a Telco information configuration component for a configurator tool employed to set up portions of the LMR network and/or dispatch consoles.

Referring to FIG. 36, another configuration component lets a user configure Telco information by entering an IP address, a Telco TX port, and a Telco RX port in fields provided. This information can be saved by the user pressing button 3600. This gateway can be used for making telephone calls by the telephone interconnect described above.

Console positions can be configured in a hierarchical fashion. In some embodiments, they can be configured as a combination of system level TalkGroups, Radio Lines, JEM II hosts, Telco GWs, Profiles, console position, and operator. The following sections describe the hierarchy for a better understanding. The console GUIs for each of these sections are fairly intuitive.

Figure 37:
FIG. 37 is a system diagram for a system composed of talk groups.
Figure 38:
FIG. 38 is a system diagram for a system composed of JEM IP addresses.
Figure 39:
FIG. 39 is a system diagram for a system composed of Telco gateways.

Referring to FIG. 37, a system can be composed of a set of TalkGroups. Referring to FIG. 38, a system can be composed of a set of JEM IP addresses. The JEM IP address indicates the IP address where the JEM II hosts are running. Referring to FIG. 39, a system can be composed of a set of Telco GWs. These GWs can be used to connect to the Public Switched Telephone Network (PSTN). Referring to FIG. 40, a system can be composed of a set of radio lines. In some embodiments, each radio line can be associated with a maximum of 10 TGs with one TG as a default. Each radio line can also be configured with maximum and minimum volume level.

Referring to FIG. 41, a system can be composed of a set of profiles. Each profile can provide a different GUI look and feel and the TGs associated with each channel panel in the GUI. In some embodiments, each profile can be composed of a maximum of 24 lines. The profile provides a way of creating a specific console configuration for an operator, in which the configuration is made up of a set of radio lines.

Figures 42, 43:
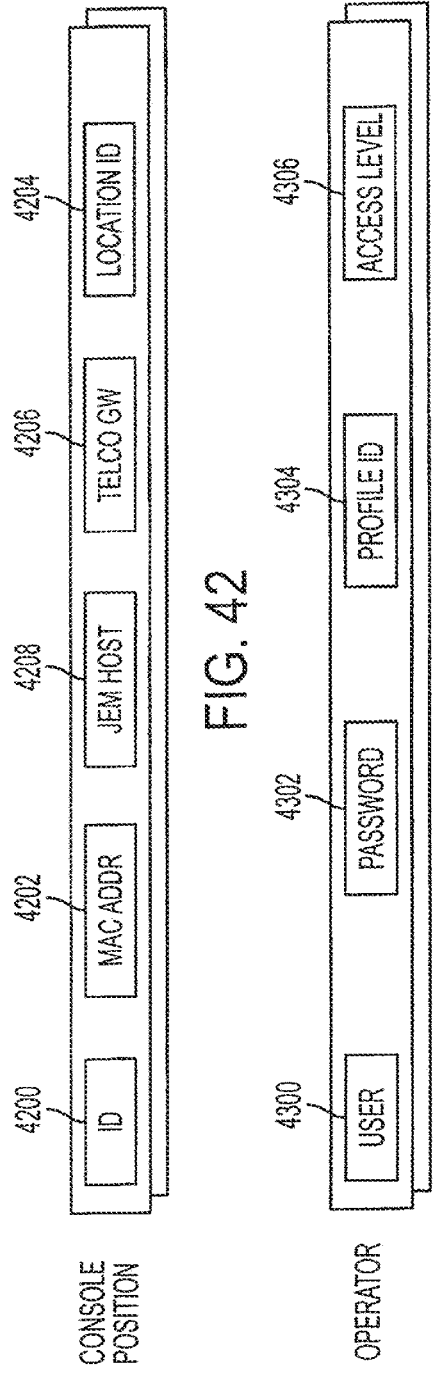
FIG. 42 is a data diagram for a console position.
FIG. 43 is a data diagram for an operator.

Turning to FIG. 42, a console position can be tied to console hardware. A console position can be composed of an ID 4200, IP address 4202, and a location ID 4204. The position also can be associated with a Telco GW 4206 and a JEM host 4208. Typically, each physical console position can be identified as a console. The ID of the console position can be used as a P25 user ID for every call that is placed by the console position regardless of the operator who has logged in. Each console position also can be provided with a location ID. The location ID indicates if two or more console positions are in the same location (typically same room) or different locations. In some embodiments, if two console positions are provided with the same location ID, they do not play each other's conversation. For example, if console 1 and console 2 have the same ID, when console position 1 places a call, the call is displayed on console 2, but the user sitting on console 2 does not hear the voice of console 1. This functionality can be useful when two operators are sitting next to each other and do not want the peer's voice to be played out on one's position.

Referring to FIG. 43, an operator can be composed of a user id 4300, a password 4302, a profile 4304, and an access level 4306. As a result, when an operator logs in to any console position with his user id and password, he gets a certain profile. This profile allows each operator to have a customized configuration regardless of his physical location. This functionality can be useful in shift change situations where an operator change occurs and a new operator gets his own profile. Access level 4306 defines the role of an operator as a regular user or supervisory user.

Figure 44:
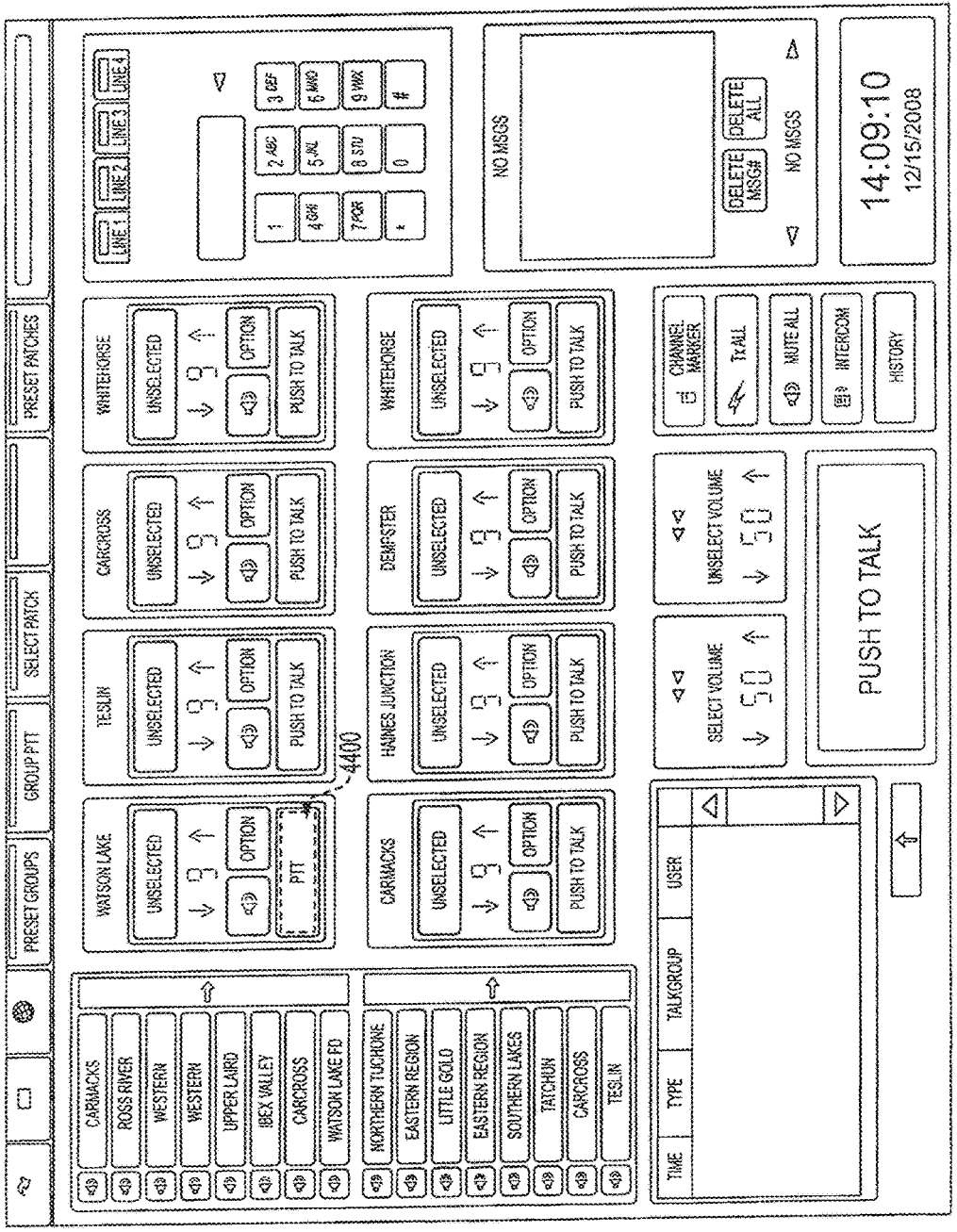
FIG. 44 is a view of GUI behavior upon activation of a PTT button for a talk group.
Figure 45:
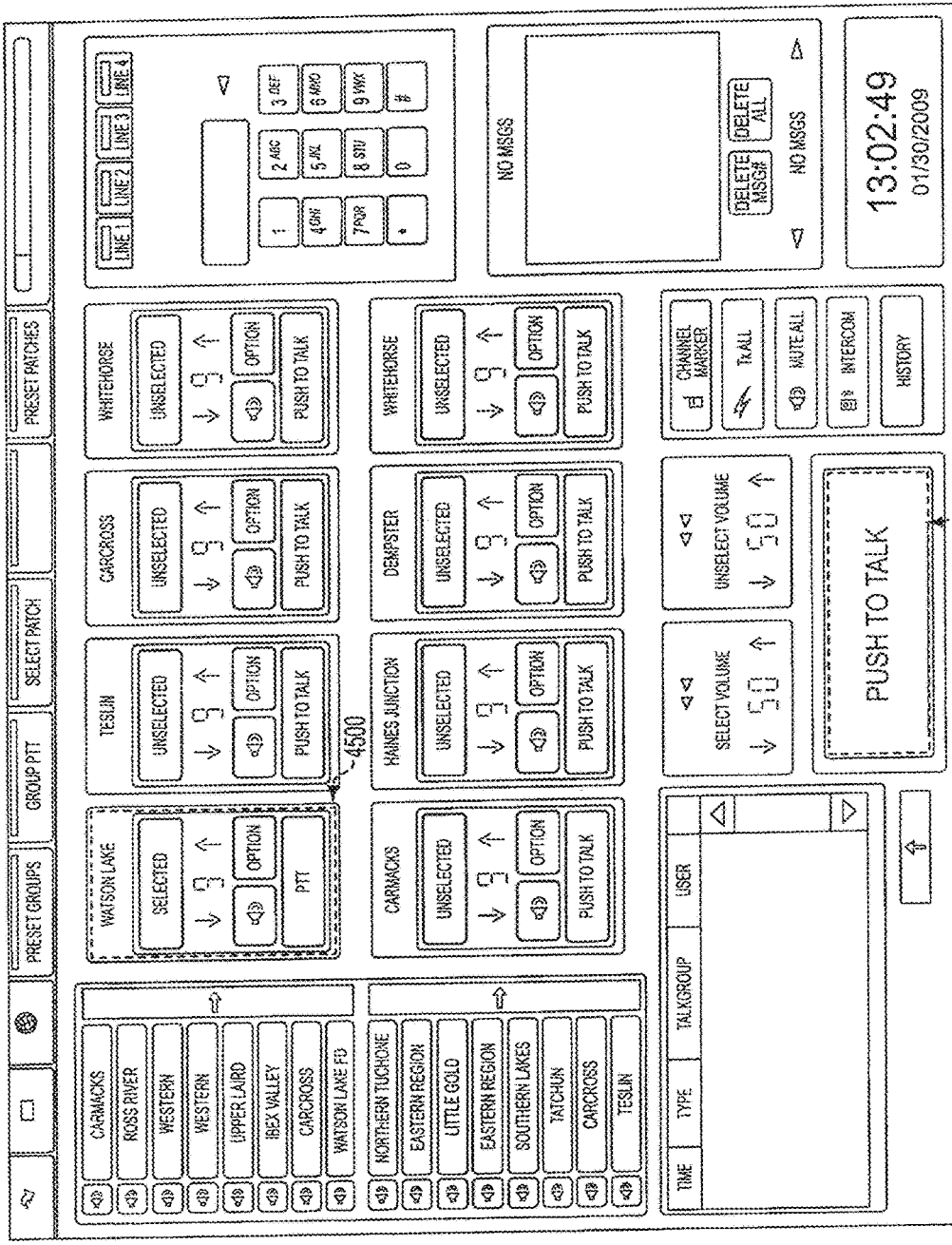
FIG. 45 is a view of GUI behavior upon selection of a talk group and activation of a main PTT button and/or footswitch.

Placement of group PTT calls is discussed generally with reference to FIGS. 44-45. In its non RTT/emergency mode, P25 group calls can be placed from the console through the main or side channel panel. A call can be placed on a TG line by clicking the line PTT button 4400 or selecting the TG 4500 and pressing the main PTT/foot switch. The PTT button 4400, talk group 4500, and main PTT button 4502 can become highlighted upon selection.

Figure 46:
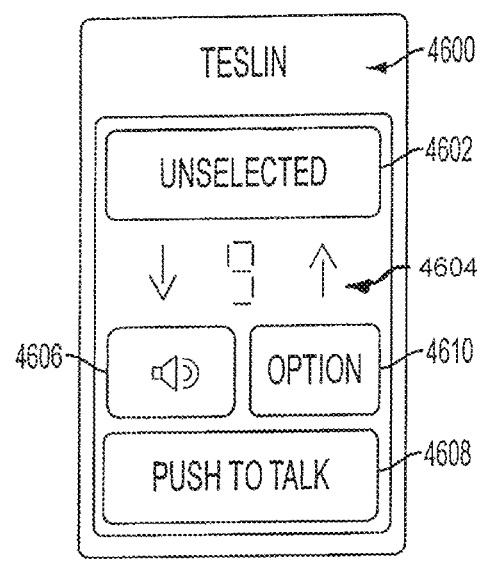
FIG. 46 is a view of a talk group window.

Referring more particularly to FIG. 46, a TalkGroup window provides the following controls.
1. TalkGroup Alias 4600—displays the alias of the TalkGroup.
2. Select/Unselect Button 4602—allows the operator to toggle between select and unselect speaker for this TG.
3. Volume control 4604—Allows the operator to control the volume at which he desires to receive a call on the TG.
4. Mute 4606—allows the operator to mute any voice received on the TalkGroup.
5. Push To talk 4608—Provides the ability for line PTT
6. Options 4610—Provides the ability for the operator to change the TG ID for this line, and also allows the operator to indicate if the call on this TG should be placed in clear mode or secure mode.

Figure 47:
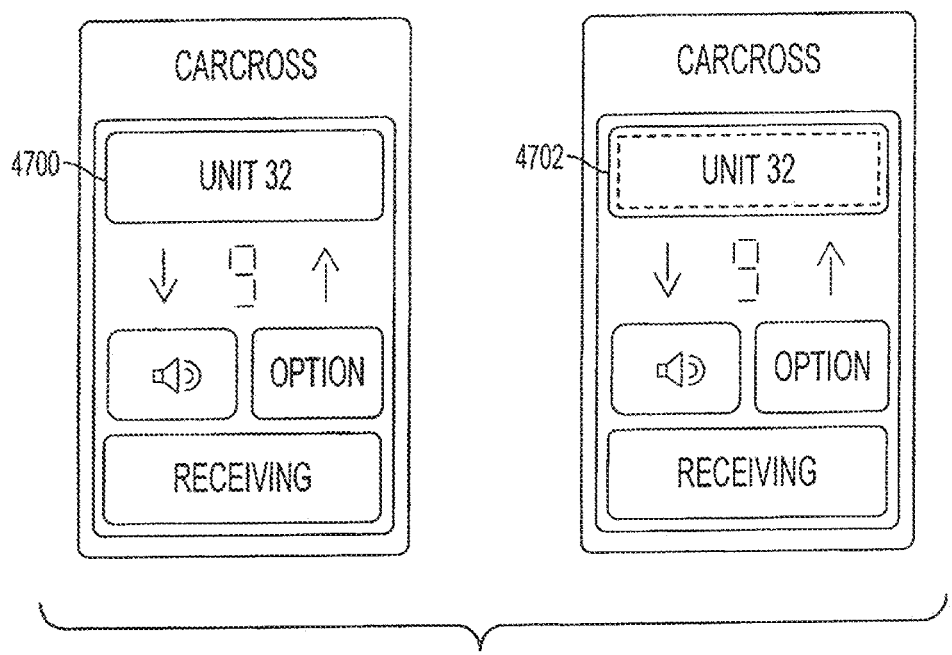
FIG. 47 is a view of talk group windows dynamically displaying different behavior.

Turning now to FIG. 47, each TalkGroup window can dynamically display different activity. When an un-selected TG receives a call, the corresponding TalkGroup window 4700 can flash a predefined color, such as green, or exhibit some other display property change. A window for a selected talkgroup can exhibit a different display property. For example, when a selected TG receives a call, the corresponding TalkGroup window can flash green while the internal window 4702 can display another color, such as yellow, to indicate that it is selected.

Figure 48:
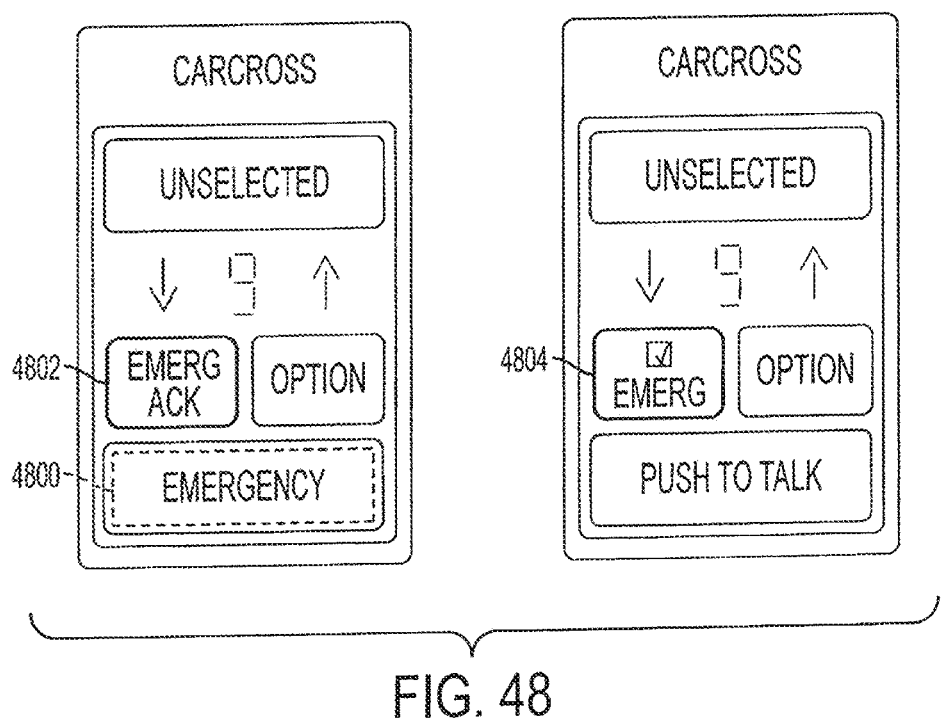
FIG. 48 is a view of talk group windows receiving and acknowledging an emergency.

Referring now to FIG. 48, when an emergency is received, it can also be displayed in the main channel panel. For example, an emergency notification icon 4800 can replace the PTT button, while the mute button can be replaced by a emergency acknowledge button 4802. The operators have the choice to acknowledge and clear the emergency from the emergency window or the main channel panel. Pressing the emergency acknowledge button 4802 changes that button into an emergency clear checkbox 4804 containing a check. Then, the operator can clear the emergency by removing the check from the checkbox 4804.

Figure 49:
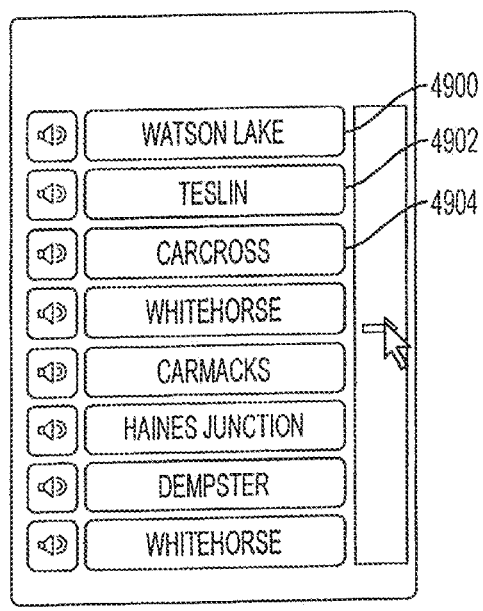
FIG. 49 is a view of a left channel panel.

Turning to FIG. 49, a left channel panel can display different functionality based on the activity on the TG. For example a selected talk group 4900 can display in yellow, a talk group receiving a call 4902 in green, and a talk group receiving an emergency 4904 in red. Here, pressing the main PTT button with this selection can place a call on the Watson Lake TG since that TG is selected from the left panel.

Figure 50:
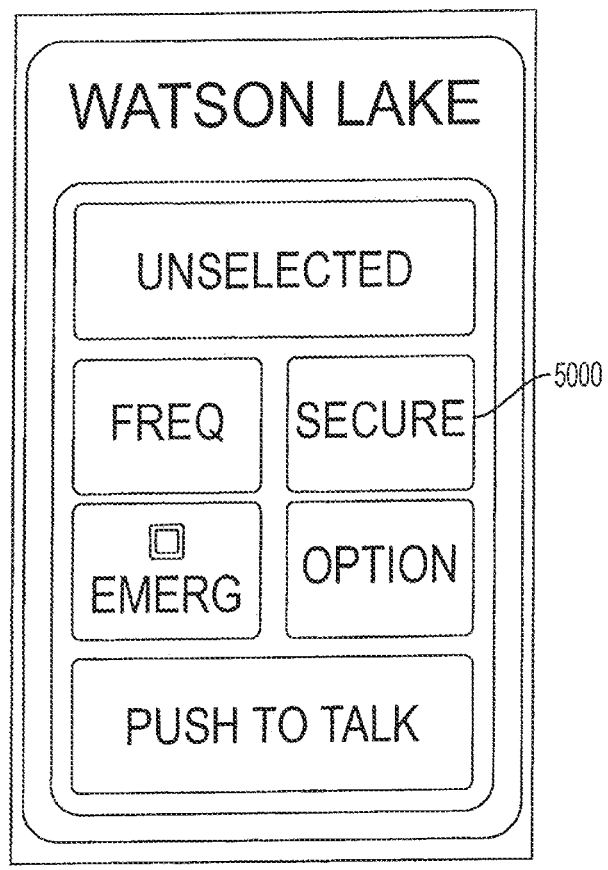
FIG. 50 is a view of GUI behavior upon selection of a clear/secure button.

Turning now to FIG. 50, a clear/secure button 5000 can allow the operator to place a call in clear mode or encrypted mode. When secure is selected and a call is placed, the call can be encrypted through the JEM. The SLN can be configured on a per TG basis in the system level, and the key corresponding to the SLN can be programmed in the JEM card. Some embodiments of the console support encryption only through the JEM II card and do not support internal DES.

Figure 51:
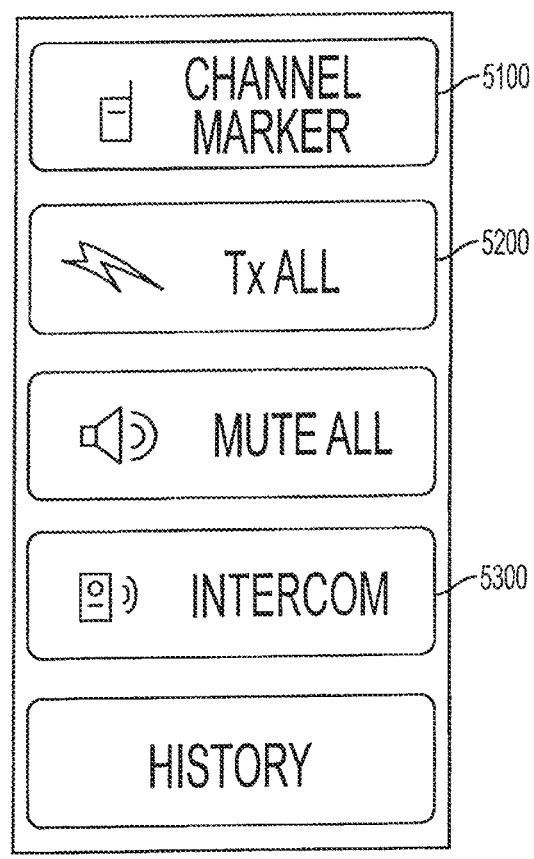
FIG. 51 is a view of an additional features panel.
Figure 52:
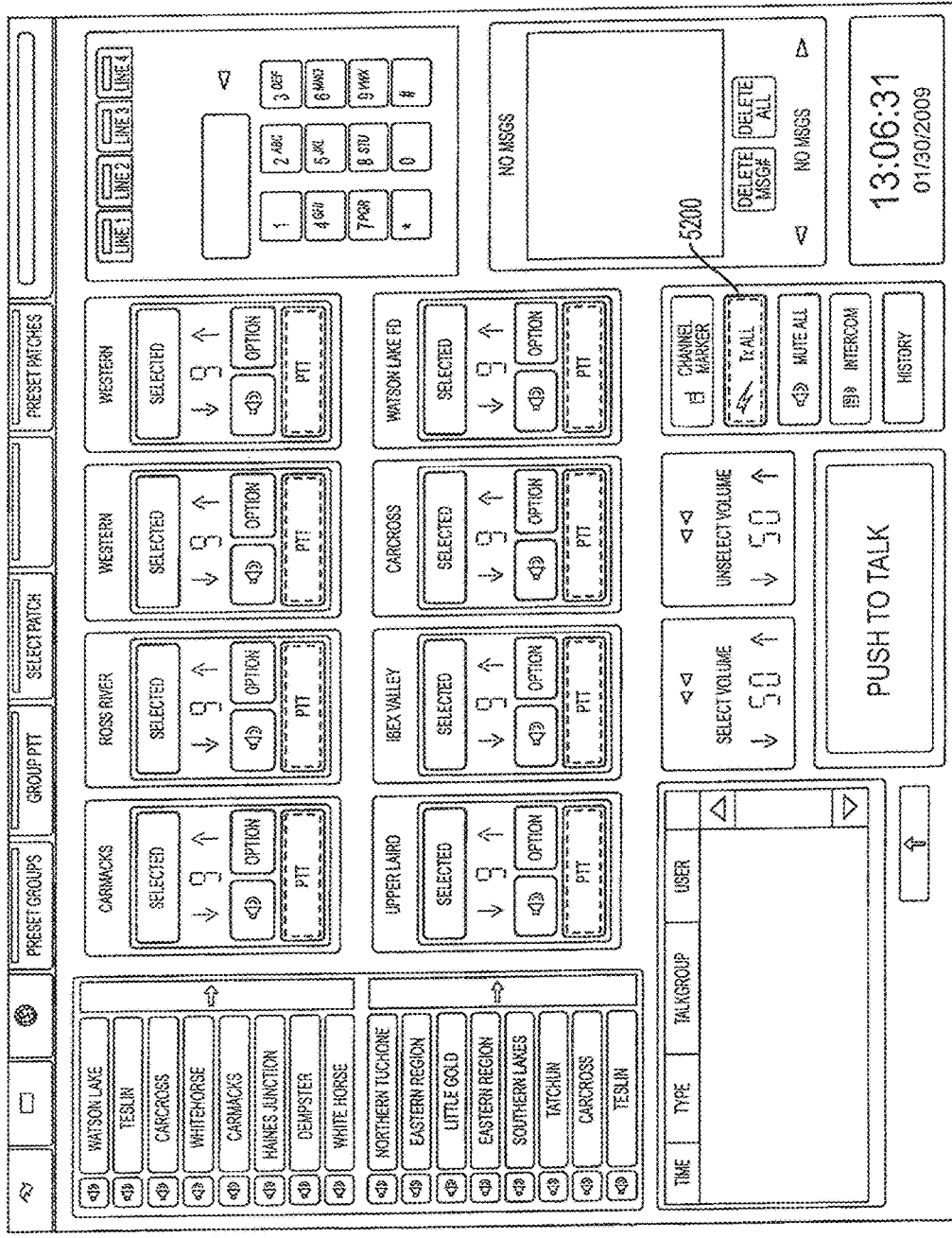
FIG. 52 is a view of GUI behavior upon selection of a TX All button.
Figure 53:
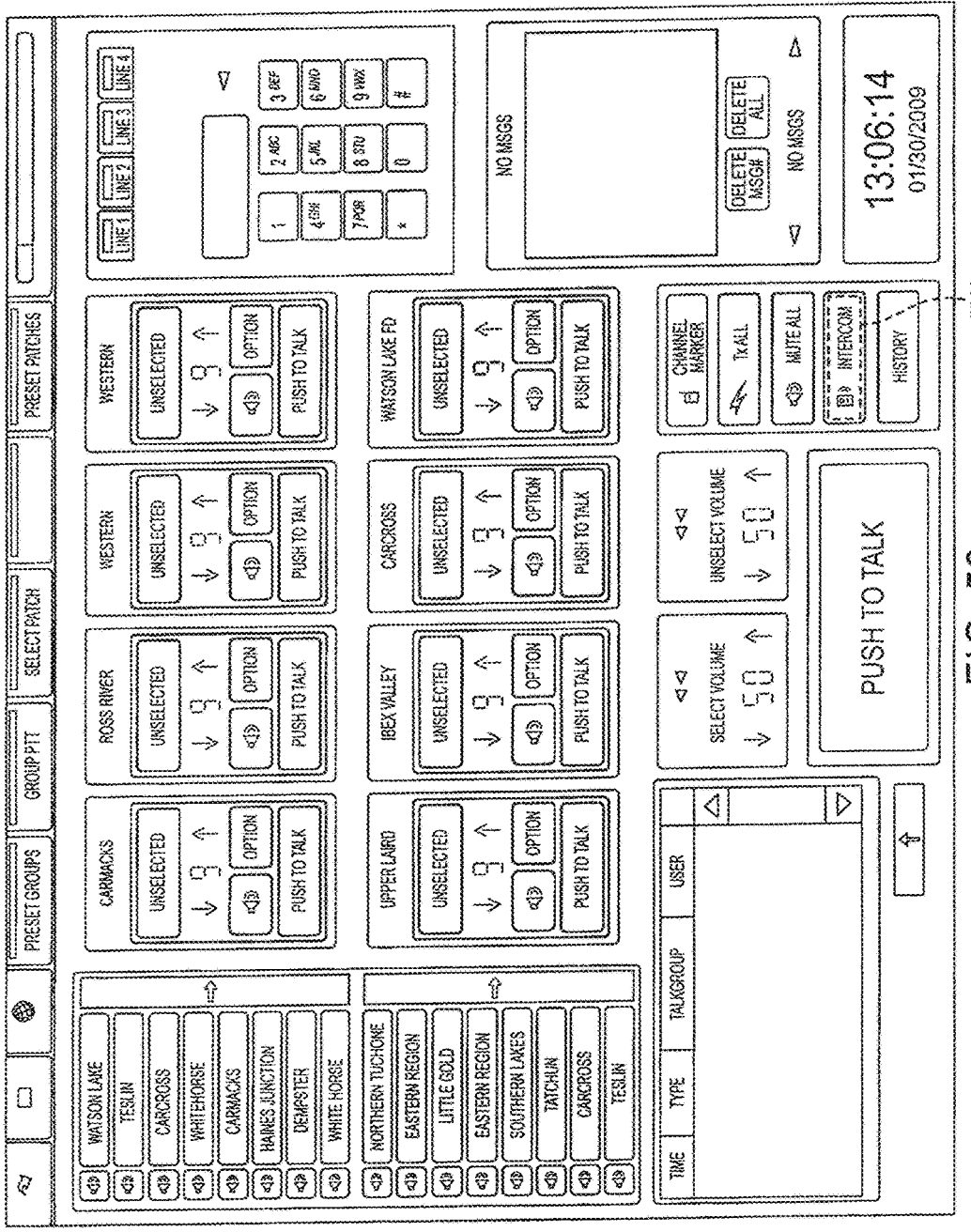
FIG. 53 is a view of GUI behavior upon selection of an intercom button.

Referring generally to FIGS. 51-53, a channel marker button 5100 can be a feature available for conventional only TalkGroups. When the channel Marker button is activated, the console can start a periodic timer. When the timer expires, the console can send a short tone on the selected TalkGroups. The tone can be sent out only if the console is not actively placing a call or receiving a call from a parallel console on the selected TalkGroup.

A TX All button 5200 can allow the operator to select all TalkGroups configured in the console position. Pressing the main PTT/Foot switch while the TX All button is activated can place a call on every configured talk group. Here, every talk group in the main panel and the side pane, together with the main PTT button, can exhibit a highlight or other display property, to indicate to the operator that they are all selected and that the main PTT function is active.

An intercom button 5300 can allow console operators to communicate with other operators without placing a TalkGroup call. For example, when an operator presses the intercom and talks on the microphone, the voice is received on all parallel consoles within different location ID, but not on the radios.

Figure 54:
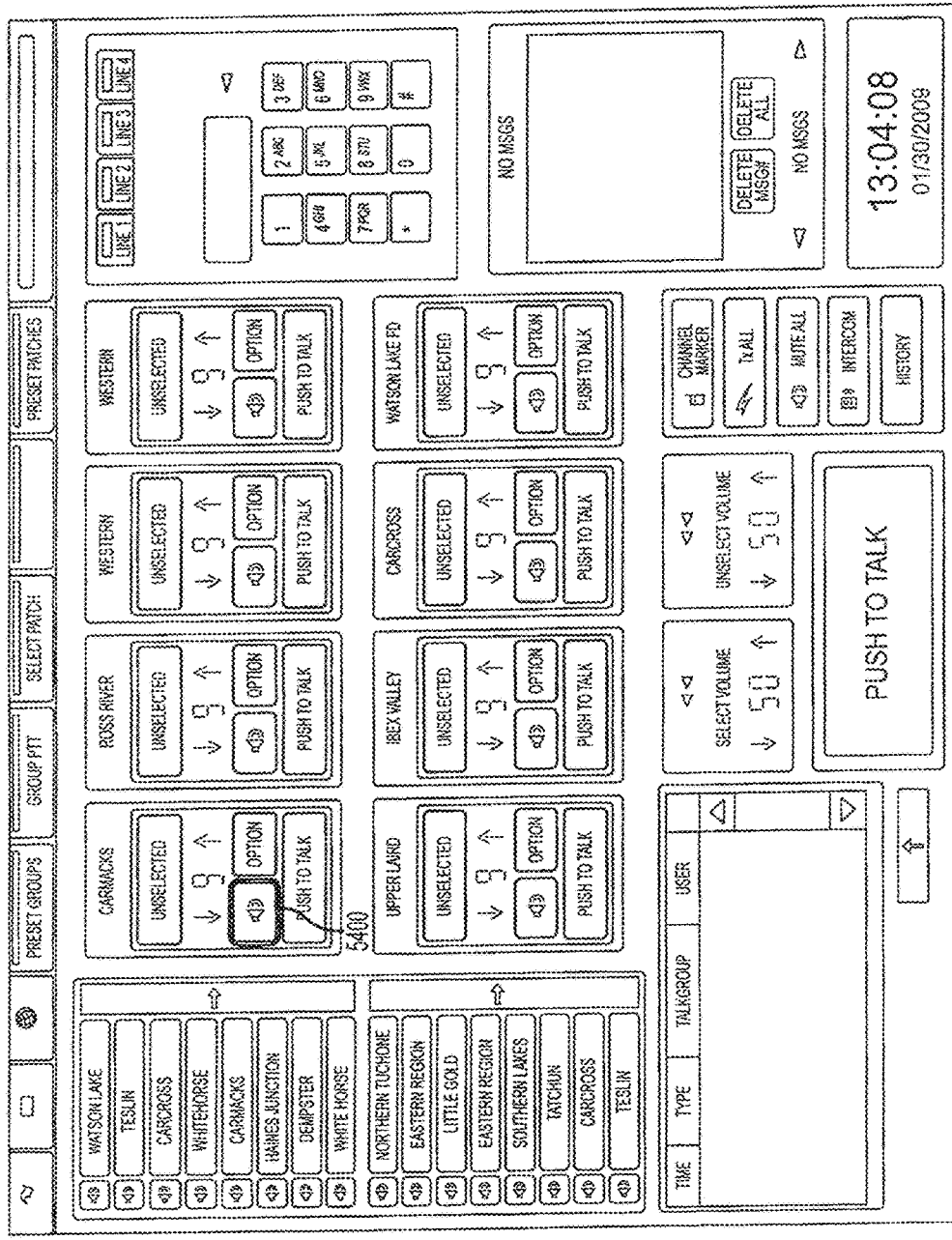
FIG. 54 is a view of GUI behavior upon selection of a mute button in an individual channel panel.

Referring to FIG. 54, a mute button 5400 can allow the operator to mute a particular TG line. For example, the operator can mute the line by clicking on the mute icon or clicking on the volume number. Clicking the button again can un-mute the line.

Figure 55:
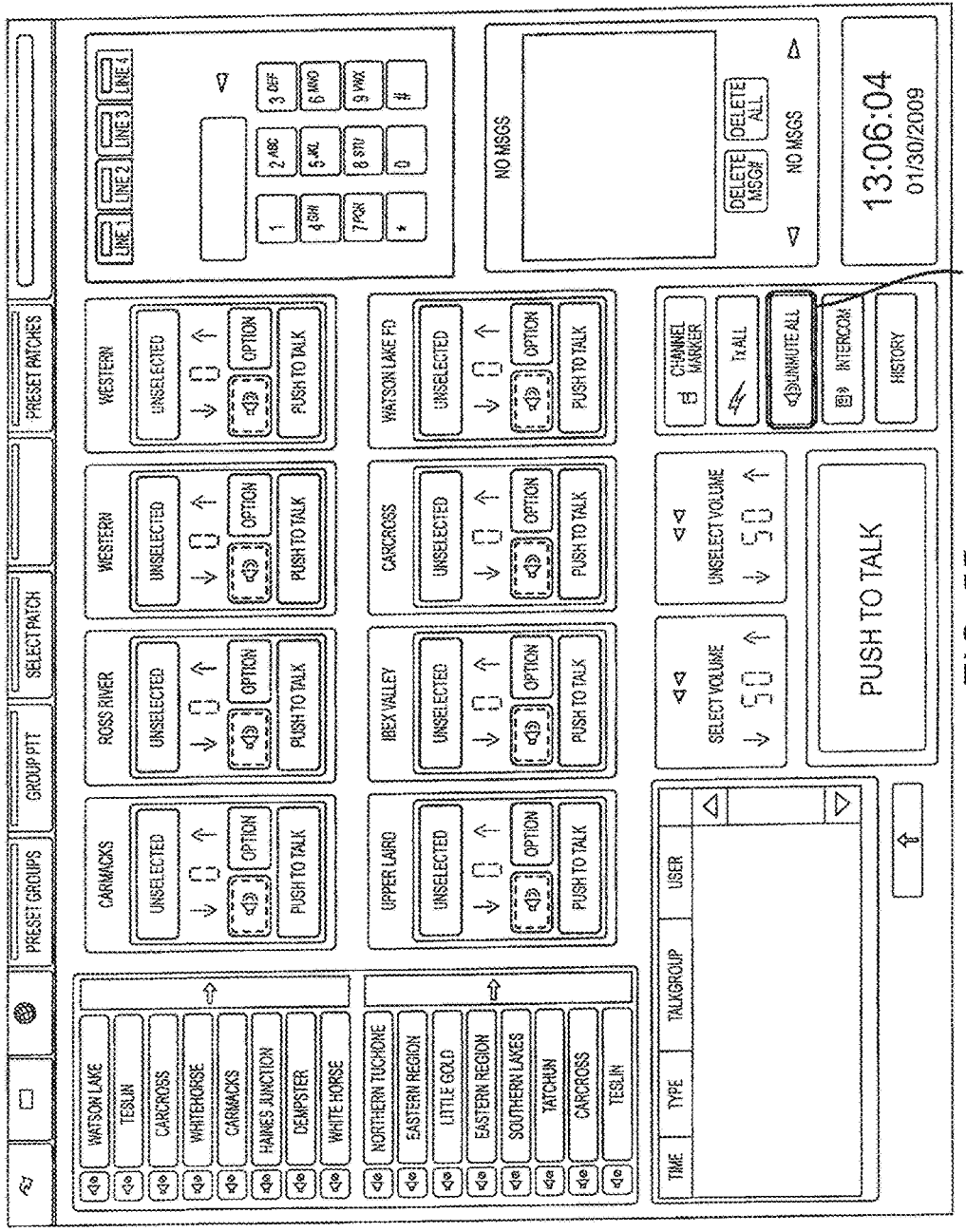
FIG. 55 is a view of GUI behavior upon selection of a mute all button.

Referring now generally to FIGS. 51 and 55, a mute all button 5500 can allow the operator to mute all TalkGroup Lines. Clicking the button again can un-mute all TalkGroup lines.

Figure 56:
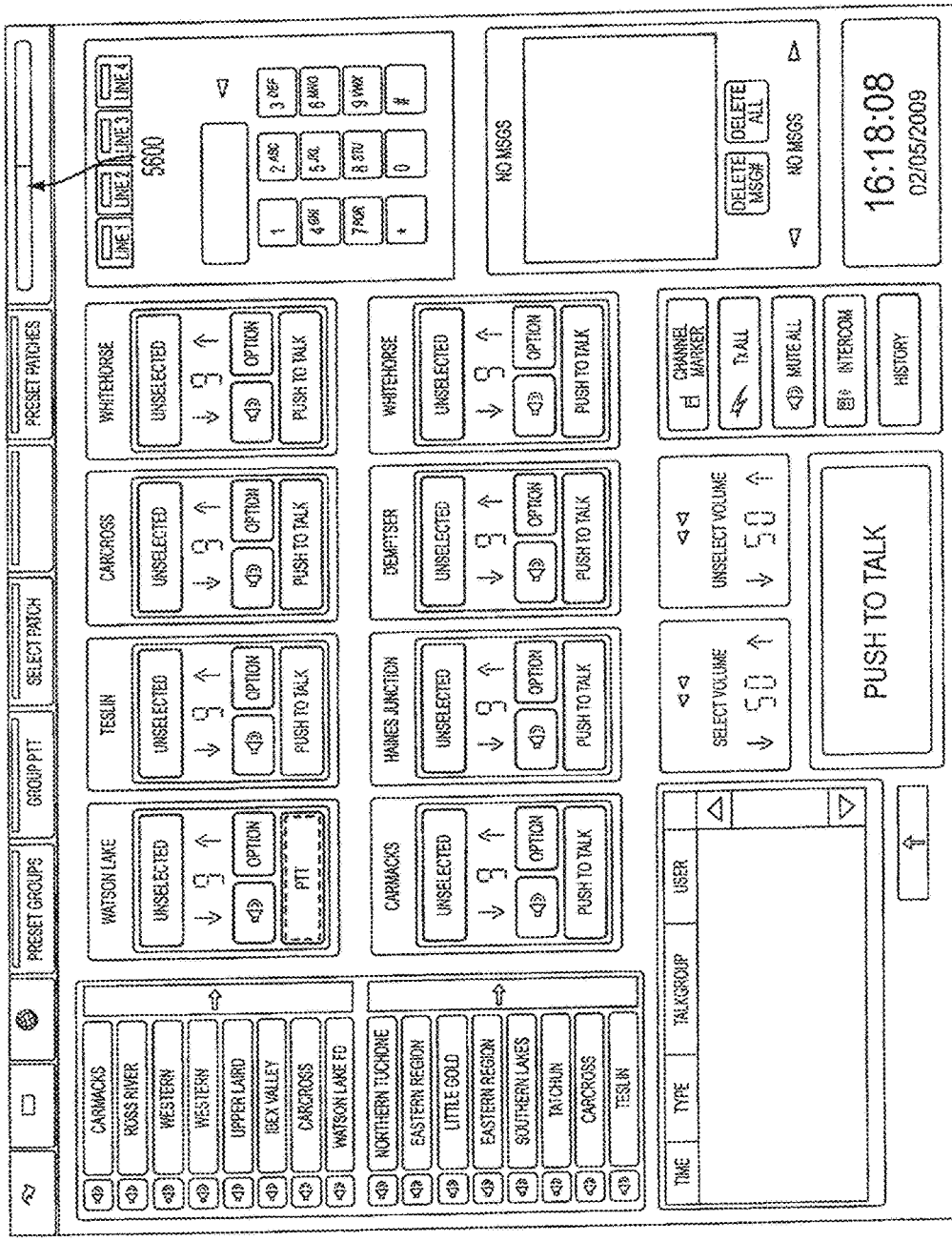
FIG. 56 is a view of a VU meter.

Turning to FIG. 56, a VU meter 5600 can indicate that the operator voice is placed on the network and is being delivered to parallel consoles and the radios. The length of the VU Meter can indicate the intensity of operator voice.

Figure 57:
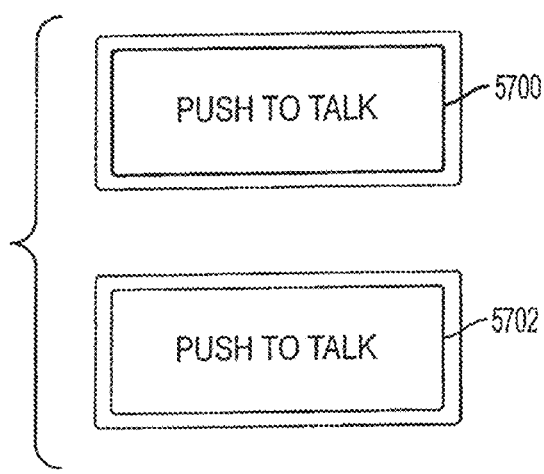
FIG. 57 is a view of GUI behavior upon selection of a main PTT button.

Referring to FIG. 57, a main PTT button can be tied to the foot Switch and all selected Groups. When none of the TalkGroups are selected, this button can be deactivated as at 5700. Selecting at least one TalkGroup can activate the button as at 5702.

Figure 58:
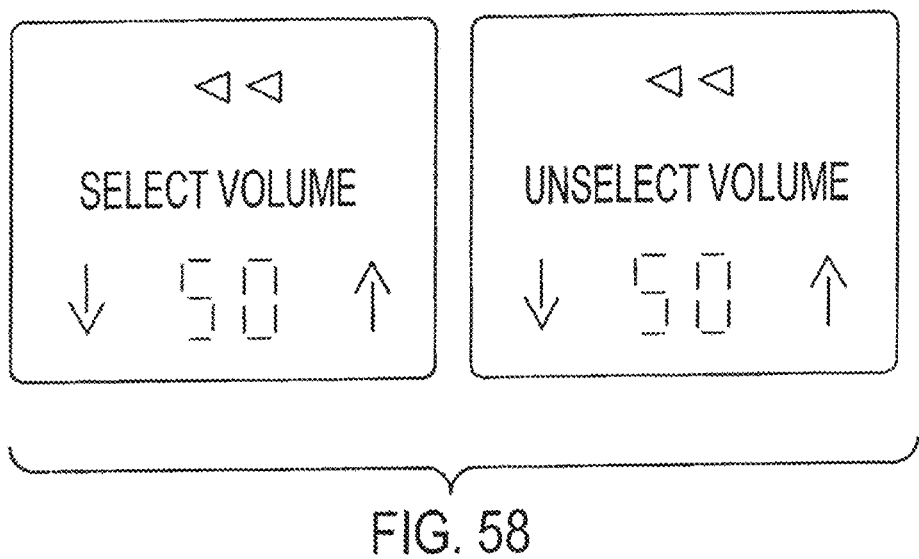
FIG. 58 is a view of main volume controls.

Turning finally to FIG. 58, a volume control can allow an operator to set the volume of selected or unselected speakers as a percentage of maximum speaker volume. An IRR feature can allow the operator to listen to recordings of received calls, the selected audio and the unselect audio. For example, calls made in the last 24 hours can be heard by pressing their entry from the call history list and pressing the play button, or double-clicking their entry. The double left arrows in the select and unselect volume boxes start playing the last 5 seconds of the selected or unselected audio respectively. It is envisioned that summed audio received on selected or unselected speakers can be played back instead of an individual call received (i.e., if three calls are received in the last 5 seconds on the unselected speaker, playing IRR unselect will play the summed audio of these three calls). In some embodiments, there can be approximately 25 minutes of selected recording and 25 minutes of unselected recording available.

While in playback mode, the unselected speaker can be used to listen to all three types of recording. For example, there can be 4 playback buttons that appear with an optional slider control. The buttons can be: move back 5 seconds, move forward 5 seconds, pause/play, and stop playback mode. When the slider is present, it graphically shows the operator's position in the recording and can be used to move rapidly back and forth by moving the slider indicator. In some embodiments, the slider can be absent when there is not enough room for it. For example, the slider can be absent when using the small call history list in the bottom left position.

In some embodiments, the IRR voice can be stored in-memory and not on hard disk. As a result, if the console is restarted, the IRR voice can be lost.

A status message can be generated from a radio subscriber and be received by all console positions. When a radio sends a status message, it can select one of several predefined status codes as configured in the radio. The status code can be received by the console positions, and the corresponding status message can be displayed on the console. The mapping between the status code and corresponding status message can be performed in the Configuration Tool. The console also can display the user alias (if known, otherwise user id) that sends the status message. The status message window can display only the last status message received. When a new status message is received the previous status message can be replaced and pushed into the history table. When a status message is received there can be a visual and audible indication provided to the operator.

Figure 59:
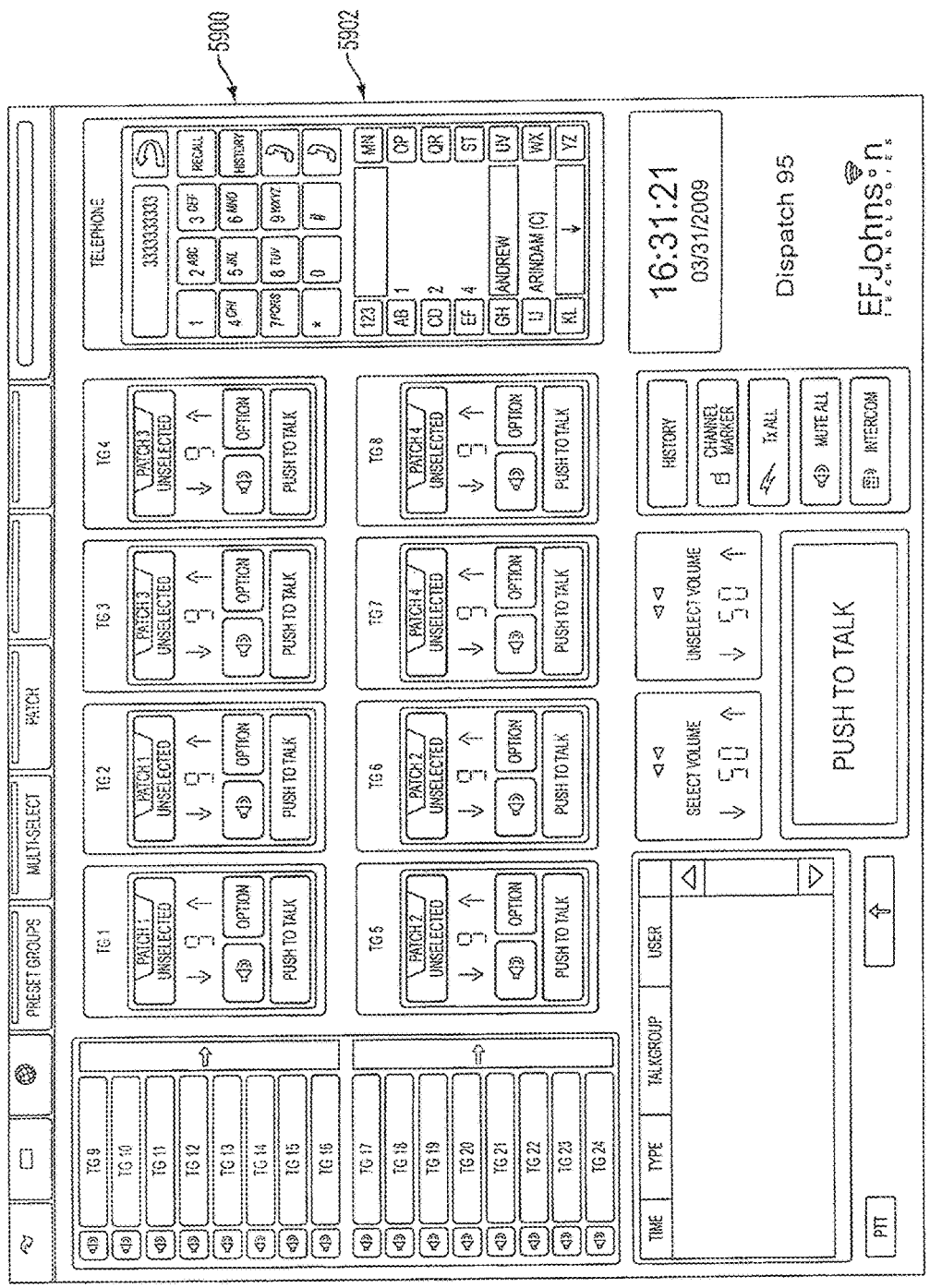
FIG. 59 is a view of the dial pad in which a recall button and a call history button are provided.

Referring to FIG. 59, the dial pad mentioned above can have a recall button 5900 that brings up the most recently dialed number in the dial out field for dialing out. There can also be a call history button 5902 that causes a call history interface to be displayed.

Figure 60:
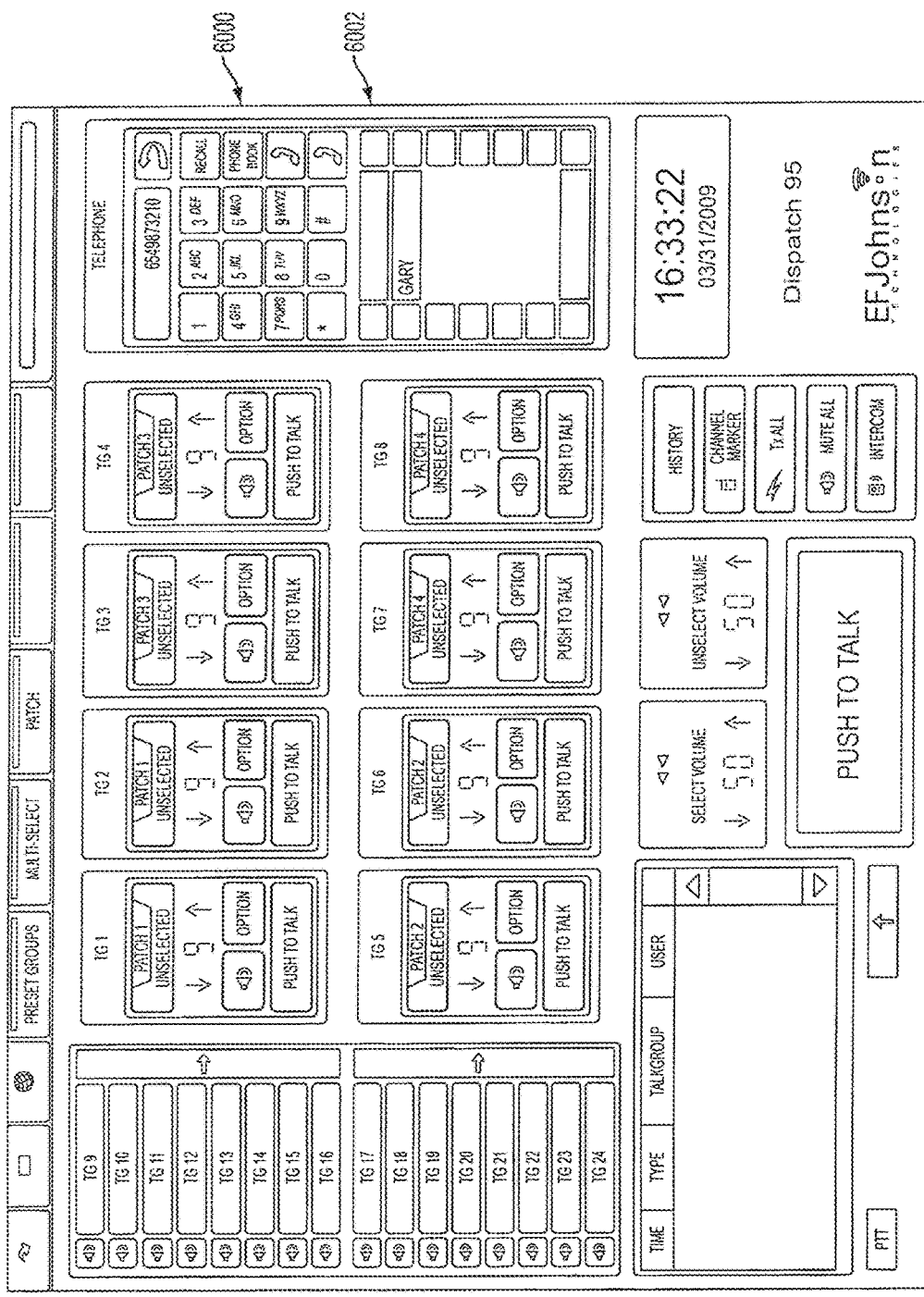
FIG. 60 is a view of GUI behavior when the call history button is selected.

Referring to FIG. 60, pressing of the call history button causes it to change into an address book button 6000, and the address book to be replaced by a call history 6002. The call history 6002 can display the last thirty calls dialed or received. These list elements can be selected by the user to populate the dial pad dial out filed with the selected number.

Figure 61:
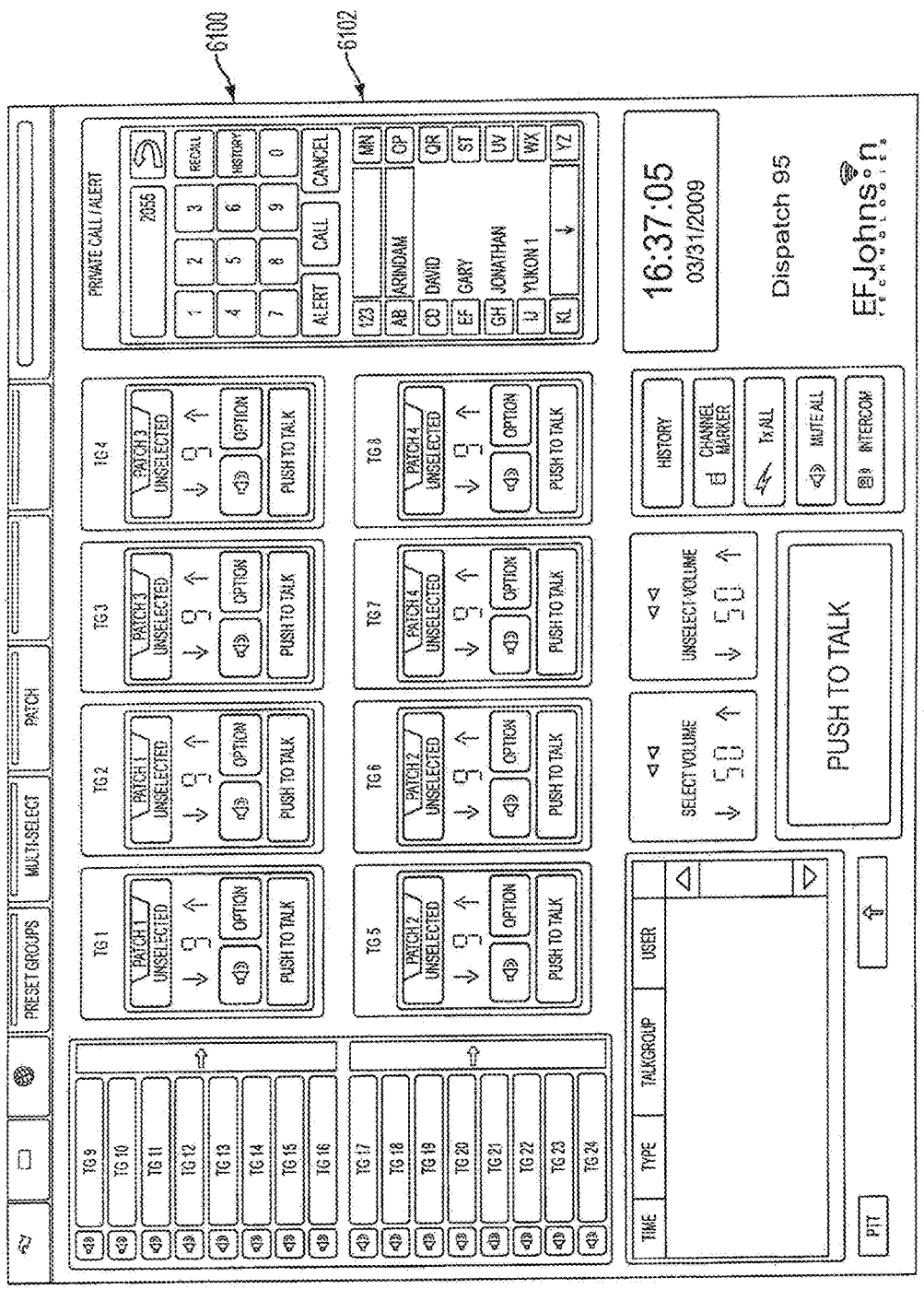
FIG. 61 is a view of a private call interface component.

Referring to FIG. 61, a private call interface can be provided that replaces the telephone interconnect interface in the display when the operator selects a line under a private call tab. A call history button 6100 can be provided. This private call interface also has a dial pad and an address book 6102 that allows the operator to place a call to a single radio subscriber via the LMR network. Thus, other members of the talk group are not privy to the private call.

Figure 62:
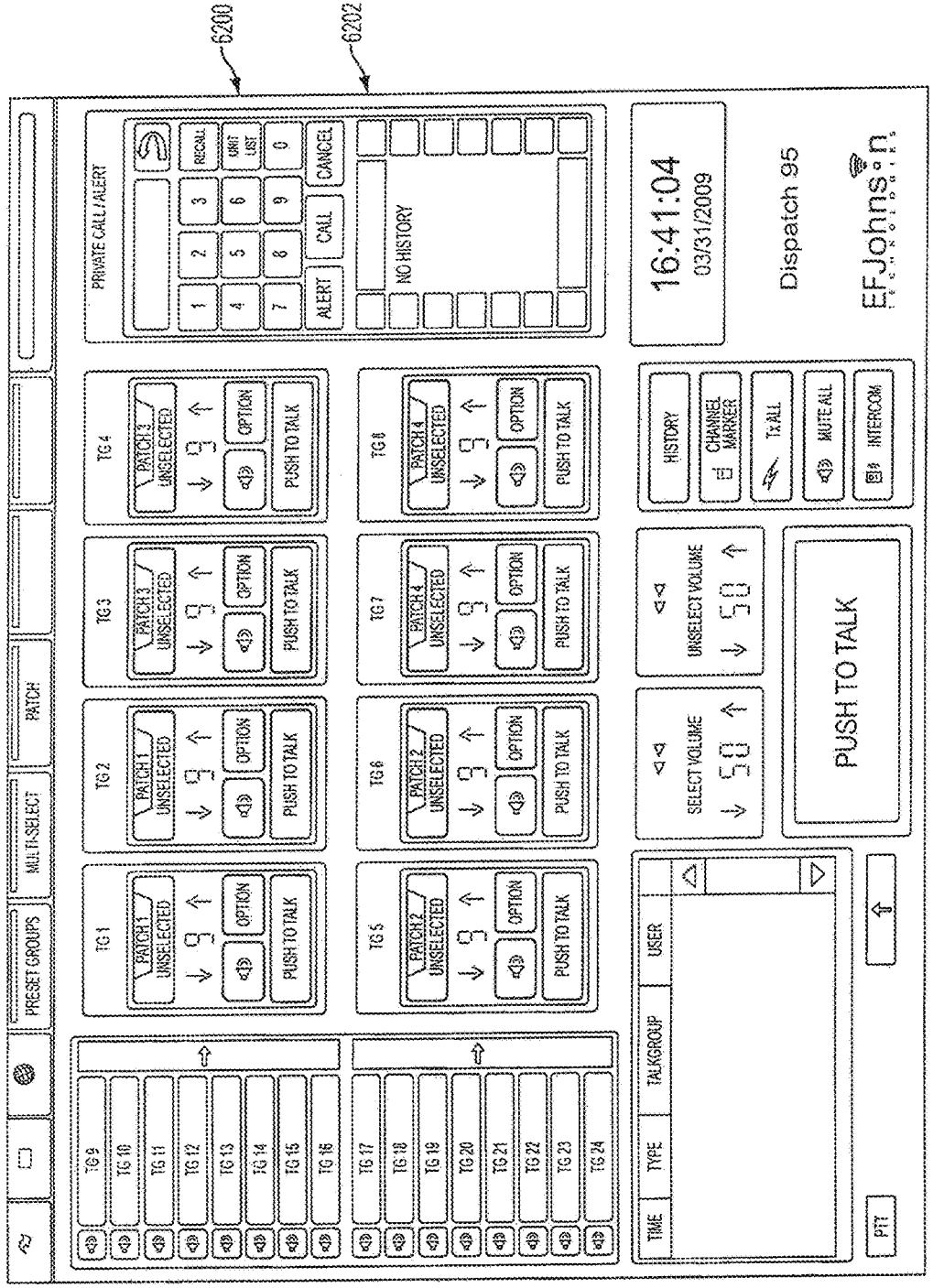
FIG. 62 is a view of a private call history interface component.

Referring to FIG. 62, a private call history 6202 can also be provided to replace the address book for the private call interface. This call history can display the last thirty private calls placed or received on the LMR network. These list elements can be selected to bring the number for dialing. When the call history is displayed, the call history button changes to an address book button 6200.

Figure 63:
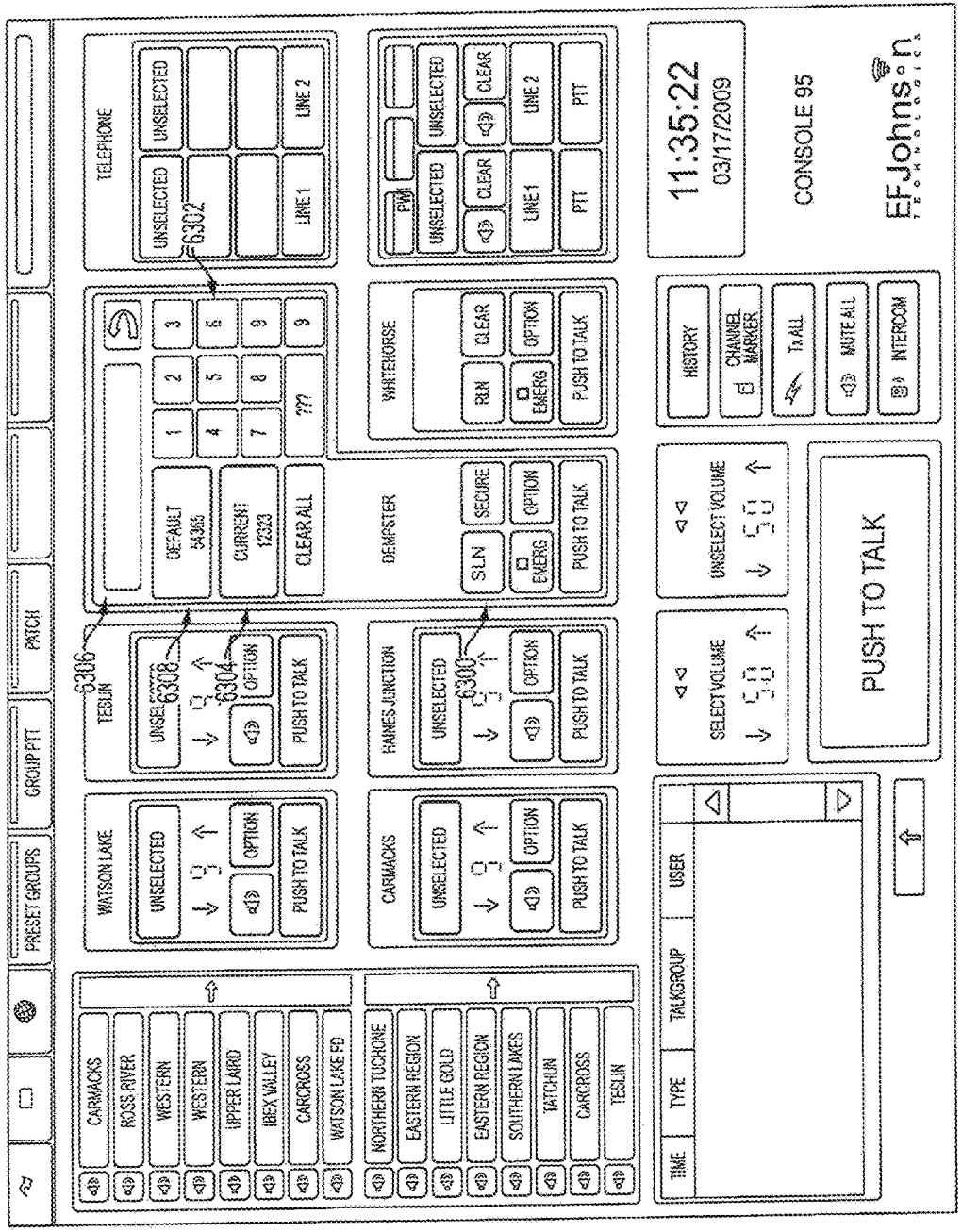
FIG. 63 is a view of an SLN selection interface component.

Referring to FIG. 63, the individual talk group panels can provide the operator an option to dynamically change encryption keys for the talk groups. This capability lets the operator exclude some talk group members from a talk group call, if desired. Clicking the option button can bring up the clear/secure button described above, together with an SLN button 6300. When the operator selects this button, an SLN selection interface can appear that allows the operator to select or edit an SLN number that designates an encryption key slot for a hidden encryption key. A number pad 6302 lets the operator specify or edit an SLN number. A current SLN button 6304 can display the current SLN number in use, and clicking this button can populate an edit/apply field 6306 with that number for the operator to edit and/or apply. A default SLN button 6308 can display a default SLN for the talk group that the operator can select at any time to populate the edit/apply field 6306 with that SLN number.

Thus, it is apparent that there has been provided, in accordance with the present disclosure, an LMR dispatch console and method that satisfies one or more of the advantages set forth above. Although the preferred embodiment has been described in detail, it should be understood that various changes, substitutions, and alterations can be made herein without departing from the scope of the present disclosure, even if all of the advantages and benefits identified above are not present. For example, the various embodiments and examples shown in the drawings and descriptions provided herein illustrate that the present disclosure may be implemented and embodied in numerous different ways that still fall within the scope of the present disclosure, whether expressly shown herein or not. For example, the various elements or components may be combined or integrated in another system or certain features may not be implemented. Also, the techniques, systems, subsystems, and methods described and illustrated in the preferred embodiment as discrete or separate may be combined or integrated with other systems, designs, techniques, or methods without departing from the scope of the present disclosure. For example, the dispatch console can be used with a wide variety of types of LMR systems and networks, including those not specifically discussed herein. Other examples of changes, substitutions, and alterations are readily ascertainable by one skilled in the art and could be made without departing from the spirit and scope of the present disclosure.

What is claimed is:

1. A land mobile radio system, the system comprising:
a display configured to display at least one panel, wherein the panel includes representations of data by the display,
wherein the panel including the data is automatically dynamically modified in response to an emergency call being received by the system, the automatic dynamic modification comprising:
replacing a button with an emergency acknowledge button;
in response to a user pressing the emergency acknowledge button, replacing the emergency acknowledge button with an emergency clear button; and
clearing the automatic dynamic modification in response to the user pressing the emergency clear button.

2. The system of claim 1, further comprising:
a user interface input component operatively connected to display, by the display, interactive controls responsive to user selections to process the data,
wherein the data comprises recorded call data including audio data and metadata about the recorded call data, wherein the interactive controls permit user control of processing of the audio data of the recorded call data, and wherein the panel including the data is dynamically modified to adjust a position of the panel in response to a user input to include the display of the interactive controls.

3. The system of claim 2, wherein the user interface input component is operatively connected to perform at least one of:

displaying interactive controls responsive to user selections to play and pause the audio data;

displaying the interactive controls responsive to user selections to sort the recorded call data by the metadata;

displaying the interactive controls responsive to user selections to filter the recorded call data by the metadata; and displaying the interactive controls responsive to user selections to export the recorded call data.

4. The system of claim 2, wherein the metadata includes at least one of message type, talk group, source ID, date, time, or call length.

5. A land mobile radio system having patch definition capability, the system comprising:

at least one user interface component operatively connected to display at least one patch control and at least one of representations of talk groups to a console operator by a display and a patch menu by the display, wherein the patch menu displays one or more patches and one or more patch slots to the user for selection, wherein, in response to a selecting a patch from the patch menu, the at least one patch control displays a first control function comprising a notification of a conflict with the patch selected from the patch menu and with one or more of the talk groups of the patch selected and active in another patch, and wherein the at least one patch control displays one or more second control functions associated with a selecting of a patch slot from the patch menu, and wherein one of the second control functions is a notification of a conflict comprising wherein one or more of the talk groups selected by the user are active in another patch.

6. The system of claim 5, a patch configuration module operatively connected to respond to user selection of one of the patches and at least one other talk group by at least one of: (a) adding the other talk group to the patch and reconnecting the patch, thereby creating a reconnected patch, and saving the reconnected patch for future use; or (b) indicating the conflict with the patch via the first control function, before disconnection of the selected patch is completed in an attempt at creation of the reconnected patch.

7. The system of claim 5, further comprising:

a call record generation module operatively connected to generate recorded call data of calls handled by the console system, including audio data and metadata about the recorded call data, and to store the recorded call data in a computer readable medium;

a user interface output component operatively connected to access the computer readable medium and provide a display of representations of the recorded call data by the display, including at least part of the metadata about the recorded call data; and a user interface input component operatively connected to display, by the display, interactive controls responsive to user selections to process the recorded call data.

8. The system of claim 7, further comprising wherein the calls include at least one of: (a) telephone calls; (b) requests to talk; (c) emergencies; (d) intercom communications; and (e) status messages.

9. A method of operation for use with a land mobile radio system, the method comprising:

providing a panel including representations of data by a display, the display being configured to display a plurality of panels; and modifying, automatically, in response to an emergency call being received, the panel, the automatic dynamic modification comprising:

replacing a button with an emergency acknowledge button;

in response to a user pressing the emergency acknowledge button, replacing the emergency acknowledge button with an emergency clear button; and clearing the automatic dynamic modification in response to the user pressing the emergency clear button.

10. The method of claim 9, further comprising:

displaying, by the display, interactive controls on the display and responsive to user selections to process the data, wherein the data comprises recorded call data including audio data and metadata about the recorded call data, wherein the interactive controls permit user control of processing of the audio data of the recorded call data; and dynamically modifying, by the display, the panel including the data to adjust a position of the panel in response to a user input to include the display of the interactive controls.

11. The method of claim 10, further comprising performing at least one of:

displaying the interactive controls responsive to user selections to play and pause the audio data;

displaying the interactive controls responsive to user selections to sort the recorded call data by the metadata;

displaying the interactive controls responsive to user selections to filter the recorded call data by the metadata; or displaying the interactive controls responsive to user selections to export the recorded call data.

12. The method of claim 10, wherein the metadata includes at least one of message type, talk group, source ID, date, time, or call length.

13. A method of operation for use with a land mobile radio system having patch definition capability, the method comprising:

displaying representations of talk groups by a display;

displaying a patch menu by the display together with a patch control, wherein the patch menu displays one or more patches and one or more patch slots for selection; and displaying, via the patch control of the patch menu, a first control function in response to selecting a patch from the patch menu, wherein the first control function is a notification of a conflict with the patch selected from the patch menu and with the one or more of the talk groups of the patch selected and active in another patch, and displaying, via the patch control of the patch menu, one or more second control functions in response selecting a patch slot from the patch menu, wherein one of the second control functions is a notification of a conflict comprising wherein one or more of the talk groups selected are active in another patch.

14. The method of claim 13, further comprising:
responding, by a patch configuration module, to selection of one of the patches and at least one other talk group by at least one of: (a) adding the other talk group to the patch and reconnecting the patch, thereby creating a reconnected patch, and saving the reconnected patch for future use; or (b) indicating the conflict with the patch via the first control function, before disconnection of the selected patch is completed in an attempt at creation of the reconnected patch.

15. One or more non-transitory storage media embodied with computer-executable instructions that, when executed by a processor, perform a method of operation for use with a land mobile radio system, the method comprising:
displaying representations of talk groups by a display;
displaying a patch menu by the display together with a patch control,
wherein the patch menu displays one or more patches and one or more patch slots for selection; and
displaying, via the patch control of the patch menu, a first control function in response to selecting a patch from the patch menu,
wherein the first control function is a notification of a conflict with the patch selected from the patch menu comprising wherein one or more of the talk groups of the patch selected are active in another patch, and
wherein the at least one patch control displays one or more second control functions associated with a selecting of a patch slot from the patch menu, and wherein one of the second control functions is a notification of a conflict comprising wherein one or more of the talk groups selected are active in another patch.

16. The one or more non-transitory storage media of claim 15, wherein the method further comprises:
displaying, by the display, interactive controls on the display and responsive to selections to process data,
wherein the data comprises recorded call data including audio data and metadata about the recorded call data,
wherein the interactive controls permit user control of processing of the audio data of the recorded call data; and
dynamically modifying, by the display, the panel including the data to adjust a position of the panel in response to a user input to include the display of the interactive controls.

17. The one or more non-transitory storage media of claim 16, wherein displaying the interactive controls includes performing at least one of:

displaying the interactive controls responsive to user selections to play and pause the audio data;
displaying the interactive controls responsive to user selections to sort the recorded call data by the metadata;
displaying the interactive controls responsive to user selections to filter the recorded call data by the metadata; or
displaying the interactive controls responsive to user selections to export the recorded call data.

18. The one or more non-transitory storage media of claim 16, wherein the metadata includes at least one of message type, talk group, source ID, date, time, or call length.

19. One or more non-transitory storage media embodied with computer-executable instructions that, when executed by a processor, perform a method of operation for use with a land mobile radio system, the method comprising:
displaying representations of talk groups by a display;
displaying a patch menu by the display together with a patch control,
wherein the patch menu displays one or more patches and one or more patch slots for selection;
displaying, via the patch control of the patch menu, a first control function in response to selecting a patch from the patch menu,
wherein the first control function is a notification of a conflict with the patch selected from the patch menu comprising wherein one or more of the talk groups of the patch selected is active in another patch, and
displaying, via the patch control of the patch menu, one or more second control functions in response to selecting a patch slot from the patch menu,
wherein one of the second control functions is a notification of a conflict comprising wherein one or more of the talk groups selected is active in another patch.

20. The one or more non-transitory storage media of claim 19, wherein the method further comprises:
responding, by a patch configuration module, to user selection of one of the patches and at least one other talk group by at least one of: (a) adding the other talk group to the patch and reconnecting the patch, thereby creating a reconnected patch, and saving the reconnected patch for future use; or (b) indicating the conflict with the patch via the first control function, before disconnection of the patch is completed in an attempt at creation of the reconnected patch.

* * * * *